US005270742A

United States Patent [19]

Aoki et al.

[11] Patent Number: 5,270,742

[45] Date of Patent: Dec. 14, 1993

[54] IMAGE FORMING APPARATUS FOR FORMING ELECTROSTATIC LATENT IMAGE USING IONS AS MEDIUM, WITH HIGH-SPEED DRIVING MEANS

[75] Inventors: Hiroshi Aoki, Hanno; Suguru Mihara, Hachioji; Akira Shimizu, Hino, all of Japan

[73] Assignee: Olympus Optical Co., Ltd., Tokyo, Japan

[21] Appl. No.: 710,131

[22] Filed: Jun. 4, 1991

[30] Foreign Application Priority Data

| | | | |
|---|---|---|---|
| Jun. 7, 1990 | [JP] | Japan | 2-149090 |
| Oct. 26, 1990 | [JP] | Japan | 2-289193 |
| Oct. 26, 1990 | [JP] | Japan | 2-289194 |
| Mar. 28, 1991 | [JP] | Japan | 3-090067 |
| May 8, 1991 | [JP] | Japan | 3-102870 |

[51] Int. Cl.[5] .......... G01D 15/06

[52] U.S. Cl. .......... 346/159; 346/154

[58] Field of Search .......... 346/159, 154, 153.1; 315/111.81; 361/235; 257/136, 145

[56] References Cited

U.S. PATENT DOCUMENTS

| | | | |
|---|---|---|---|
| 4,228,480 | 10/1980 | Benwood et al. | 361/235 |
| 4,365,549 | 12/1982 | Fotland et al. | 346/154 |
| 4,415,947 | 11/1983 | Dryczynski et al. | 361/235 |
| 4,486,808 | 12/1984 | Cardone | 361/235 |
| 4,494,129 | 1/1985 | Gretchev | 346/159 X |
| 4,498,090 | 2/1985 | Honda et al. | 346/159 |
| 4,558,334 | 12/1985 | Fotland | 346/159 |
| 4,626,876 | 12/1986 | Miyagawa et al. | 346/160 |
| 4,654,679 | 3/1987 | Muraoka | 257/136 |
| 4,680,533 | 7/1987 | Itani et al. | 361/235 X |
| 4,757,422 | 7/1988 | Bossard et al. | 361/235 X |
| 4,772,926 | 9/1988 | Nishizawa et al. | 257/136 |
| 4,984,049 | 1/1991 | Nishizawa et al. | 257/136 |
| 4,985,716 | 1/1991 | Hosaka et al. | 346/159 |
| 4,990,942 | 2/1991 | Therrien et al. | 346/155 |
| 5,014,076 | 5/1991 | Caley, Jr. et al. | 346/159 |
| 5,025,273 | 6/1991 | Bowers | 346/159 |
| 5,027,136 | 6/1991 | Fotland et al. | 346/159 |
| 5,038,159 | 8/1991 | Schmidlin et al. | 346/159 |

FOREIGN PATENT DOCUMENTS 61-158472 7/1986 Japan .

OTHER PUBLICATIONS

"Characteristics of New Thyristors" Nishizawa et al., ©1976.

"A 2.5 KV Static Induction Thyristor Having New Gate and Shorted p-Emitter Structures" Terasawa et al., Jan. 1986.

*Primary Examiner*—Benjamin R. Fuller
*Assistant Examiner*—Randy W. Gibson
*Attorney, Agent, or Firm*—Frishauf, Holtz, Goodman & Woodward

[57] ABSTRACT

In an image forming apparatus for forming a static latent image using ions as a medium, an ion generation formed by stacking a plurality of line electrodes, a plurality of finger electrodes, and a screen electrode with dielectric layers being sandwiched therebetween is arranged to oppose a dielectric drum on which the electrostatic latent image is to be formed. A static induction transistor for switching an RF high-voltage signal at a high speed is connected to each line electrode of the ion generator. Each static induction transistor is also connected to a DC high-voltage power source via a coil. When each static induction transistor is driven at a high frequency by a source drive circuit, an RF high voltage is applied to a corresponding line electrode. A voltage is supplied to a parallel resonator constituted by the coil and a line electrode capacitance to start resonance, thereby obtaining an output for ion generation.

11 Claims, 36 Drawing Sheets

| ATMOSPHERIC PRESSURE (ALTITUDE) | RELATIVE HUMIDITY | | |
|---|---|---|---|
| | 5%RH | 15%RH | 25%RH |
| 1.0 ( 0m) | 2400V | 2450V | 2500V |
| 0.9 (1000m) | 2350V | 2400V | 2450V |
| 0.8 (2000m) | 2300V | 2350V | 2400V |

| LINE No. | A3 | A2 | A1 | A0 | D4 | D3 | D2 | D1 | D0 | Duty | Vrf |
|---|---|---|---|---|---|---|---|---|---|---|---|
| 0 | 0 | 0 | 0 | 0 | 0 | 1 | 1 | 1 | 1 | 50% | 2600Vpp |
| 1 | 0 | 0 | 0 | 1 | 0 | 1 | 1 | 1 | 1 | 50 | 2600 |
| 2 | 0 | 0 | 1 | 0 | 0 | 1 | 1 | 1 | 0 | 47 | 2550 |
| 3 | 0 | 0 | 1 | 1 | 0 | 1 | 1 | 1 | 0 | 47 | 2550 |
| 4 | 0 | 1 | 0 | 0 | 0 | 1 | 1 | 0 | 1 | 44 | 2500 |
| 5 | 0 | 1 | 0 | 1 | 0 | 1 | 1 | 0 | 1 | 44 | 2500 |
| 6 | 0 | 1 | 1 | 0 | 0 | 1 | 1 | 0 | 1 | 44 | 2500 |
| 7 | 0 | 1 | 1 | 1 | 0 | 1 | 1 | 0 | 1 | 44 | 2500 |
| 8 | 1 | 0 | 0 | 0 | 0 | 1 | 1 | 1 | 0 | 47 | 2550 |
| 9 | 1 | 0 | 0 | 1 | 0 | 1 | 1 | 1 | 0 | 47 | 2550 |
| 10 | 1 | 0 | 1 | 0 | 0 | 1 | 1 | 1 | 1 | 50 | 2600 |
| 11 | 1 | 0 | 1 | 1 | 0 | 1 | 1 | 1 | 1 | 50 | 2600 |

FIG. 42

IMAGE FORMING APPARATUS FOR FORMING ELECTROSTATIC LATENT IMAGE USING IONS AS MEDIUM, WITH HIGH-SPEED DRIVING MEANS

BACKGROUND OF THE INVENTION

1. Field of the Invention

This invention relates to an image forming apparatus for forming an electrostatic latent image using ions as a medium and, in particular, to an ion generator driving circuit for applying an RF high voltage to an ion generator for forming an electrostatic latent image corresponding to image information.

2. Description of the Related Art

As one of conventionally used image forming apparatuses, an ion-flow-type image forming apparatus in which an ion generator as an ion generating source for forming an electrostatic latent image outputs image information is known. An image forming apparatus of this type is disclosed in, e.g., Published Unexamined Japanese Patent Application No. 61-158472.

In this apparatus, an ion flow modulated in correspondence with an image signal to be formed is radiated in the form of dots by an ion generator having an ion flow generator on a dielectric drum rotated in a predetermined direction to form an electrostatic charge image, and the electrostatic charge image is developed by a developer to form a toner image. The toner image is transferred to and fixed on image forming paper by a pressure of a pressure transfer roller. A toner image not transferred to the image forming paper but remaining on the dielectric drum is removed by a toner remover, and the electrostatic charge on the dielectric drum is removed by a discharger, thereby preparing for formation of the next electrostatic charge image. Image forming paper is conveyed from an external paper feed tray of the image forming apparatus to a transfer section by a separation roller and paper-feed rollers. After image transfer and fixing, the paper is conveyed to an external paper exhaust tray by paper exhaust rollers.

Various types of drive circuits have been proposed for the ion generator in the ion-flow-type image forming apparatus having the above arrangement.

In the image forming apparatus of this type, in order to obtain a uniform image free from irregularities within one page of image forming paper on which an electrostatic latent image is to be formed, a uniform voltage must be applied to line electrodes of the ion generator.

In conventional image forming apparatuses, oscillators and transformers arranged in one-to-one correspondence with line electrodes are used to apply a signal of 1 MHz and 2,500 V to the line electrodes. However, due to variations in circuit components constituting the resonators and those in the transformers, it is difficult to uniformize characteristics of the respective resonators of all the line electrodes, e.g., output voltages, rise and fall characteristics, output frequency characteristics, and variation characteristics of output voltages caused by a change in load. Therefore, a variable resistor is inserted at the primary side of each transformer to adjust the output voltage, and the other characteristics are adjusted by controlling parts characteristics, thereby uniformizing the oscillator characteristics of the respective lines to a certain degree.

Although an image having a somewhat uniform density can be obtained, realization of high image quality is still prevented by the variations in outputs as described above.

In addition, in conventional apparatuses, since no semiconductor device which can be directly switched by a signal of 2,500 V and 1 MHz is available as a switching device, an oscillator which is constituted by a transistor and a transformer for both boosting and resonance and causes resonance with a line electrode capacitance is used. For this reason, the following problems are posed.

(1) It is difficult to increase the speed of an image formation output.

Although a high operating speed may be realized by increasing the frequency of an output voltage, since a circuit efficiency is decreased if the frequency is increased, this method is difficult to carry out. In order to realize a high frequency using the above resonator, the secondary-side inductance of the transformer must be decreased because the line electrode capacitance is determined. However, since the withstand voltage of the transistor is limited, a predetermined boosting ratio (a turn number ratio of the primary to the secondary) must be maintained, and therefore the number of turns of the transformer cannot be easily decreased. Therefore, since the reluctance of the core of the transformer must be increased to decrease the inductance of the transformer, the efficiency is reduced accordingly.

In addition, since the rise and fall of the output voltage respectively require a time interval of about several micro seconds, these rise and fall times must be ensured in addition to a time required for ion generation. Therefore, an ON time itself or a time interval from turning ON of the nth line to that of the (n+1)th line cannot be much reduced. Therefore, an extra time not contributing to the ion generation is required to interfere with realization of the high-speed image formation output.

(2) It is difficult to realize high image quality.

As described above, due to the variations in constituting parts of the oscillators, the output voltages, the rise and fall characteristics, the output frequency characteristics, and the output characteristics obtained when the line electrode capacitance as a load varies are different between the respective oscillators connected to the line electrodes. Therefore, the ion generation amounts of the respective lines become nonuniform to make it impossible to obtain a uniform image free from irregularities.

(3) To more or less correct the variations in circuit components described in item (2) above, variable resistors are used to perform adjustment as described above. This variable resistor is connected to the primary side of each transformer where a comparatively large current flows. Therefore, since the variable resistor generates heat parts having a high power capacity must be used. In addition, the manufacturing cost is increased.

(4) It is difficult to improve reliability.

A comparatively large current is flowed through the variable resistor to adjust the output voltage. Therefore, a large stress is applied on a slider contact as a mechanism portion of the variable resistor to degrade the reliability.

(5) Since the transformers are essential parts, a hybrid arrangement or a chip arrangement is difficult to achieve. Therefore, it is difficult to decrease the size of an apparatus.

(6) Since the output voltage easily changes in accordance with a temperature increase in transistors, an apparatus is unstable with respect to temperature. For this reason, an image density is sometimes different between the first and last portions output on image forming paper.

SUMMARY OF THE INVENTION

The present invention has been made in consideration of the above situation and has as its object to provide an image forming apparatus for forming an electrostatic latent image using ions as a medium, which can increase the speed of an image formation output, can obtain a uniform image free from irregularities caused by variations in respective constituting parts to realize high image quality, does not require any extra manufacturing steps, can be made compact, and has improved reliability with respect to the constituting parts and temperature.

According to one aspect of the present invention, there is provided an image forming apparatus for forming an electrostatic latent image using ions as a medium, comprising:

an image carrier on which the electrostatic latent image is to be formed;

an ion generator provided to oppose the image carrier and formed by stacking at least first and second electrode layers each having a plurality of divided electrode patterns and a dielectric layer; and an RF high-voltage driver for applying an RF high-voltage signal between the first and second electrode layers of the ion generator, the RF high-voltage driver including a plurality of high-speed high-voltage switching means, connected in one-to-one correspondence with the electrode patterns of the first electrode layer of the ion generator, for switching the RF high-voltage signal at a high speed, ,a plurality of passive elements connected in one-to-one correspondence with the plurality of high-speed high-voltage switching means, DC high-voltage power source means, connected to the plurality of passive elements, for supplying a high voltage to the RF high-voltage switching means, and an RF source for supplying a predetermined-frequency signal to the high-speed high-voltage switching means.

According to another aspect of the present invention, there is provided an image forming apparatus for forming an electrostatic latent image using ions as a medium, comprising:

an image carrier on which the electrostatic latent image is to be formed;

an ion generator provided to oppose the image carrier and formed by stacking at least first and second electrode layers each having a plurality of divided electrode patterns and a dielectric layer; and an RF high-voltage driver for applying an RF high-voltage signal between the first and second electrode layers of the ion generator, the RF high-voltage driver including a plurality of high-speed high-voltage switching means, connected in one-to-one correspondence with the electrode patterns of the first electrode layer of the ion generator, for switching the RF high-voltage signal at a high speed, a plurality of passive elements connected in one-to-one correspondence with the plurality of high-speed high-voltage switching means, DC high-voltage power source means, connected to the plurality of passive elements, for supplying a high voltage to the RF high-voltage switching means, an RF source for supplying a predetermined-frequency signal to the high-speed high-voltage switching means, and duty varying means for varying a duty of the predetermined-frequency signal from the RF source.

According to still another aspect of the present invention, there is provided an image forming apparatus for forming an electrostatic latent image using ions as a medium, comprising:

an image carrier on which the electrostatic latent image is to be formed;

an ion generator provided to oppose the image carrier and formed by stacking at least first and second electrode layers each having a plurality of divided electrode patterns and a dielectric layer; and an RF high-voltage driver for applying an RF high-voltage signal between the first and second electrode layers of the ion generator, the RF high-voltage driver including a plurality of high-speed high-voltage switching means, connected in one-to-one correspondence with the electrode patterns of the first electrode layer of the ion generator, for switching the RF high-voltage signal at a high speed, a plurality of passive elements connected in one-to-one correspondence w th the plurality of high-speed high-voltage switching means, DC high-voltage power source means, connected to the plurality of passive elements, for supplying a high voltage to the RF high-voltage switching means, an RF source for supplying a predetermined-frequency signal to the high-speed high-voltage switching means, and DC high-voltage power source varying means for varying the application voltage from the DC high-voltage power source means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 42 is a view showing a table stored in a ROM shown in FIG. 41;

DETAILED DESCRIPTION OF THE PREFERRED EMBODIMENTS

Figure 1:
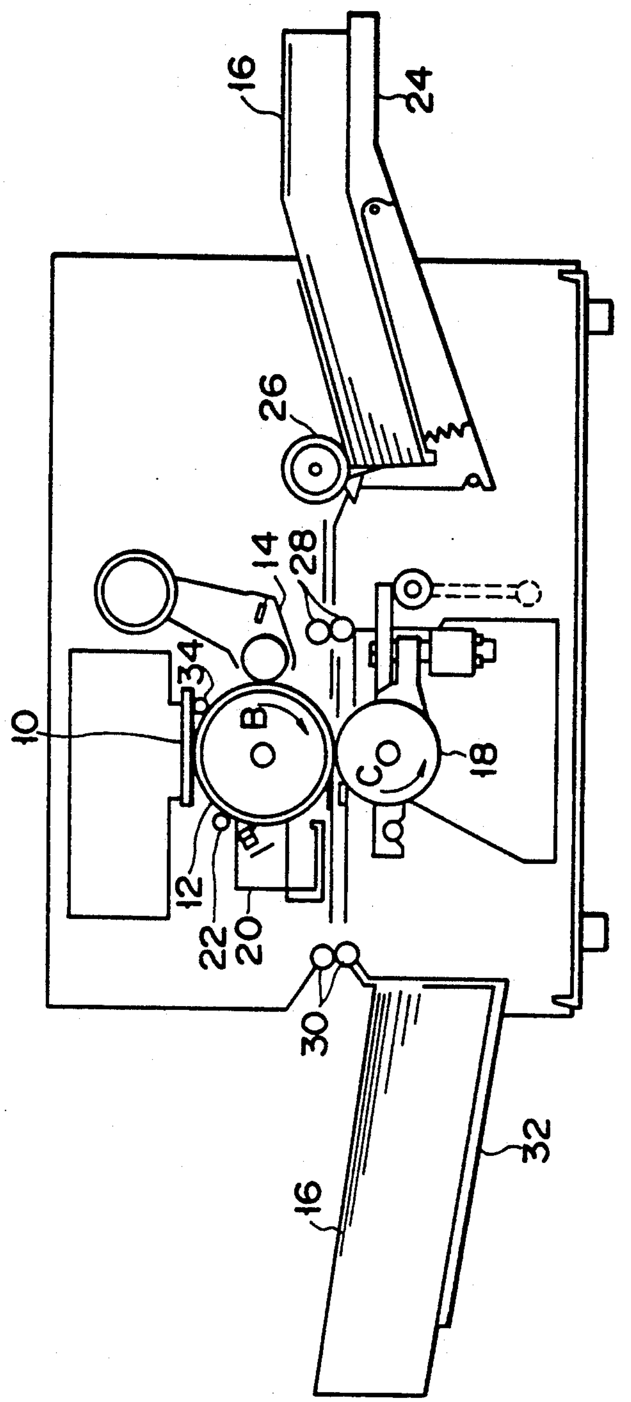
FIG. 1 is a schematic sectional view showing an arrangement of an image forming apparatus according to the first embodiment of the present invention.

FIG. 1 shows an image forming apparatus according to the first embodiment of the present invention. In this image forming apparatus, an ion generator 10 having an ion flow generator radiates a dot-like ion flow, which is modulated in correspondence with an image signal to be formed, on a dielectric drum 12 rotated in a direction indicated by an arrow B in FIG. 1, thereby forming an electrostatic charge image on the drum 12. At this time, the ion generator 10 is kept at a temperature of about 50° C. by a heater (not shown). The electrostatic charge image formed on the drum 12 is developed by a developer 14 using toner to form a toner image on the drum 12. This toner image is transferred to and fixed on image forming paper 16 by a pressure of a pressure transfer roller 18 arranged below a conveying path of the paper 16 and rotated in a direction indicated by an arrow C in FIG. 1 upon rotation of the drum 12. A toner image not transferred to the paper 16 but remaining on the dielectric drum 12 is removed by a toner remover 20 having a cleaning blade. Thereafter, the electrostatic charge is removed by a discharger 22 to prepare the dielectric drum 12 for formation of the next electrostatic charge image.

Sheets of the image forming paper 16 are stacked in a paper feed tray 24 outside the image forming apparatus, and one of the sheets is separated by a separation roller 26 from the tray 24 and conveyed to a transfer section by paper feed rollers 28. In this transfer section, the paper 16 on which a toner image is transferred and fixed is conveyed by paper exhaust rollers 30 and stacked on an external paper exhaust tray 32.

The pressure transfer roller 18 is urged against the drum 12 at a pressure of, e.g., one ton by a spring and a cam (neither of which are shown). In addition, the axis of the drum 12 and that of the roller 18 cross each other at a predetermined angle. Therefore, the paper 16 is obliquely conveyed between the drum 12 and the roller 18.

An environment detecting element 34 is mounted in the vicinity of the ion generator 10. The element 34 detects environmental factors of the ion generator 10, e.g., an atmospheric pressure, a humidity, and a temperature.

Figure 2:
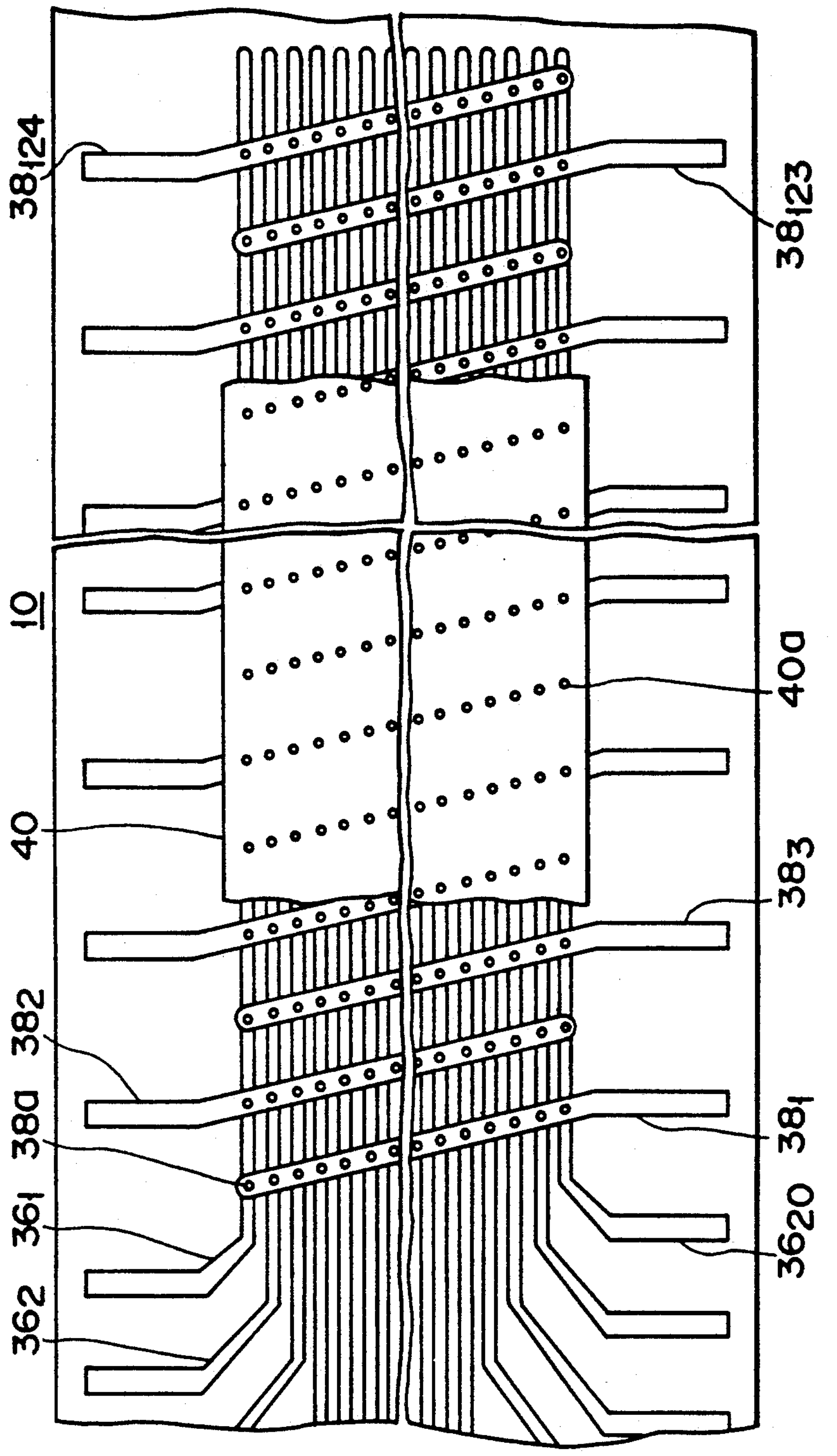
FIG. 2 is a plan view showing an arrangement of an ion-flow-type ion generator according to the first embodiment of the present invention.

FIG. 2 is a plan view showing an arrangement of the ion-flow-type ion generator 10. The ion generator 10 includes three types of electrodes insulated from each other. Electrodes of the first type are a plurality of, e.g., 20 line electrodes 36 ($36_1$, $36_2$, . . . , $36_{20}$) extending in the axial direction of the ion generator 10. Electrodes of the second type are a plurality of, e.g., 124 finger electrodes 38 ($38_1$, $38_2$, . . . , $38_{124}$) arranged to obliquely cross the line electrodes 36 and having small holes **38*a* formed in portions corresponding to the line electrodes 36. An electrode of the third type is a screen electrode 40 arranged above the finger electrodes 38 and having small holes 40*a* formed in positions corresponding to the small holes 38*a* formed in the finger electrodes 38**.

Figure 3:
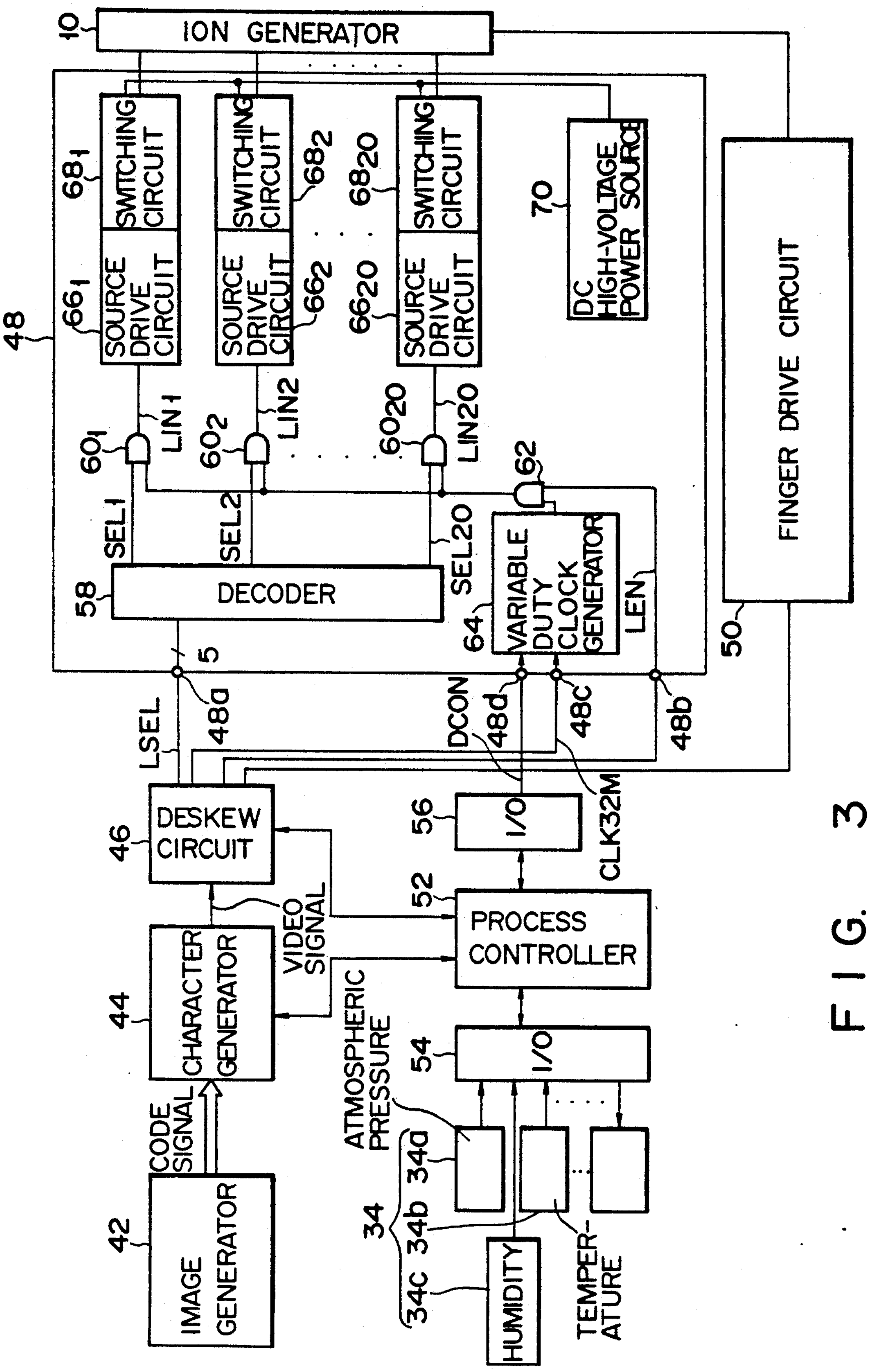
FIG. 3 is a block diagram showing an ion generator driver according to the first embodiment of the present invention.

FIG. 3 shows an arrangement of an ion generator driver for driving the ion generator 10 having the above arrangement. Referring to FIG. 3, a code signal output from an image generator 42 such as a host computer is input to a character generator 44 and converted into a video signal. A deskew circuit 46 selects electrodes to be used to generate ions in accordance with the video signal and supplies a line electrode select signal LSEL constituted by five bits LSEL0 to LSEL4 to an input terminal **48*a* of a line drive circuit 48 so as to select the corresponding line electrodes 36 at a timing corresponding to the video signal. In addition, the deskew circuit 46 outputs a finger select signal to a finger drive circuit 50. Also, in accordance with an image signal to be output, the deskew circuit 46 outputs a signal LEN (pulse width=6 μSEC., period=12.8 μSEC.) indicating a timing of applying a voltage to the line electrodes 36 and a 32-MHz clock CLK32M synchronized with the signals LSEL and LEN to input terminals 48*b* and 48*c* of the line drive circuit 48**.

A process controller 52 controls individual sections (not shown) of the image forming apparatus while performing communication with the character generator 44 and the deskew circuit 46, thereby controlling an image formation process. Also, the controller 52 fetches outputs from, e.g., an atmospheric pressure sensor **34*a*, a temperature sensor 34*b*, and a humidity sensor 34*c* constituting the environment detecting element 34 located near the ion generator 10 via an I/O unit 54 constituted by a parallel latch circuit, an A/D converter, or the like. The controller 52 supplies a duty control signal DCON indicating a value determined i accordance with the fetched environment state signals to an input terminal 48*d* of the line drive circuit 48 via an I/O unit 56**.

In the line drive circuit 48, the line select signal LSEL supplied to the input terminal **48*a* is supplied to a decoder 58. The decoder 58 selects one of 20 outputs SEL1 to SEL20 on the basis of the input signal LSEL and outputs a logic level "HIGH". Each of the outputs SEL1 to SEL20 of the decoder 58 is connected to one input terminal of a corresponding one of AND gates $60_1$ to $60_{20}$. The timing signal LEN supplied to the input terminal 48*b* of the line drive circuit 48 is supplied to one input terminal of an AND gate 62**.

The clock CLK32M supplied to the input terminal **48*c* and the duty control signal DCON supplied to the input terminal 48*d* are supplied to a variable duty clock generator 64. As will be described in detail later, the variable duty clock generator 64 is constituted by counters and AND gates or counters and a CR (a capacitor and a resistor) and uses charging/discharging of the CR. The clock generator 64 uses the input clock CLK32M to generate a line drive circuit internal clock of about 1 MHz having a duty controlled at a predetermine value. This output from the clock generator 64 is supplied to the other input terminal of the AND gate 62. An output from the AND gate 62** is supplied to the other input terminals of the AND gates $60_1$ to $60_{20}$ described above.

Outputs from the AND gates $60_1$ to $60_{20}$ are supplied to source drive circuits $66_1$ to $66_{20}$, respectively. The source drive circuits $66_1$ to $66_{20}$ drive static induction transistors constituting switching circuits $68_1$ to $68_{20}$ in accordance with input signals LIN1 to LIN20, respectively. The switching circuits $68_1$ to $68_{20}$ receive a voltage from a common DC high-voltage power source 70. The switching circuits $68_1$ to $68_{20}$ are connected to the line electrodes $36_1$ to $36_{20}$ of the ion generator 10, respectively.

Figure 4:
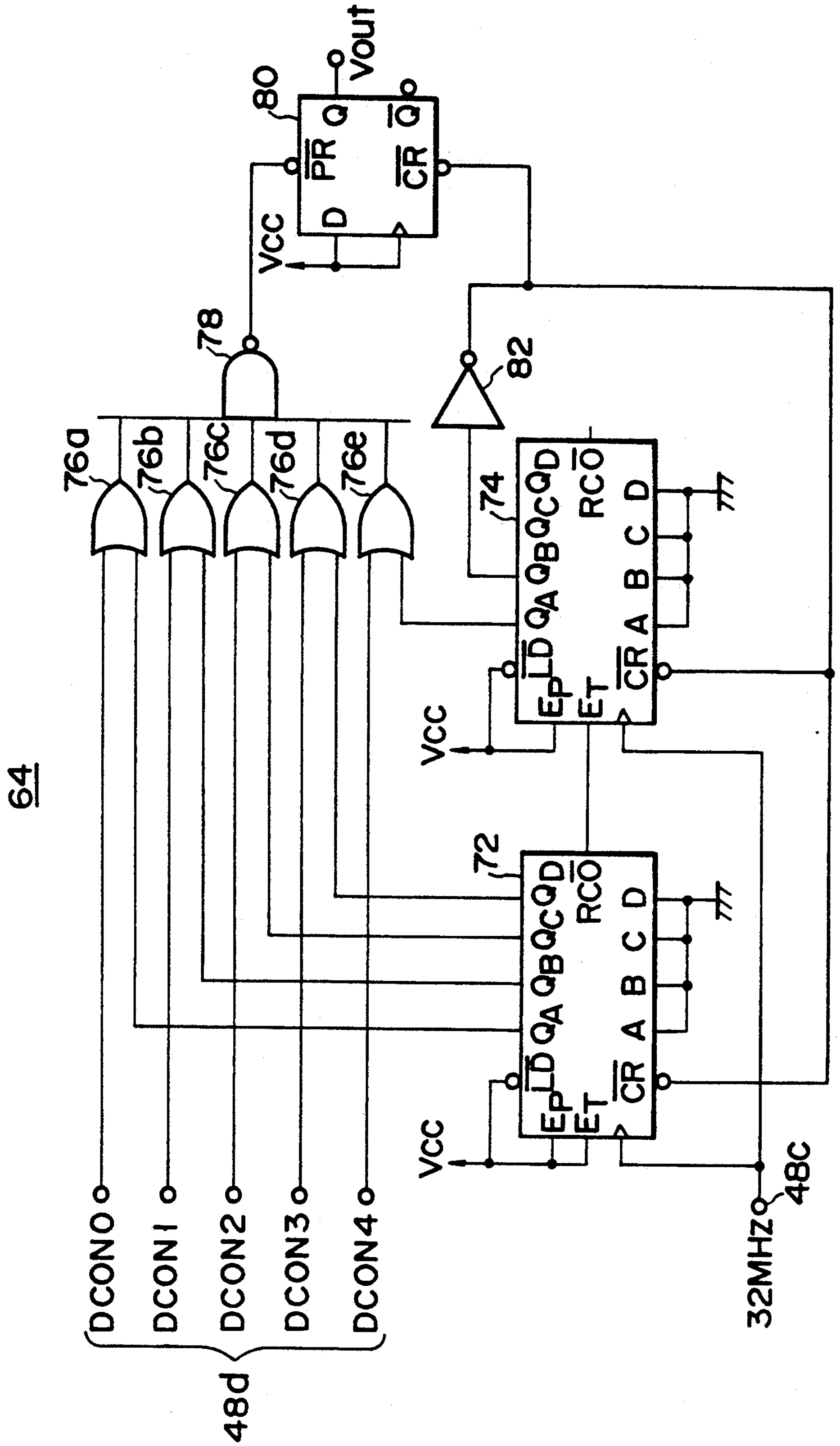
FIG. 4 is a circuit diagram showing a variable duty clock generator shown in FIG. 3.

FIG. 4 shows an arrangement of the variable duty clock generator 64. Referring to FIG. 4, the 32-MHz clock CLK32M supplied to the input terminal 48*c* of the line drive circuit 48 in synchronism with the signals LSEL and LEN is supplied to clock terminals of counters 72 and 74. The counters 72 and 74 are cascade-connected with each other such that a carry output terminal RCO of the counter 72 is connected to an enable input terminal $E_T$ of the counter 74. An enable input terminal $E_T$ of the counter 72 and input terminals $E_P$ and terminals $\overline{LOAD}$ ($\overline{LD}$) of the counters 72 and 74 are pulled up to Vcc (+5 V). Data input terminals A, B, C, and D of the counters 72 and 74 are grounded.

Each of count output terminals $Q_A$, $Q_B$, $Q_C$, and $Q_D$ of the counter 72 and a count output terminal $Q_A$ of the counter 74 is connected to one input terminal of a corresponding one of OR gates 76*a*, 76*b*, 76*c*, 76*d*, and 76*e*.

The other input terminals of the OR gates 76*a*, 76*b*, 76*c*, 76*d*, and 76*e* receive duty control signals DCON0, DCON1, DCON2, DCON3, and DCON4, respectively, supplied from the process controller 52 to the input terminal 48*d* via the I/O unit 56.

The output terminals of the OR gates 76*a* to 76*e* are connected to input terminals of a NAND gate 78. The output terminal of the NAND gate 78 is connected to a preset terminal $\overline{PR}$ of an RS flip-flop 80. The count output terminal $Q_B$ of the counter 74 is connected to clear terminals $\overline{CR}$ of the counters 72 and 74 and a clear terminal $\overline{CR}$ of the RS flip-flop 80. An output from an output terminal Q of the RS flip-flop 80 is supplied to the next stage as an output from the variable duty clock generator 64.

Figure 5:
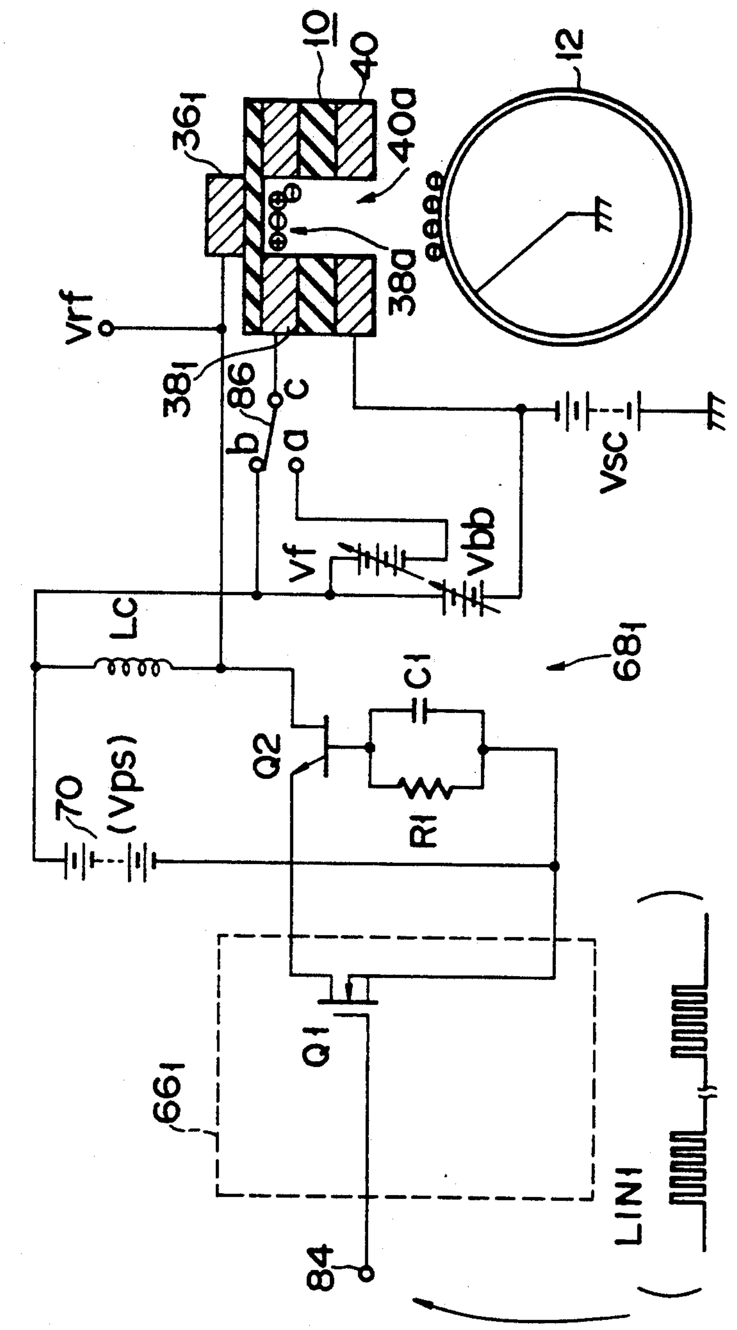
FIG. 5 is a circuit diagram showing a source drive circuit, a switching circuit, and a bias power source shown in FIG. 3 together with a partial sectional view of the ion generator.

FIG. 5 shows a partial section of the ion generator corresponding to the dielectric drum 12, and arrangements of the source drive circuit $66_1$, the switching circuit $68_1$ cascade-connected to the source drive circuit $66_1$, and a bias power source in FIG. 3, according to the first embodiment of the present invention. Although the source drive circuit $66_1$ and the switching circuit $68_1$ are shown in FIG. 5, the other source drive circuits $66_2$ to $66_{20}$ and switching circuits $68_2$ to $68_{20}$ have the same arrangements and therefore illustration and description thereof will be omitted.

A 1-MHz intermittent input signal LIN1 from the AND gate $60_1$ is input to an input terminal 84 of the source drive circuit $66_1$. The intermittent input signal LIN1 is input to the gate of a field-effect transistor (FET) Q1. The drain of the FET Q1 is connected to the source of a static induction transistor Q2. The negative terminal of the DC high-voltage power source 70 is connected to the source of the FET Q1, a resistor R1, and a capacitor C1. The other terminals of the resistor R1 and the capacitor C1 are connected to the gate of the static induction transistor Q2. The drain of the transistor Q2 is connected to the positive terminal of the power source 70 via a coil $L_C$ and to the line electrode $36_1$ of the ion generator 10.

Figure 6:
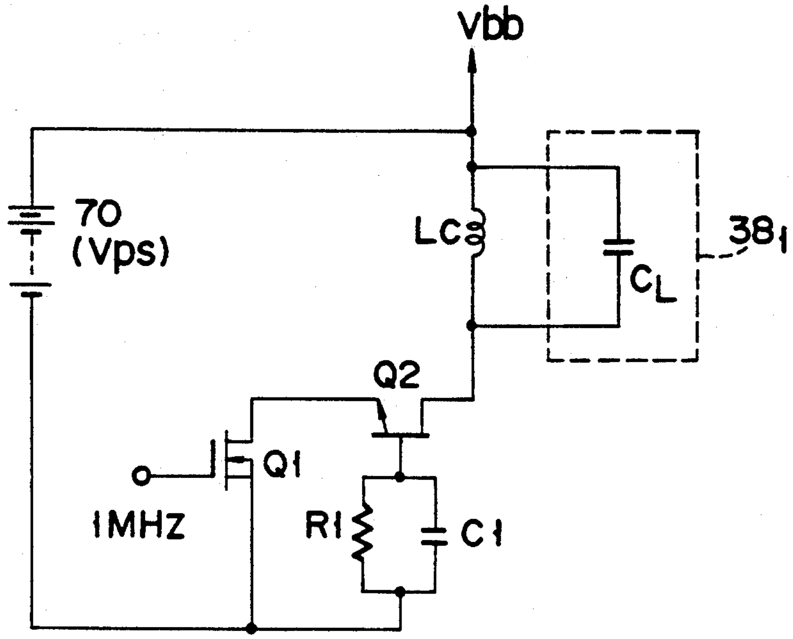
FIG. 6 is an equivalent circuit diagram showing a switching circuit and a load in FIG. 5.

Since the line electrodes 36 oppose the finger electrodes 38 and the screen electrode 40 via an insulating layer, they are electrically considered as a substantially pure capacitor $C_L$. Therefore, an equivalent circuit of the circuit shown in FIG. 5 is as shown in FIG. 6. Assuming that the inductance of the coil $L_C$ is $L_C$, the capacitance of the line electrodes 36 is $C_L$, and the frequency of a voltage to be applied to the line electrode $36_1$ is f, the inductance $L_C$ is so set as to establish the following equations, thereby causing resonance with respect to the capacitor $C_L$.

$$f = \frac{1}{2\pi\sqrt{L_C C_L}} \qquad (1)$$

$$L_C = \frac{1}{4\pi^2 f^2 C_L} \qquad (2)$$

For example, assuming that a desired frequency is 1 MHz and a desired line electrode capacitance is 100 pF, $L_C = 250\ \mu H$ is obtained from the above equations.

The screen electrode 40 opposing the dielectric drum 12 is applied with a voltage (e.g., −600 V) from a screen bias power source Vsc. The negative terminal of the power source Vsc is connected to the negative terminal of a reverse bias power source Vbb. The positive terminal of the power source Vbb is connected to the positive terminal of a forward bias power source Vf having a negative terminal connected to a connection terminal a of a switch 86 and is connected to a connection terminal b of the switch 86. A connection terminal c of the switch 86 is connected to the finger electrode $38_1$.

In accordance with image data to be formed, the switch 86 performs switching between the connection terminals a and b on the basis of the finger select signal from the deskew circuit 46, thereby switching the bias to be applied to the finger electrode $38_1$. Note that the outputs from the reverse and forward bias power sources Vbb and Vf are set to be variable within the range of 100 to 300 V so as to adjust an ion flow amount.

The ion generator driver for selectively applying a burst-like RF high voltage to the plurality of line electrodes 36 of the ion generator 10 is conventionally constituted by an oscillator using a transistor and a transformer for both boosting and resonance. This is because no switching device which can perform switching for a high voltage of 2,500 V at a high frequency of 1 MHz is available. The static induction transistor Q2 is a semiconductor device which enables this RF high-voltage switching. For example, the transistor Q2 has a withstand voltage of 2,500 V and can perform switching at 1 MHz.

Figure 7:
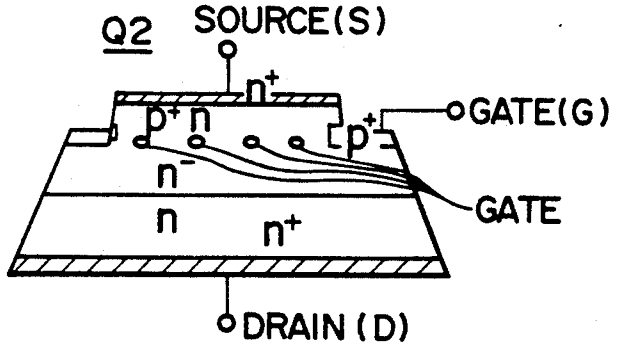
FIG. 7 is a sectional view showing a static induction transistor in FIG. 5.

FIG. 7 is a sectional view showing an arrangement of the static induction transistor Q2. Since the gate length of the transistor Q2 is smaller than that of a FET, its distributed capacitance Cgch is small. In addition, since the channel length of the transistor Q2 is also small, its channel resistance rs is small, and its time constant rs·Cgch is small accordingly. Therefore, a switching rate can be increased. Furthermore, the static induction transistor Q2 has a structure in which a current flows perpendicularly to the drain electrode, the source electrode, and the substrate, and is of a multichannel type in which the number of channel portions for flowing a current is larger than that of a conventional FET. Therefore, a large current and a low internal resistance can be realized. Moreover, since the transistor Q2 is of a vertical type, its withstand voltage can be easily increased.

Such a semiconductor device is used to switch the output of 1,250 V from the DC high-voltage power source 70 at 1 MHz to generate a pulsating waveform of 2,500 V and 1 MHz, and this pulsating waveform is applied to the ion generator 10 to cause the ion generator 10 to generate ions. To generate the pulsating waveform of 2,500 V and 1 MHz, switching circuits are connected in one-to-one correspondence with the line electrodes 36 of the ion generator 10, and the DC high-voltage power source 70 serves as a common DC high-voltage power source for the entire circuit.

An operation of the first embodiment will be described below.

In accordance with the line select signal LSEL constituted by the five bits LSEL0 to LSEL4 transmitted from the deskew circuit 46 shown in FIG. 3, the decoder 58 selects one of the outputs SEL1 to SEL20. As a result, a logic level "HIGH" is input to the selected one of the AND gates $60_1$ to $60_{20}$ to enable the selected gate.

At this time, the timing signal LEN and the clock CLK32M synchronized with the line select signals LSEL0 to LSEL4 are input to the line drive circuit 48. In addition, the duty control signals DCON0 to DCON4 determined by the process controller 52 in accordance with the output from the environment detecting element 34 are supplied to the variable duty clock generator 64 via the I/O unit 56. The clock generator 64 uses the input clock CLK32M to generate a 1-MHz line drive circuit internal clock having a controlled duty. This output from the variable duty clock generator 64 and the timing signal LEN are input to the AND gate 62. Only when the timing signal LEN is at level "HIGH", the 1-MHz internal clock is output from the AND gate 62 and supplied to the AND gates $60_1$ to $60_{20}$.

Since only one AND gate is enabled by the line select signals LSEL0 to LSEL4, the input signal is supplied to only one of the 20 source drive circuits $66_1$ to $66_{20}$.

Figure 8:
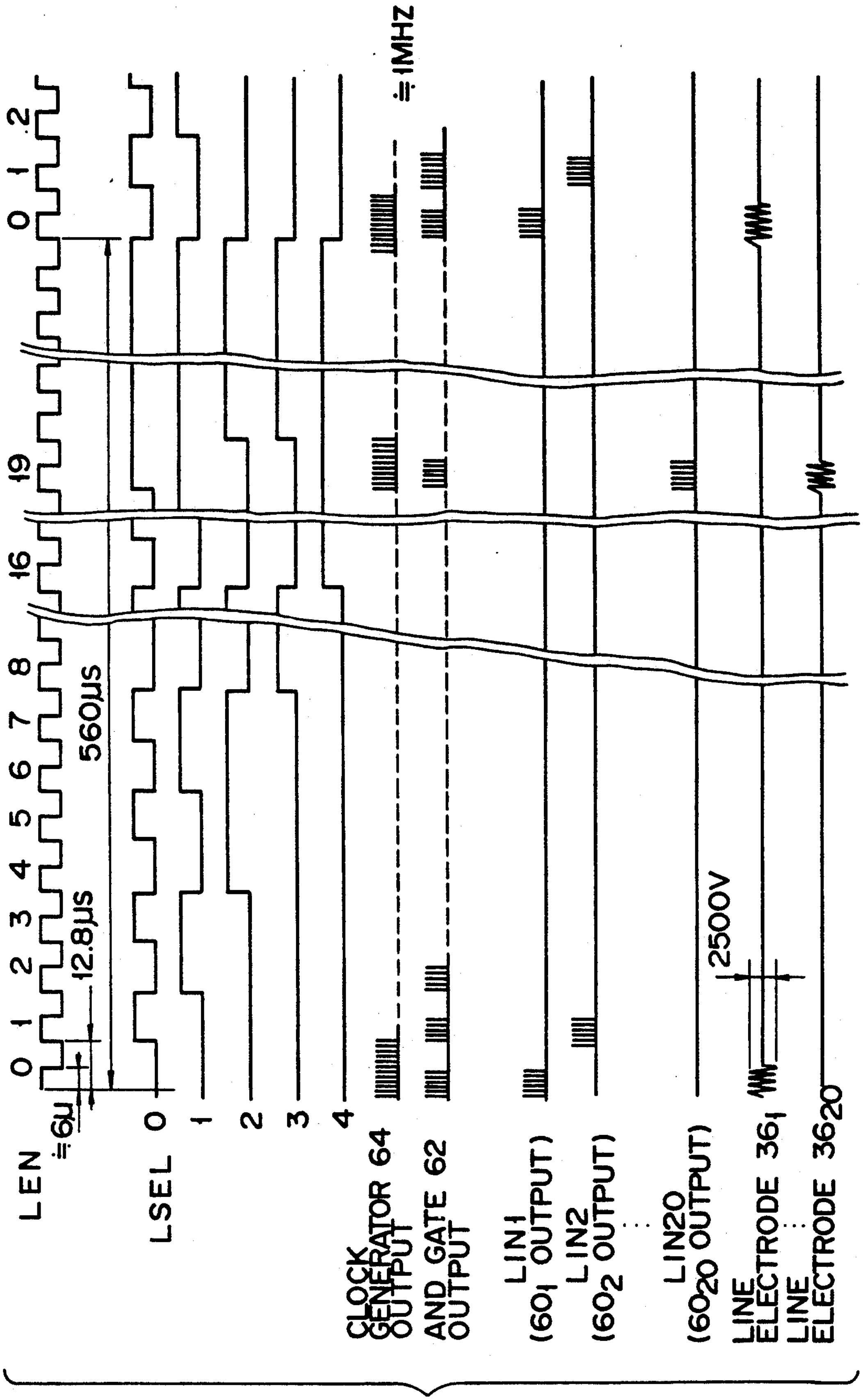
FIG. 8 is a timing chart showing waveforms of the respective parts shown in FIGS. 3 and 5.

FIG. 8 is a timing chart showing the individual signals and outputs. The timing signal LEN has a pulse width of about 6 μSEC. and a period of 12.8 μSEC. For example, when all of the line select signals LSEL0 to LSEL4 are at level "LOW", only the AND gate $60_1$ is selectively enabled by the decoder 58. At this time, an intermittent signal of the 1-MHz internal clock is output from the output terminal of the AND gate 62 in synchronism with the timing signal LEN, and the input signal LIN1 is supplied to only the source drive circuit $66_1$. Similarly, when the line select signal LSEL0 is at "HIGH" and the signals LSEL1 to LSEL4 are at "LOW", the gate for only the source drive circuit $66_2$ is enabled. In this manner, the input signals LIN1 to LIN20 are sequentially applied to the source drive circuits $66_1$ to $66_{20}$, respectively.

After the input signal LIN20 is supplied to the source drive circuit $66_{20}$ (i.e., when 256 μSEC. elapse after the input signal LIN1 is supplied), all of the line select signals LSEL0 to LSEL4 are at level "HIGH" for 254 μSEC. At this time, the decoder 58 sets the levels of all of the select signals SEL1 to SEL20 at "LOW", and the AND gates $60_1$ to $60_{20}$ are all disabled. Thereafter (i.e., when 510 μSEC. elapse after the input signal LIN1 is supplied), all of the line select signals LSEL0 to LSEL4 are returned to level "LOW". Subsequently, the above operation is repeatedly performed.

When all of the line select signals LSEL0 to LSEL4 are at level "LOW", the input signal LIN1 of "HIGH" is supplied to the input terminal 84 shown in FIG. 5. This input signal LIN1 is applied to the gate of the FET Q1 to perform a switching operation. As a result, the static induction transistor Q2 is turned on. When the input signal LIN1 is at "LOW", on the other hand, the static induction transistor Q2 is turned off.

In this manner, when the signal LIN1 (1-MHz intermittent signal) shown in FIG. 5 is input to the source drive circuit $66_1$, the static induction transistor Q2 performs the switching operation. As a result, a voltage is supplied to the parallel resonator constituted by the coil $L_C$ and the line electrode capacitance $C_L$ set in accordance with the above equations (1) and (2) to start resonance, thereby obtaining an output for ion generation.

Figure 9B:
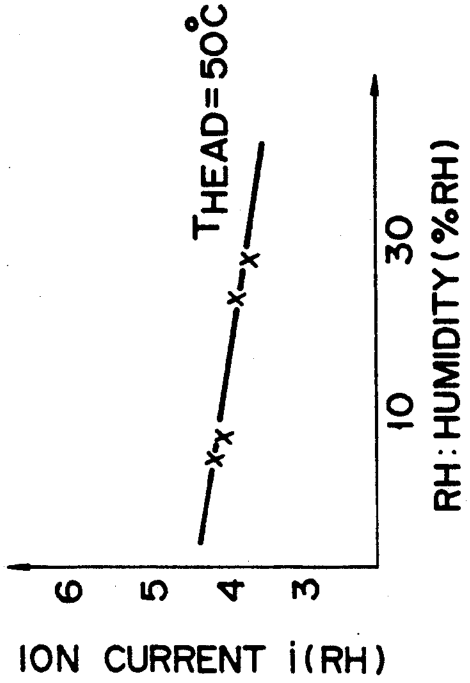
FIG. 9B is a graph showing a relationship of an change in ion amount generated in the ion generator with respect to a variation in humidity near the ion generator.
Figure 9A:
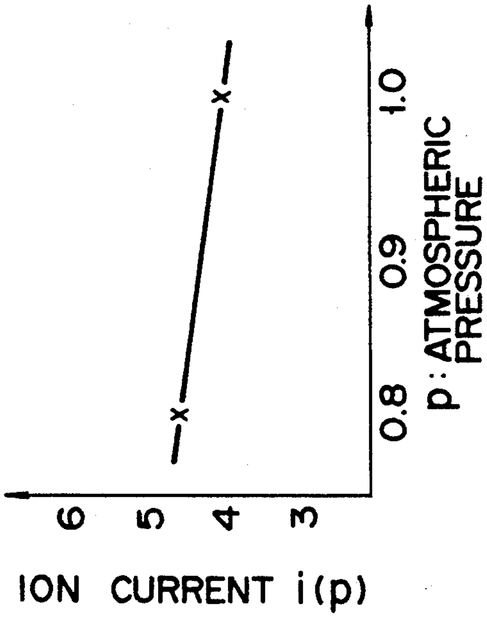
FIG. 9A is a graph showing a relationship of a change in ion amount generated in the ion generator with respect to a variation in atmospheric pressure near the ion generator.

As shown in FIGS. 9A and 9B, the ion amount generated in the ion generator holes varies due to the environmental conditions near the ion generator 10, i.e., the atmospheric pressure and the humidity even if the application energy (voltage) remains the same. In other words, variations in atmospheric pressure and humidity near the ion generator vary the ion amount generated in the ion generator and therefore an output image density of the image forming apparatus. To prevent this, the application voltage (Vrf) to be applied to the line electrodes must be controlled as shown in FIG. 9C in accordance with the variations in atmospheric pressure and humidity.

The voltage Vrf can be controlled to have a proper value in accordance with the environmental conditions of the ion generator 10 by changing only the duty of the input signal LIN1 supplied to the input terminal of the switching circuit constituted by the high-voltage power source, the static induction transistor, and the coil on the basis of certain conditions without changing the frequency of the signal LIN1.

Figure 9D:
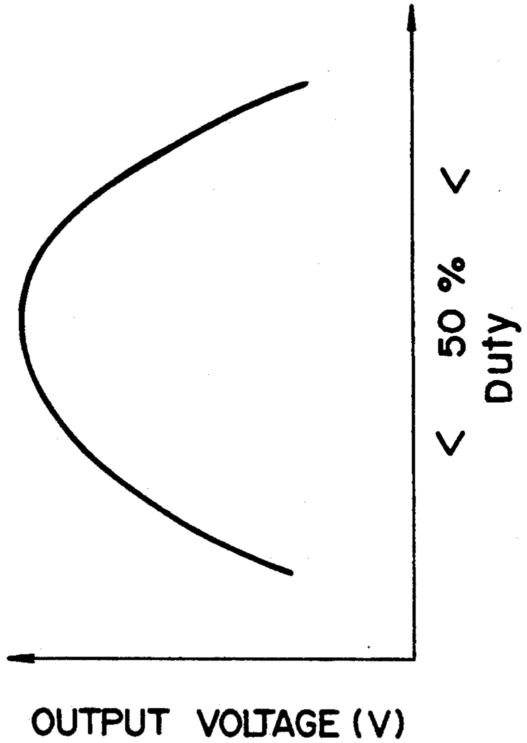
FIG. 9D is a graph showing a relationship between the duty of an input signal and an output voltage of a switching circuit.
Figure 9C:
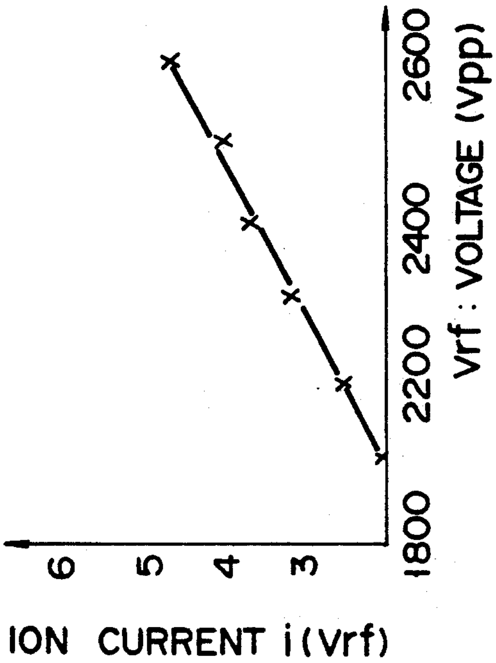
FIG. 9C is a graph showing a relationship between an application voltage (Vrf) to be applied to a line electrode and an ion amount generated in the ion generator.

FIG. 9D is a graph showing a relationship between the duty of the input signal LIN1 and the output voltage of the switching circuit as described above. These output characteristics are obtained because the switching circuit forms an L-C resonator. That is, when only the duty of a signal to be applied to the resonator is changed, harmonic components of the input signal are changed while the fundamental frequency of the signal is kept unchanged. Therefore, energy stored in the L-C parallel resonator changes to change the resonant voltage, thereby changing the output voltage of the switching circuit. In other words, since the L-C parallel resonator serves as a bandpass filter and the output from the resonator is a total sum of filtered components of fundamental frequency and harmonic components of the input signal LIN1, the output voltage of the L-C resonator can be changed by changing the duty of the input signal to change its high frequency component.

On the basis of this principle, the variable duty clock generator 64 is provided to control the voltage to be supplied to the ion generator.

Figure 10:
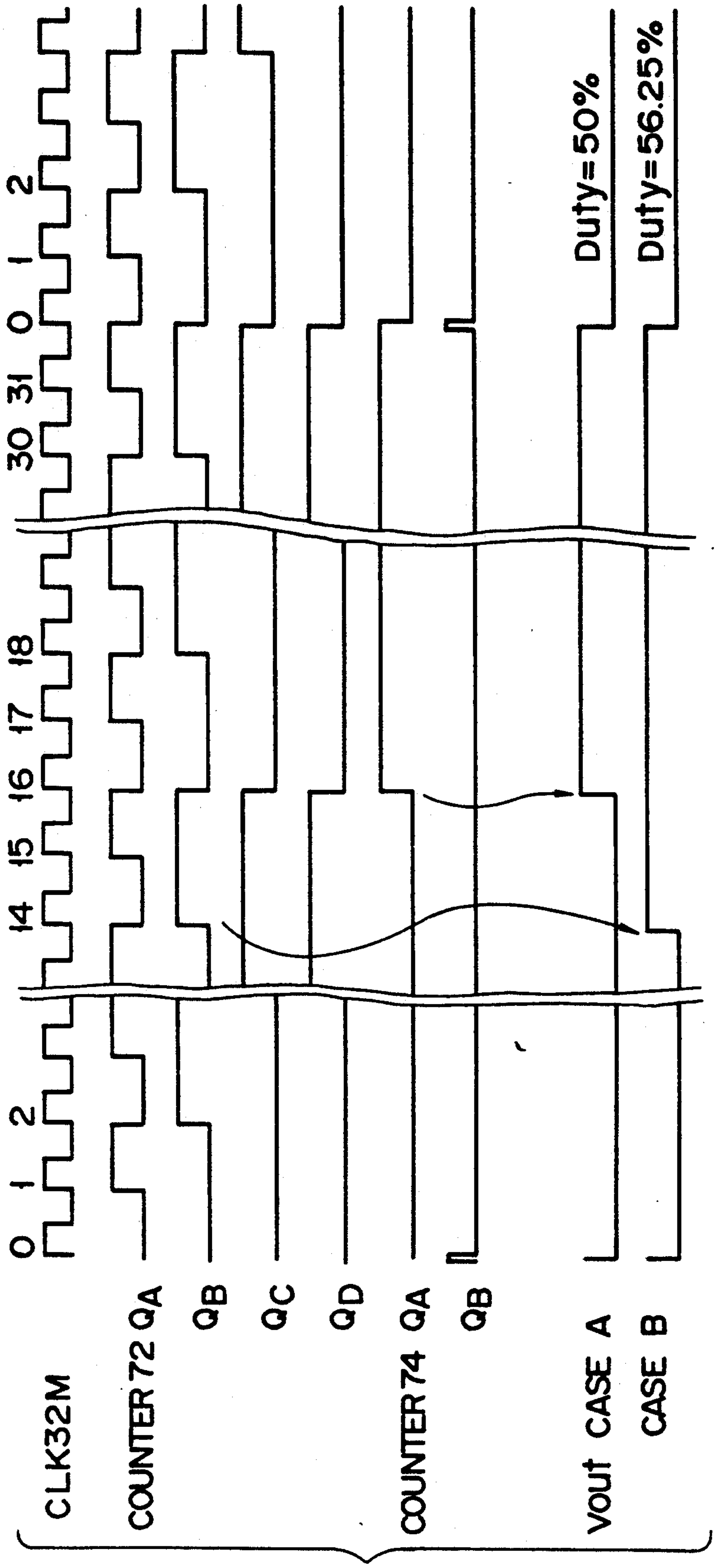
FIG. 10 is a timing chart showing operation timings of the variable duty clock generator in FIG. 4.

FIG. 10 is a timing chart showing an operation of the variable duty clock generator 64 shown in FIG. 4. Referring to FIG. 10, when the clock CLK32M synchronized with the signals LSEL and LEN is input to the cascade-connected counters 72 and 74, signals obtained by frequency-dividing the clock CLK32M by 2, 4, 8, 16, and 32 are output from the terminals $Q_A$, $Q_B$, $Q_C$, and $Q_D$ of the counter 72 and the terminal $Q_A$ of the counter 74, respectively.

Assume that all of the duty control signals DCON0 to DCON3 are at level "HIGH" and only the duty control signal DCON4 is at level "LOW" (case A). In this case, the terminal $Q_A$ of the counter 74 goes "HIGH" at the 17th pulse of the clock CLK32M, and an output from the NAND gate 78 goes "LOW". As a result, the RS flip-flop 80 is set to have an output at level "HIGH". Subsequently, the output $Q_B$ from the counter 74 goes "HIGH" at the 32nd pulse of the clock CLK32M, and the counters 72 and 74 are cleared. In addition, the RS flip-flop 80 is cleared to have an output at level "LOW". Thereafter, the same operation is repeatedly performed. When the duty control signals DCON0 to DCON4 are set in this manner, a 1-MHz clock having a duty of 50% can be obtained.

Assume that the duty control signals DCON0 and DCON4 are at level "HIGH" and the duty control signals DCON1 to DCON3 are at level "LOW" (case B). In this case, the terminals $Q_B$, $Q_C$, and $Q_D$ of the counter 72 go "HIGH" at the 15th pulse of the clock CLK32M, and the output from the NAND gate 78 goes "LOW". As a result, the RS flip-flop 80 is set to have an output at level "HIGH". Subsequently, as in the above case A, the counters 72 and 74 and the RS flip-flop 80 are cleared at the 32nd pulse of the clock CLK32M, and the output returns to "LOW". Thereafter, this operation is repeatedly performed. By setting the duty control signals DCON0 to DCON4 as described above, a 1-MHz clock having a duty of 56.25% can be generated.

As a result, as is apparent from FIG. 9D, a relationship between the voltage Vrf (50%) obtained when the duty is 50% and the voltage Vrf (56.25%) obtained when duty is 56.25% is given as follows:

$$Vrf\,(50\%) \geqq Vrf\,(56.25\%) \quad (3)$$

That is, by arbitrarily switching the duty control signals DCON, a desired duty can be supplied to the input terminal of the switching circuit to control the output voltage (Vrf) of the switching circuit.

Figures 11, 12:
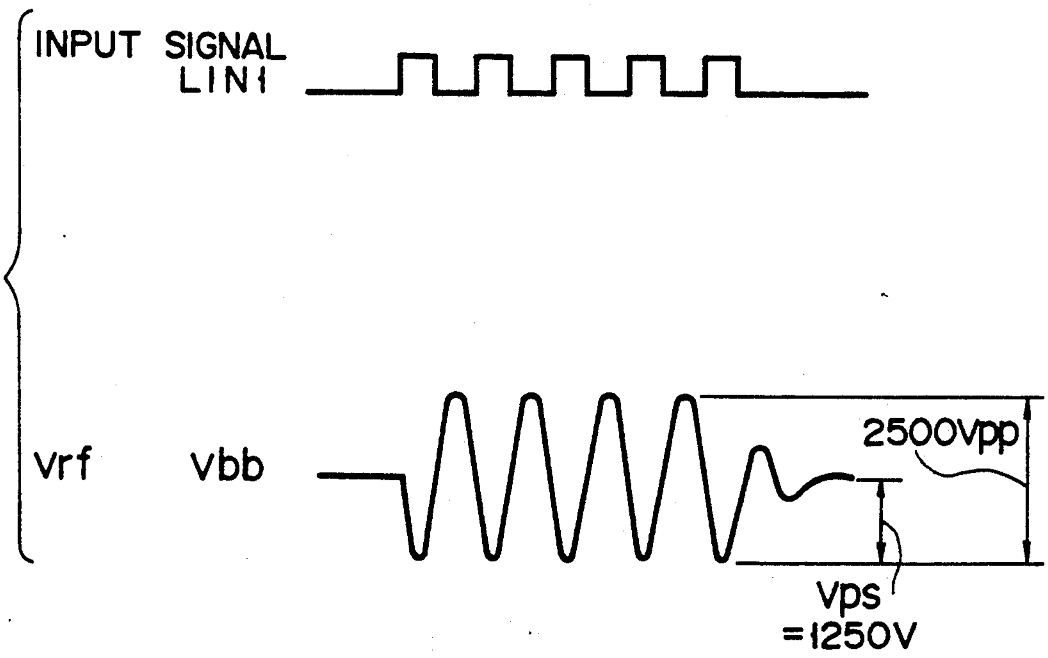
FIG. 11 is a table having the atmospheric pressure and the relative humidity near the ion generator as parameters and used to determine the value of a duty control signal.
FIG. 12 is a view showing waveforms of a source drive circuit input signal and an ion generator driver output.

The process controller 52 determines the values of the duty control signals DCON to obtain values of the voltage Vrf described in the table shown in FIG. 11 having the atmospheric pressure, the (relative) humidity, and the like near the ion generator as parameters.

As described above, the correction of the ion generation amount can be performed by detecting the environmental conditions near the ion generator. Therefore, a proper image density can be constantly output even if the environmental conditions vary.

In addition, since the control of the output voltage from the switching circuit is performed by switching between the digital circuits where almost no current flows, no stress is applied on circuit parts unlike variable resistors used in conventional circuits. Therefore, the output voltage can be controlled without degrading the reliability of the circuit parts, and the power capacities of the parts can be decreased to realize a low cost.

FIG. 12 shows a relationship between the input signal LIN1 (duty=50%) of the source drive circuit $66_1$ and the output Vrf from the switching circuit $68_1$. FIG. 12 indicates that an amplitude ($2\times Vps=2{,}500$ Vpp) which is twice that of the DC high-voltage power source 70 (1,250 V) can be obtained as the output.

By applying the obtained RF high voltage (2,500 V, 1 MHz) to the line electrode $36_1$, ions can be generated in the corresponding small hole 38a of the finger electrode $38_1$. At this time, if the switching terminal c of the switch 86 is switched to the connection terminal b side, an ion flow barrier electric field is formed in the small hole 38a and the small hole 40a of the screen electrode 40. Therefore, no ion flow reaches the dielectric drum 12 through the small hole 40a. On the other hand, if the switching terminal c of the switch 86 is switched to the connection terminal a side, the existing barrier electric field disappears, and an ion flow (negative ions) reaches the dielectric drum 12. In this manner, a desired image can be formed by controlling the ion flow.

Thereafter, when the input signal LIN1 disappears, the switching operation of the static induction transistor Q2 is finished, and no more output is supplied.

By using the ion generator driver having the above arrangement, a proper amount of ions can be constantly generated in the ion generator even if the environmental conditions near the ion generator, e.g., the atmospheric pressure and the humidity vary. Therefore, an image forming apparatus capable of constantly outputting an image having a proper image density even if variations are present in, e.g., atmospheric pressure and humidity can be provided.

In a conventional ion generator drive circuit, a considerably high voltage is applied to an ion generator in order to obtain a sufficient amount of ions required for image formation even in an environment where ions are most difficult to generate. That is, a voltage to be applied to the head is determined to b Vrf0 so as to obtain sufficient ions when the atmospheric pressure is 1 atm. and the humidity is 30% RH. On the other hand, although Vrf1 (Vrf0>Vrf1) is enough to obtain a sufficient image density at an atmospheric pressure of 0.8 atm. and a humidity of 5% RH, an unnecessarily high voltage Vrf0 is constantly applied. According to the present invention, however, since a sufficient amount of ions can be obtained without supplying an excessively high voltage, no extra stress is applied on the ion generator unlike in conventional apparatuses. Therefore, the life of the ion generator is not unnecessarily shortened to realize a long life and high reliability of the ion generator.

As is apparent from the waveform of the output voltage Vrf shown in FIG. 12, the output (Vps) from the DC high-voltage power source 70 need only be ½ the voltage to be applied to the line electrode $36_1$. For example, to apply 2,500 V to the line electrode $36_1$, the output voltage from the DC high-voltage power source 70 need only be 1,250 V. During resonation, since the impedance of the $L_C$-$C_L$ parallel resonator viewed from the DC high-voltage power source 70 is very high, almost no current is supplied from the power source 70. In this embodiment, therefore, the output voltage from the power source 70 can be suppressed to be a comparatively low voltage, and the output current capacity can be decreased. In addition, since the static induction transistor is of a depletion type, a reverse bias power source is required to operate the transistor when the transistor is source-grounded. However, when the static induction transistor is gate-grounded and cascade-connected to the field-effect transistor, no reverse bias power source is necessary and the arrangement of the switching circuit is simplified. Therefore, since the power capacity of the DC high-voltage power source 70 can be decreased and no reverse bias power source is required, a small size and a low manufacturing cost can be advantageously realized.

The switching circuits are connected to the common DC high-voltage power source 70, and the signals LIN1 to LIN20 as inputs of the source drive circuits have the same frequency and duty. Since the coil $L_C$ used as the inductance component in this embodiment has a very simple structure as compared with that of an oscillation transformer used in conventional apparatuses, variations in characteristics caused by manufacturing steps such as a manner of winding a wire can be largely reduced by the use of the coil. Variations in output waveforms (e.g., an amplitude, a leading edge, and a trailing edge) between the switching circuits can be very small because, e.g., the static induction transistor Q2 and FET Q1 are used in a saturation region and the switching rates of the transistors Q2 and Q1 are very high. Therefore, since an equal burst-like high-voltage RF can be applied to any line electrode, a high-quality image free from irregularities can be obtained as an output image.

In addition, unlike in a conventional self-excited oscillation (resonation) system, the static induction transistor Q2 operates in the saturation region. Therefore, an output drift caused by temperature rise in the semiconductor device can be largely decreased to obtain a stable operation with respect to temperature.

In the image forming apparatus according to this embodiment, in order to increase a printing speed, the same amount of ions as that before the printing speed is increased must be generated within a shorter time period. In order to increase the printing speed, therefore, it is necessary to (A) increase the frequency of an output or to (B) shorten rise and fall times (margin time) of the output voltage not contributing to ion generation.

In order to increase the output frequency described in item (A) above, the frequency of an input signal to the switching circuit is increased, and the inductance of the coil is decreased. The inductance of the coil can be easily decreased by decreasing the number of turns of the coil because a boosting ratio is not a problem in the case of a coil unlike in an oscillation/resonation transformer.

Figure 13:
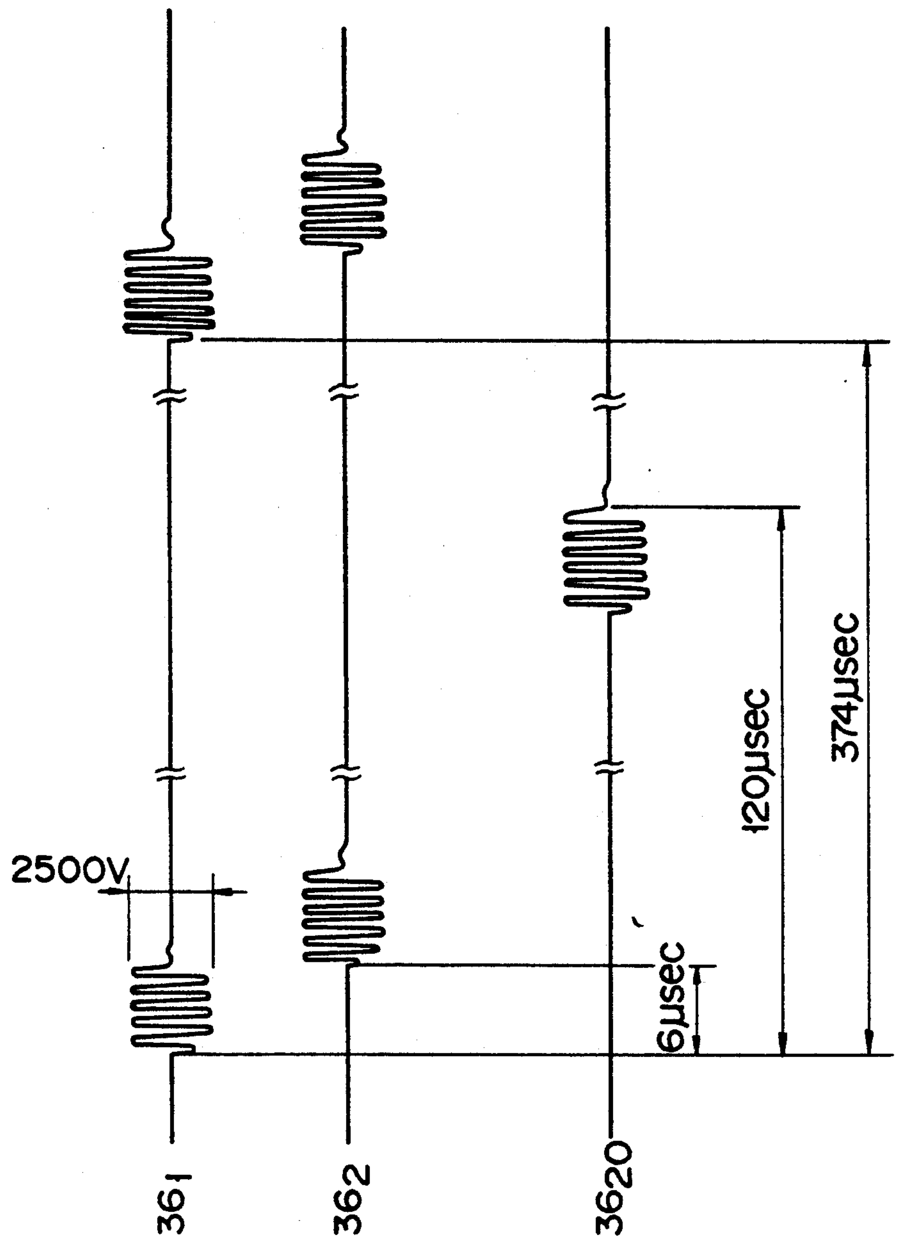
FIG. 13 is a view showing voltage waveforms applied to the first to 20th line electrodes when an operating speed is increased.

The reduction in margin time described in item (B) above is achieved by largely shortening the rise and fall times in the above embodiment. In the conventional self-excited oscillation system, about 6 μSEC. are required as the rise and fall times. Therefore, in order to prevent a crosstalk between line electrodes, a voltage is applied to the (n+1)th line electrode at least 12.8 μSEC. after the voltage is applied to the nth line electrode. That is, at least 12.8 μSEC. (when an ion generation time is 6 μSEC.) are required for each line. In this embodiment, as indicated by the waveform of the output voltage Vrf shown in FIG. 12, the rise and fall times can be largely reduced because a high voltage is directly switched by the static induction transistor Q2 having a sufficiently high switching rate. Therefore, the conventionally required margin time (=about 6 μSEC.) can be largely shortened, and a time required for one line can be reduced to be a maximum of 6 μSEC. as shown in FIG. 13. Therefore, the operation speed can be increased by about a maximum of 36% as compared with the conventional system.

Figure 14:
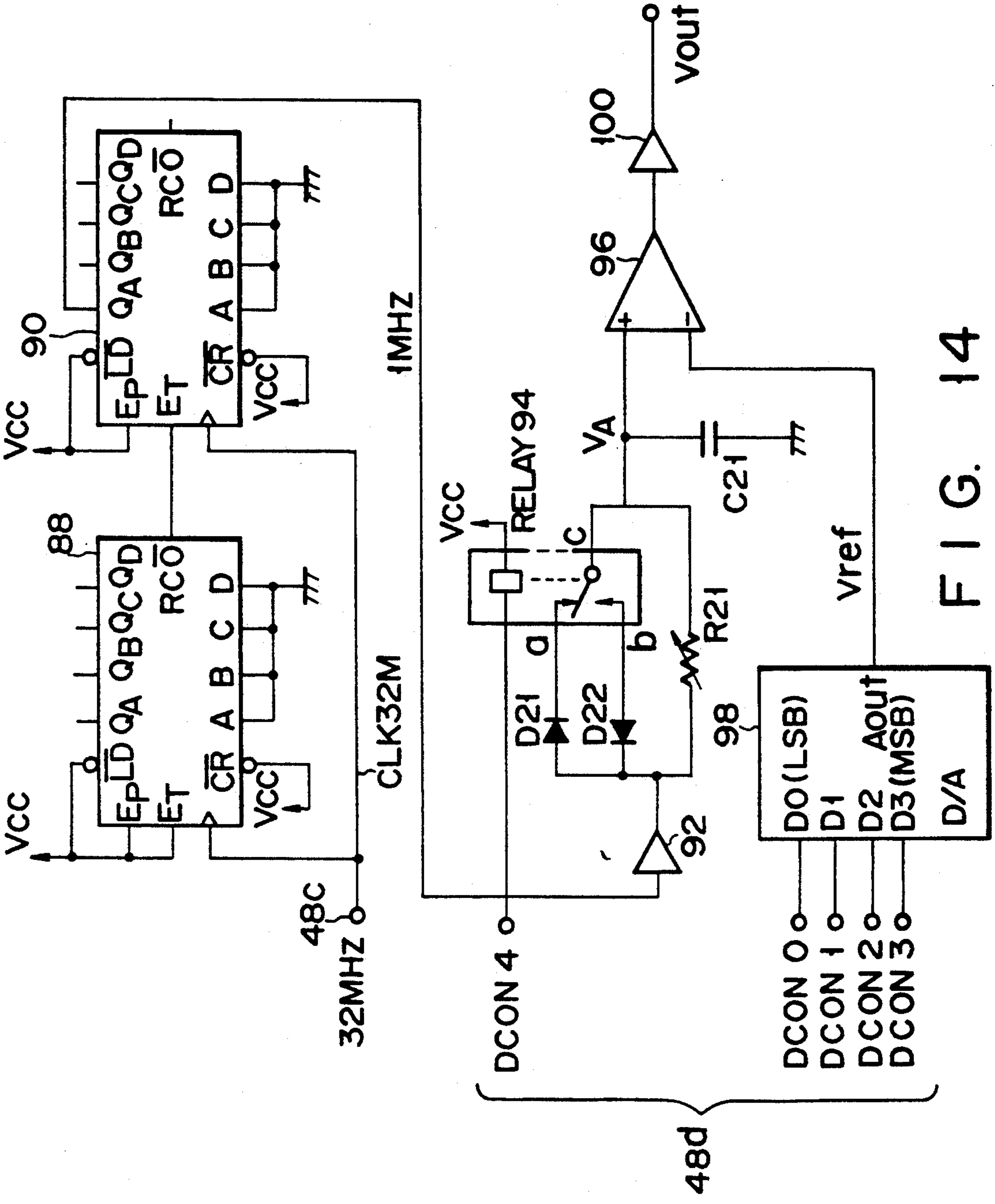
FIG. 14 is a circuit diagram showing a variable duty clock generator according to the second embodiment of the present invention.

FIG. 14 shows the second embodiment of the present invention having a clock generator capable of varying a duty by a method different from that of the variable duty clock generator 64 shown in FIG. 4 Referring to FIG. 14, a deskew circuit 46 supplies a clock CLK32M synchronized with signals LSEL and LEN to an input terminal 48*c*. This clock CLK32M is supplied to the clock input terminals of cascade-connected counters 88 and 90. A carrier output RCO from the counter 88 is supplied to an enable terminal $E_T$ of the counter 90. An input terminal $E_T$ of the counter 88 and input terminals $E_P$, $\overline{LOAD}$ ($\overline{LD}$), and $\overline{CR}$ of the counters 88 and 90 are pulled up to Vcc, and data input terminals A, B, C, and D are grounded.

A count output terminal $Q_A$ of the counter 90 for outputting a signal obtained by frequency-dividing the clock CLK32M by 32 is connected to the input terminal of a buffer 92. The output terminal of the buffer 92 is connected to the anode of a diode D21, the cathode of a diode D22, and one terminal of a variable resistor R21. The cathode of the diode D21 is connected to a connection terminal a of a relay 94, and the anode of the diode D22 is connected to a connection terminal b of the relay 94. A switching terminal c of the relay 94 is connected to the other terminal of the variable resistor R21 and to a capacitor C21 and the positive input terminal of a comparator 96. The switching terminal c of the relay 94 is connected to the connection terminal a when a duty control signal DCON4 input from a process controller 52 via an I/O unit 56 is at level "HIGH" and is connected to the connection terminal b when the signal DCON4 is at level "LOW".

Other duty control signals DCON0 to DCON3 are input from the process controller 52 to input terminals D1, D1, D2, and D3 of a D/A converter 98 via the I/O unit 56. An analog output terminal Aout of the D/A converter 98 is connected to the negative input terminal of the comparator 96. A signal output from the analog output terminal Aout is denoted by Vref. The output terminal of the comparator 96 is connected to the input terminal of a buffer 100, and an output from the buffer 100 is supplied as Vout to the next stage.

Figure 15:
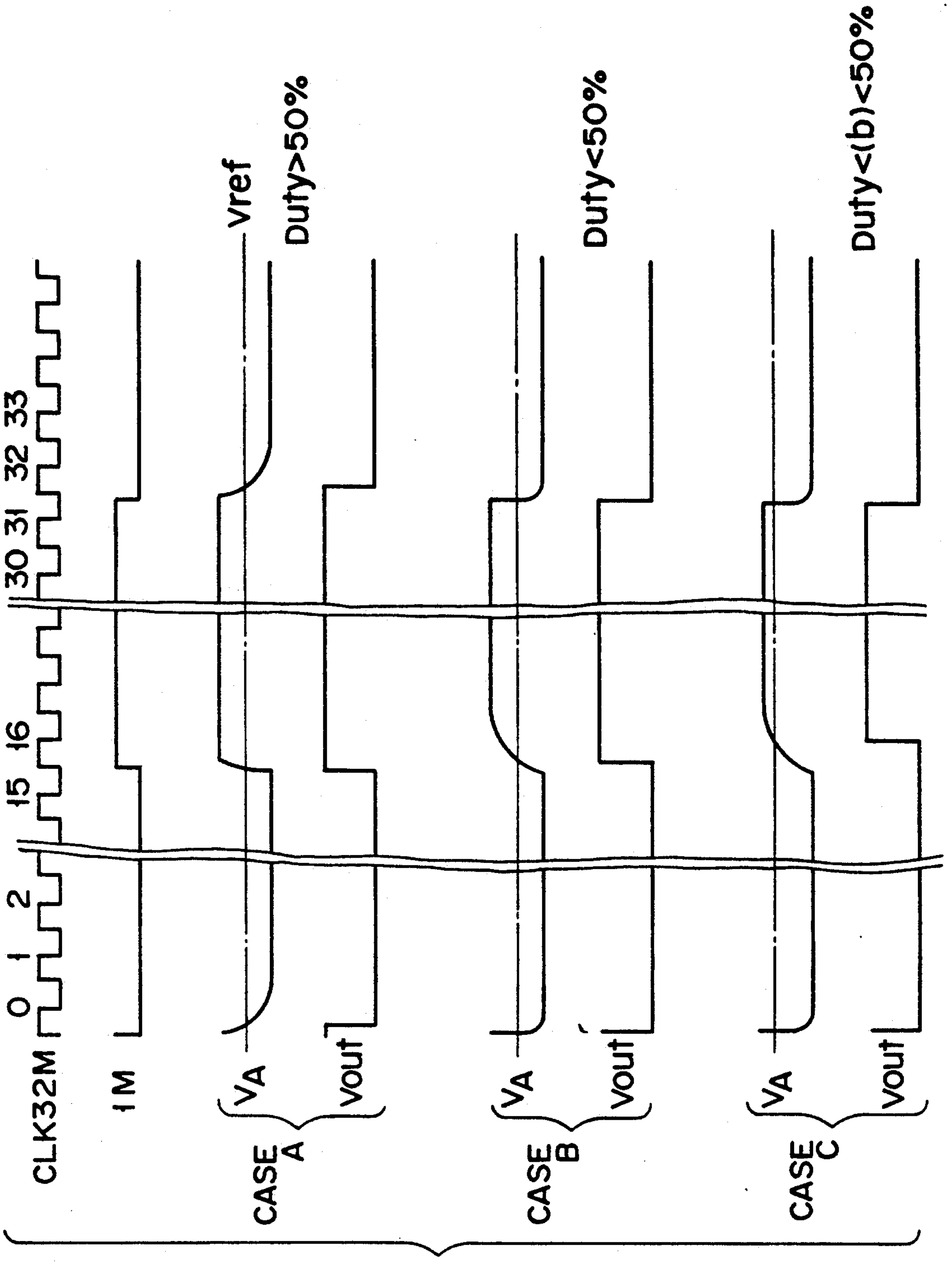
FIG. 15 is a timing chart showing operations of the circuit shown in FIG. 14.

FIG. 15 is a timing chart showing an operation of the variable duty clock generator 64 having the above arrangement. The clock CLK32M is supplied to the input terminal 48*c* and frequency-divided by the counters 88 and 90 to form a 1-MHz signal. This 1-MHz signal is input to an integrating circuit constituted by the diodes D21 and D22, the variable resistor R21, the capacitor C21, and the relay 94 via the buffer 92. $V_A$ as an output voltage from the integrating circuit is supplied to the comparator 96. An analog signal Vref of the D/A converter 98 corresponding to the duty control signals DCON0 to DCON3 is also supplied to the comparator 96. The comparator 96 compares $V_A$ with Vref to obtain an output Vout.

If the duty control signal DCON4 is set at level "HIGH" and the switching terminal c of the relay 94 is connected to the connection terminal a, an integral output $V_A$ as indicated by case A in FIG. 15 is obtained. The comparator 96 compares $V_A$ with Vref indicated by an alternate long and short dashed line to obtain the output Vout. In this case, since the diode D21 bypasses the resistor R21 to charge the capacitor C21, the time constant is very small, and therefore the rise time of the integral output $V_A$ is very short. On the contrary, when the capacitor C21 is discharged, since no bypath can be obtained by the diode D22, the value of the time constant becomes R21×C21, and the trailing edge of the integral output $V_A$ is less steep. By inputting the integral output $V_A$ to the comparator 96, Vout (duty≧50%) in the case A shown in FIG. 15 can be obtained.

If the duty control signal DCON4 is set at "LOW" and the switching terminal c of the relay 94 is connected to the connection terminal b, Vout in which duty D≦50% is obtained as in the case B shown in FIG. 15.

In addition, Vref as the output from the D/A converter 98 is increased by increasing the values of the duty control signals DCON0 to DCON3 represented by 4-bit binary numbers. In this case, the duty D of the Vout is D≦case B≦50% as indicated by the case C in FIG. 15, i.e., the duty is decreased from that in the case B.

As described above, when the circuit having the above arrangement is used as the variable duty clock generator, the duty of the input signal to the static induction transistor switching circuit can be freely controlled by controlling the duty control signals DCON0 to DCON4 as in the first embodiment.

In the second embodiment, the resistance of the variable resistor R21 is changed to change the time constant of the integrating circuit, thereby changing the duty of the input signal to the static induction transistor switching circuit. However, the same effect can be obtained by changing the capacitance of the capacitor C21. In addition, the same effect can be obtained by changing the reference voltage Vref of the comparator 96.

Figure 16:
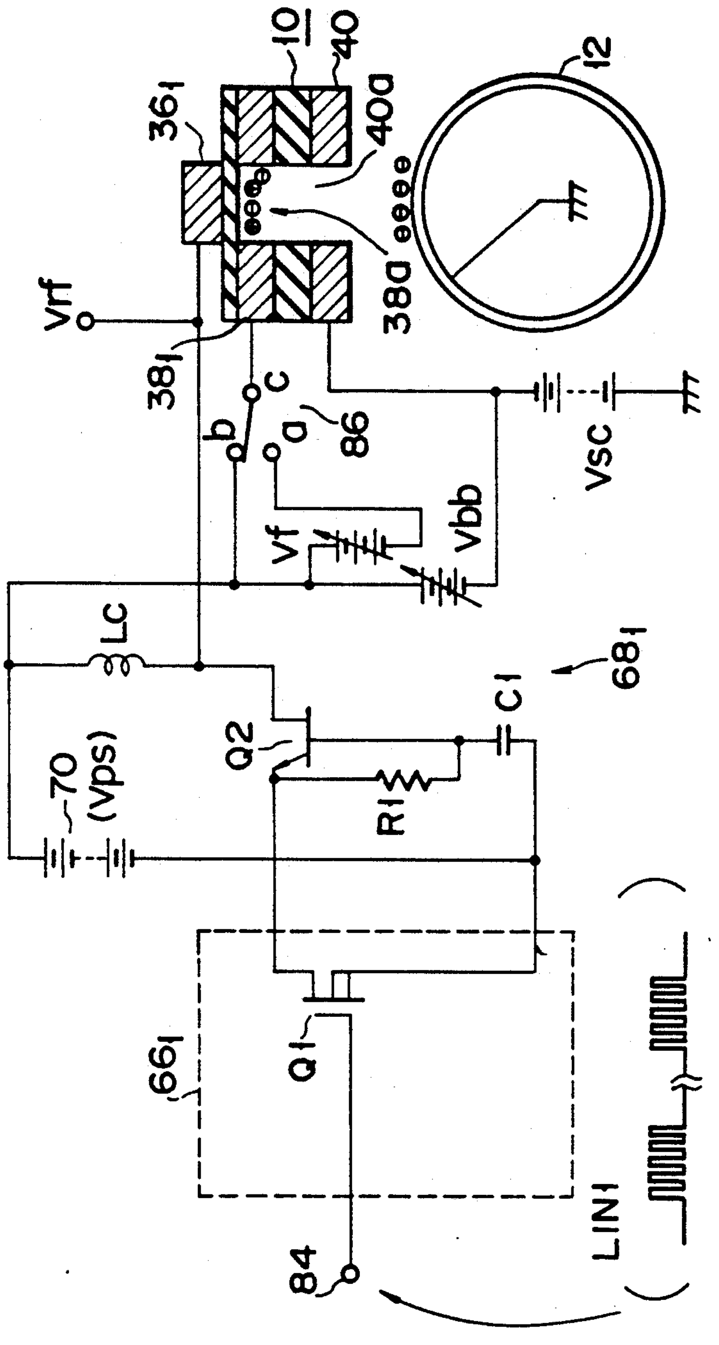
FIG. 16 is a circuit diagram showing a source drive circuit, a switching circuit, and a bias power source according to the third embodiment of the present invention together with a partial sectional view of an ion generator.

FIG. 16 shows another arrangement of switching circuits $68_1$ to $68_{20}$ according to the third embodiment of the present invention in correspondence with FIG. 5. Although only a source drive circuit $66_1$ and the switching circuit $68_1$ are illustrated in FIG. 16, the other source drive circuits $66_2$ to $66_{20}$ and switching circuits $68_2$ to $68_{20}$ have the same arrangement and illustration and description thereof will be omitted.

The third embodiment has the same arrangement as the circuit shown in FIG. 5 except for connection of a static induction transistor Q2. That is, the source of the static induction transistor Q2 is connected to the drain of an FET Q1 and to the gate of the static induction transistor Q2 via a resistor R1. The gate of the transistor Q2 is connected to the source of the FET Q1 and the negative terminal of a DC high-voltage power source 70 via a capacitor C1. The drain of the transistor Q2 is connected to the positive terminal of the power source 70 via a coil $L_C$ and a line electrode $36_1$ of an ion generator 10.

In this arrangement, similar to the circuit shown in FIG. 5, the static induction transistor Q2 is gate-grounded and cascade-connected to the FET Q1. Therefore, no reverse bias power source is required to simplify the arrangement of the switching circuit. Since the power capacity of the DC high-voltage power source 70 can be decreased and no reverse bias power source is necessary, a small size and a low manufacturing cost can be advantageously realized.

Figure 17:
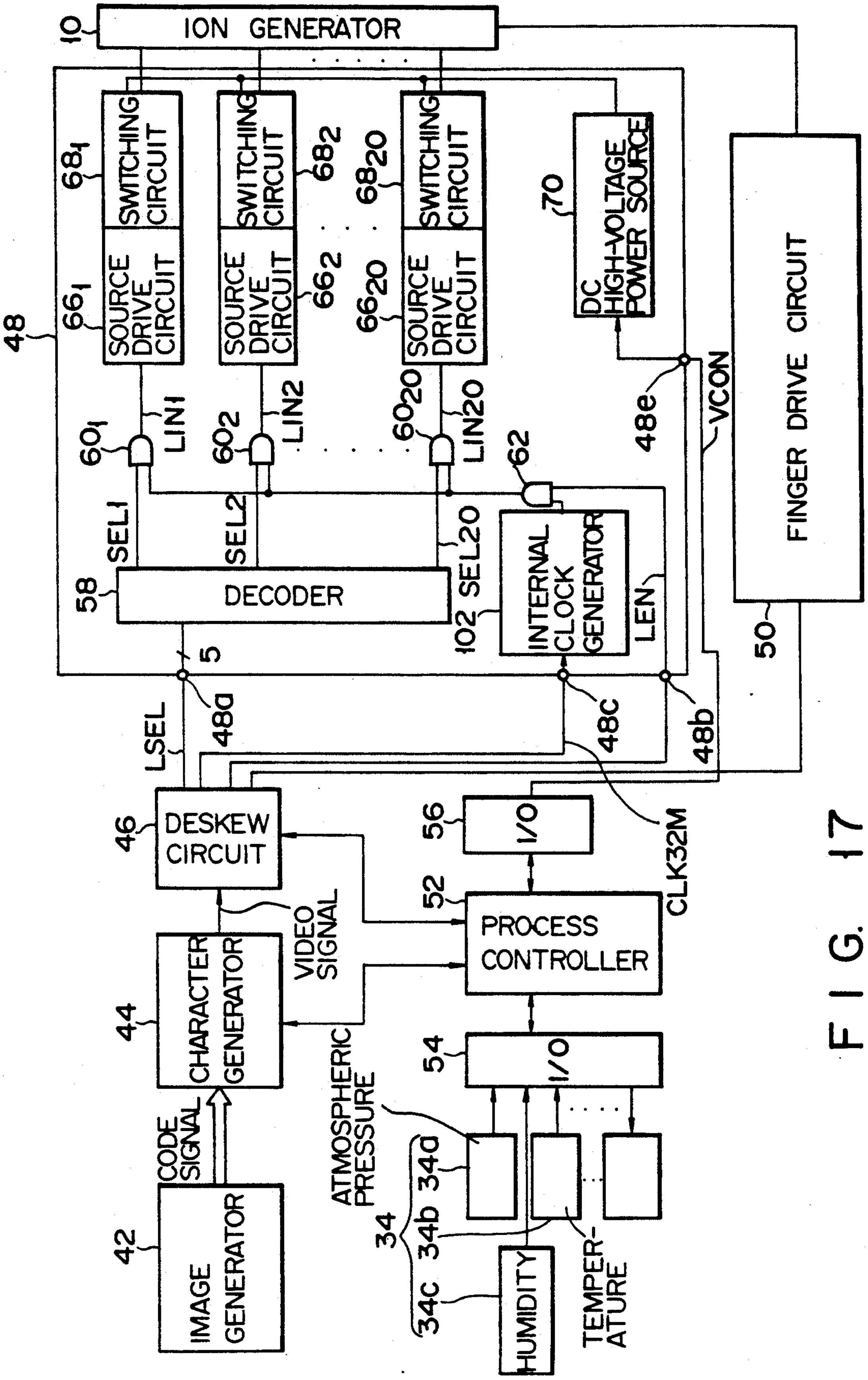
FIG. 17 is a block diagram showing an ion generator driver according to the fourth embodiment of the present invention.

FIG. 17 is a block diagram showing a circuit for driving an ion generator 10 according to the fourth embodiment of the present invention. Referring to FIG. 17, a code signal output from an image generator 42 such as a host computer is input to a character generator 44 and converted into a video signal. An electrode to be used for ion generation is selected by a deskew circuit 46 in accordance with this video signal, a line electrode select signal LSEL constituted by five bits of LSEL0 to LSEL4 is output at a timing corresponding to the video signal to a line drive circuit 48 in order to select a corresponding line electrode 36, and a finger select signal is output to a finger drive circuit 50.

In addition to the line select signal LSEL, a signal LEN (pulse width=6 μSEC., period=12.8 μSEC.) indicating a timing of applying a voltage to the line electrode 36 and a 32-MHz clock CLK32M synchronized with the signals LSEL and LEN are output from the deskew circuit 46 to the line drive circuit 48 in accordance with an image signal to be output.

A process controller 52 controls individual sections (not shown) of this image forming apparatus to control an image formation process while communicating with the character generator 44 and the deskew circuit 46. In addition, the process controller 52 fetches outputs from, e.g., an atmospheric pressure sensor *34a*, a temperature sensor *34b*, and a humidity sensor *34c* as an environment detecting element 34 arranged near the ion generator 10 via an I/O unit 54 constituted by a parallel latch circuit or an A/D converter. The controller 52 supplies a voltage control signal VCON having a certain value to an input terminal *48e* of the line drive circuit 48 in accordance with the fetched environment state signal. The input voltage control signal VCON is supplied to a DC high-voltage power source 70.

The line select signal LSEL is supplied from an input terminal *48a* of the line drive circuit 48 to a decoder 58, one of 20 outputs SEL1 to SEL20 is selected on the basis of the signal LSEL, and a logic level "HIGH" is output. Each of the outputs SEL1 to SEL20 is supplied to one input terminal of a corresponding one of AND gates $60_1$ to $60_{20}$.

The timing signal LEN is supplied to an input terminal *48b* of the line drive circuit 48. The clock CLK32M synchronized with the signals LSEL and LEN is supplied from the deskew circuit 46 to an input terminal *48c*. The clock CLK32M is supplied to an internal clock generator 102. The internal clock generator 102 is constituted by, e.g., a counter and frequency-divides the clock CLK32M by 32 to generate an internal clock of about 1 MHz to be used in the line drive circuit 48. The output terminal of the clock generator 102 and the input terminal *48b* of the line drive circuit 48 are connected to the input terminals of an AND gate 62. The output terminal of the AND gate 62 is connected to the other input terminals of the AND gates $60_1$ to $60_{20}$.

The output terminals of the AND gates $60_1$ to $60_{20}$ are connected to source drive circuits $66_1$ to $66_{20}$, respectively. The source drive circuits $66_1$ to $66_{20}$ drive static induction transistors Q2 constituting switching circuits $68_1$ to $68_{20}$ in accordance with the input signals LIN1 to LIN20, respectively. The switching circuits $68_1$ to $68_{20}$ are applied with a voltage from a common DC high-voltage power source 70 and connected to line electrodes $36_1$ to $36_{20}$ of the ion generator 10, respectively.

A voltage control signal VCON determined in the same manner as the duty control signal DCON in accordance with outputs from the environment detecting element 34, arranged in the vicinity of the ion generator 10, for detecting, e.g., a temperature, a humidity, and an atmospheric pressure is supplied from an input terminal *48e* to the DC high-voltage power source 70. In accordance with the voltage control signal VCON, the output voltage from the power source 70 is controlled to supply a voltage to the static induction transistor Q2 constituting each switching circuit.

Figure 18:
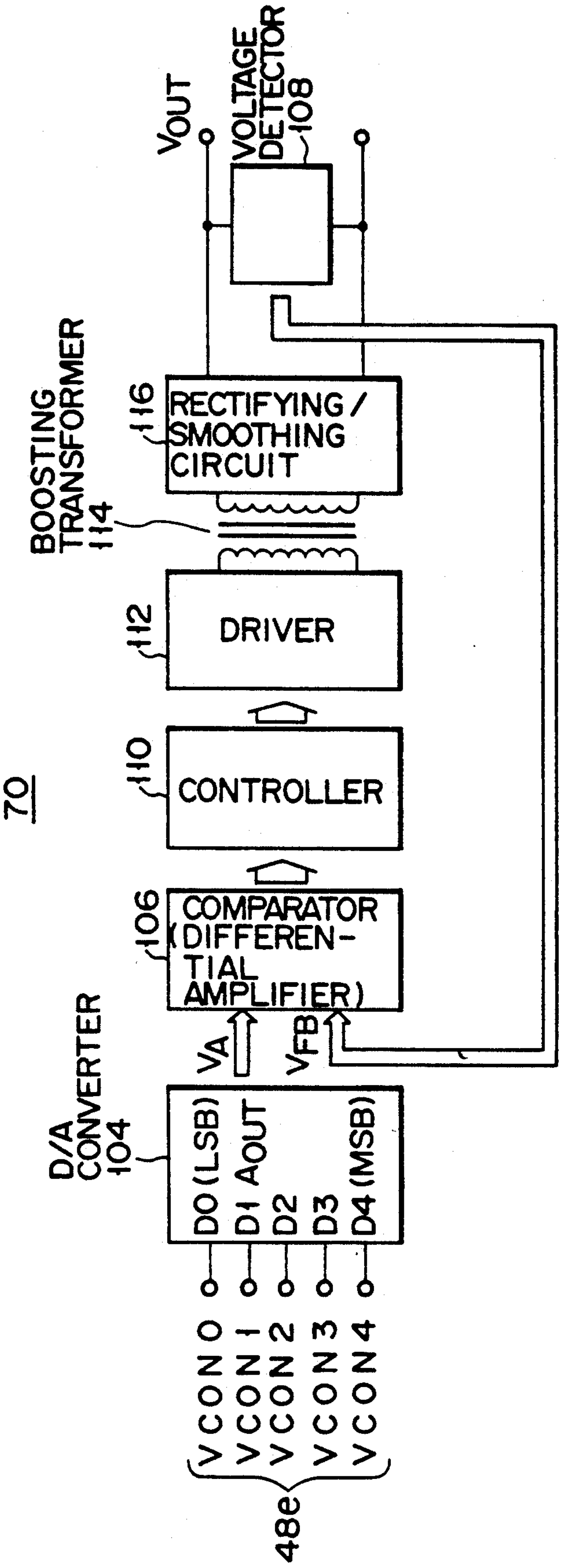
FIG. 18 is a block diagram showing a DC high-voltage power source according to the fourth embodiment.

FIG. 18 is a block diagram showing the DC high-voltage power source 70. The process controller 52 supplies voltage control signals VCON0 to VCON4 indicating the environmental conditions near the ion generator to the input terminal *48e*. The signals VCON1 to VCON4 are supplied to corresponding input terminals $D_0$ to $D_4$ of a D/A converter 104. An analog signal output $V_A$ from the D/A converter 104 is supplied to one input terminal of a comparator 106. A voltage detector 108 detects a high-voltage output and supplies it as a feedback voltage Vfb to the other input terminal of the comparator 106.

An output from the comparator 106 is supplied to a power source controller 110 in the next stage. The controller 110 supplies a drive signal to a driver 112 in accordance with the output from the comparator 106, and the driver 112 drives a boosting transformer 114. The voltage is rectified and smoothed by a rectifying/-smoothing circuit 116 at the output side of the transformer 114. The smoothed output is supplied as an output voltage of the DC high-voltage power source 70 to the switching circuits $68_1$ to $68_{20}$.

By using the DC high-voltage power source 70 having the above arrangement, a proper DC high voltage can be supplied to the switching circuits $68_1$ to $68_{20}$ by the voltage control signal VCON determined by the process controller 52 in accordance with the environmental conditions near the ion generator. As a result, the output voltage Vrf of the line drive circuit 48 is so controlled as to obtain a proper image density even when the environmental conditions vary, as in the first embodiment.

In each of the above embodiments, the switching circuit is constituted by the static induction transistor Q2 of a gate-grounded circuit type. However, the switching circuit may be constituted by a static induction transistor Q2 of a source-grounded circuit type.

Figure 19:
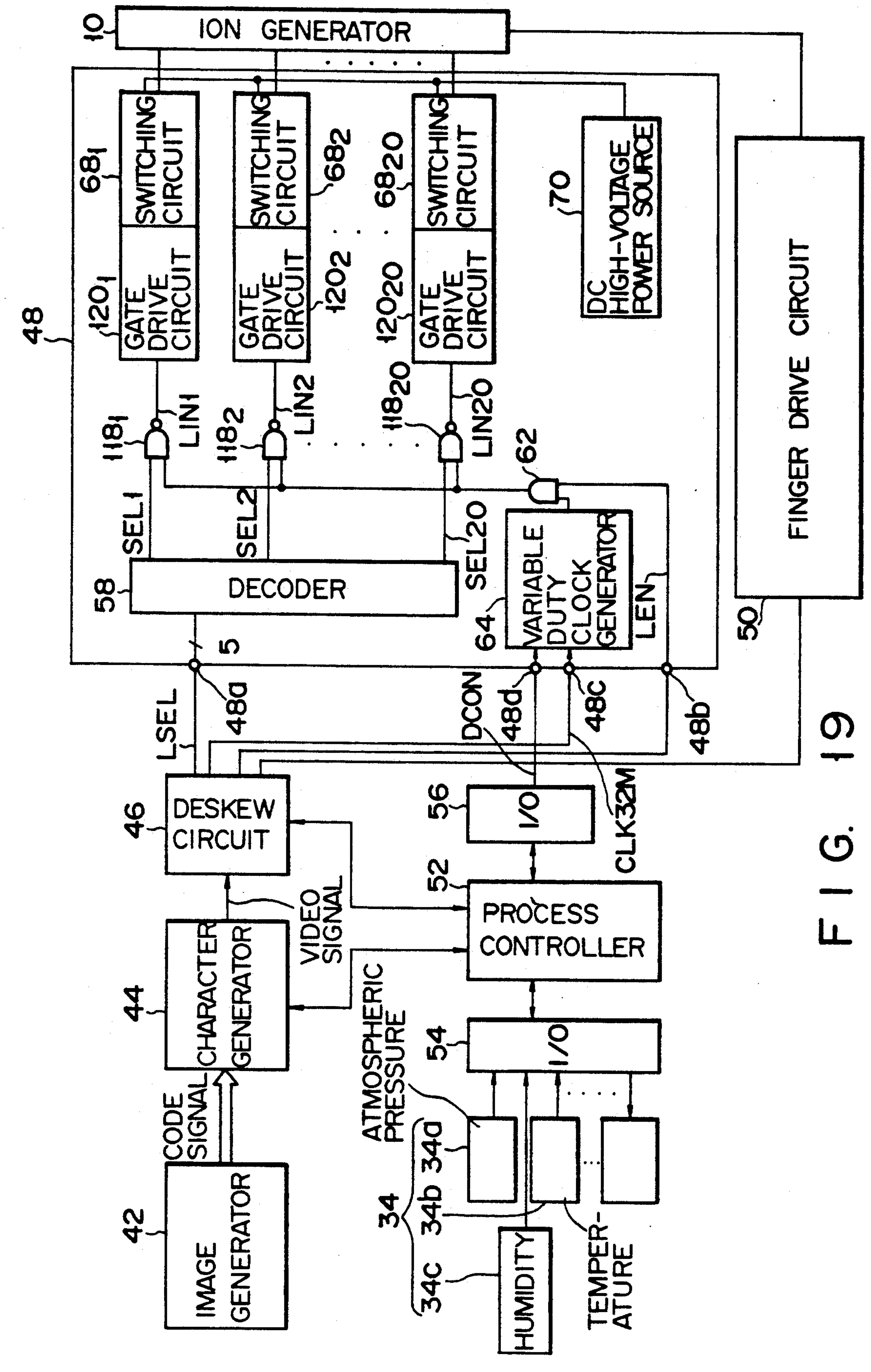
FIG. 19 is a block diagram showing an ion generator driver according to the fifth embodiment of the present invention.

FIG. 19 is a block diagram showing an arrangement of an ion generator driver of this type according to the fifth embodiment of the present invention. In the fifth embodiment, a line select signal LSEL supplied from a deskew circuit 46 to an input terminal 48*a* of a line drive circuit 48 is input to a decoder 58. The decoder 58 selects one of 20 outputs SEL1 to SEL20 on the basis of the input signal LSEL and outputs a logic level "HIGH". Each of the outputs SEL1 to SEL20 from the decoder 58 is connected to one input terminal of a corresponding one of NAND gates $118_1$ to $118_{20}$. A timing signal LEN supplied from the deskew circuit 46 to an input terminal 48*b* of the line drive circuit 48 is supplied to one input terminal of an AND gate 62.

A clock CLK32M supplied from the deskew circuit 46 to another input terminal 48*c* and a duty control signal DCON supplied from a process controller 52 to an input terminal 48*d* via an I/O unit 56 are supplied to a variable duty clock generator 64. As in the first embodiment, the variable duty clock generator 64 uses the input clock CLK32M to generate a line drive circuit internal clock of about 1 MHz in which a duty is controlled to be a certain value. The output from the clock generator 64 is supplied to the other input terminal of the AND gate 62. The output from the AND gate 62 is supplied to the other input terminals of the NAND gates $118_1$ to $118_{20}$.

Outputs from the NAND gates $118_1$ to $118_{20}$ are supplied to gate drive circuits $120_1$ to $120_{20}$, respectively. The gate drive circuits $120_1$ to $120_{20}$ drive static induction transistors constituting switching circuits $68_1$ to $68_{20}$ in accordance with input signals LIN1 to LIN20, respectively. The switching circuits $68_1$ to $68_{20}$ receive a voltage from a common DC high-voltage power source 70. The switching circuits $68_1$ to $68_{20}$ connected to line electrodes $36_1$ to $36_{20}$ of an ion generator 10, respectively.

Figure 20:
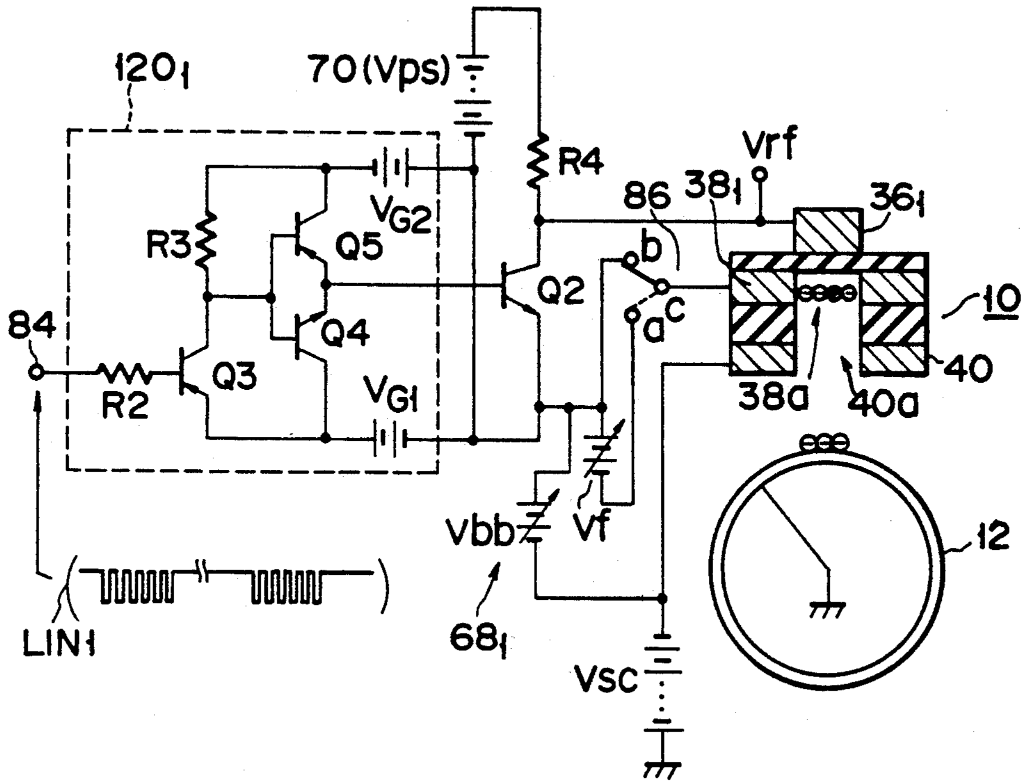
FIG. 20 is a circuit diagram showing a gate drive circuit, a switching circuit, and a bias power source according to the fifth embodiment of the present invention together with a partial sectional view of an ion generator.

FIG. 20 shows a circuit arrangement of the gate drive circuit $120_1$, the switching circuit $68_1$, and a bias power source according to the fifth embodiment of the present invention. Although only the gate drive circuit $120_1$ and the switching circuit $68_1$ are illustrated in FIG. 20, the other gate drive circuits $120_2$ to $120_{20}$ and switching circuits $68_2$ to $68_{20}$ have the same arrangement and illustration and description thereof will be omitted.

An input terminal 84 of the gate drive circuit $120_1$ receives a 1-MHz intermittent input signal LIN1 from the NAND gate $118_1$. The intermittent input signal LIN1 is input to the base of a transistor Q3 via a resistor R2. The emitter of the transistor Q3 is connected to the positive terminal of a gate bias power source $V_{G1}$ and the collector of a transistor Q4. The collector of the transistor Q3 is connected to a gate bias power source $V_{G2}$ via a resistor R3 and the base and the collector of a transistor Q5. The bases and the emitters of the transistors Q4 and Q5 are connected with each other.

The gate of a static induction transistor Q2 is connected to the emitters of the transistors Q4 and Q5. The source of the transistor Q2 is connected to the negative terminal of the gate bias power source $V_{G1}$, the positive terminal of the gate bias power source $V_{G2}$, and the negative terminal of the DC high-voltage power source (e.g., output +2,500 V). The drain of the transistor Q2 is connected to the positive terminal of the DC high-voltage power source 70 via a resistor R4 and to the line electrode $36_1$ of the ion generator 10.

A screen electrode 40 opposing a dielectric drum 12 is applied with a voltage from a screen bias power source Vsc (e.g., output—600 V), and the negative terminal of a reverse bias power source Vbb is connected to the negative terminal of the screen bias power source Vsc. The positive terminal of the reverse bias power source Vbb is connected to the source of the static induction transistor Q2. The positive terminal of the reverse bias power source Vbb is connected to the positive terminal of a forward bias power source Vf having a negative terminal connected to a connection terminal a of a switch 86, and to a connection terminal b of the switch 86. Another connection terminal c of the switch 86 is connected to a finger electrode $38_1$.

In accordance with image data to be printed, the switch 86 performs switching between the connection terminals a and b on the basis of a finger select signal from the deskew circuit 46, thereby switching a bias to be supplied to the finger electrode $38_1$. Note that outputs from the reverse and forward bias power sources Vbb and Vf can be varied within a range of, e.g., 100 to 300 V to enable adjustment of an ion flow amount.

Figure 21:
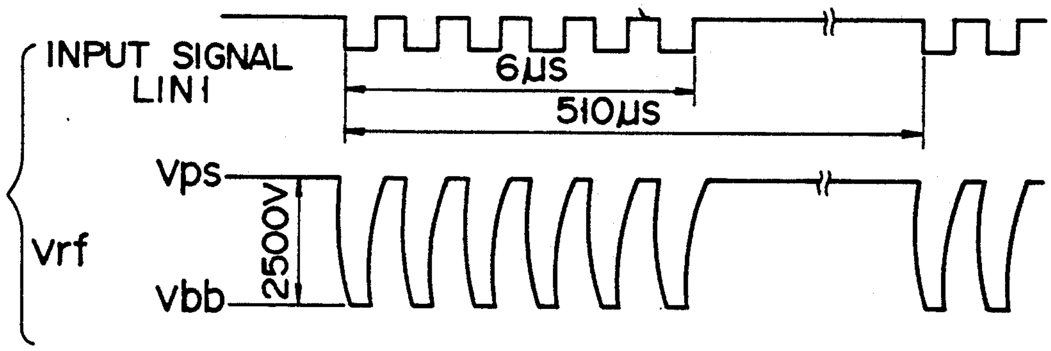
FIG. 21 is a view showing waveforms of a gate drive circuit input signal and an ion generator driver output according to the fifth embodiment of the present invention.

FIG. 21 shows waveforms of the input signal LIN1 to the gate drive circuit $120_1$ and a voltage Vrf applied to the line electrode $36_1$. When the static induction transistor Q2 switches a DC high voltage as shown in FIG. 21, a voltage waveform of 2,500 Vpp and 1 MHz capable of generating ions can be obtained. By applying the output waveform of this circuit to the line electrode $36_1$, ions can be generated in a small hole 38*a* near the finger electrode $38_1$.

If the switching terminal c of the switch 86 is switched to the connection terminal b side, an ion flow barrier electric field is formed in the small hole 38*a* and a small hole 40*a* of the screen electrode 40. Therefore, no ion flow reaches the dielectric drum 12 through the small hole 40*a*. On the contrary, if the switching terminal c of the switch 86 is switched to the connection terminal a side, the barrier electric field disappears. Therefore, the ion flow (negative ions) can reach the dielectric drum 12. In this manner, control of the ion flow can be performed.

By the circuit having the above arrangement, a stable and equal burst-like RF high voltage can be supplied to any line electrode in the ion generator to output a high quality image free from irregularities. The output voltage and the output frequency are solely determined by the output from the DC high-voltage power source and the frequency of the input signal to the static induction transistor switching circuit, respectively. For this reason, since the switching rate of the static induction transistor Q2 is sufficiently high, the rise and fall of the output waveform end within a very short time period as indicated by the input signal waveform LIN1 in FIG. 21. Therefore, almost no variation is found between the output waveforms of the switching circuits. Since neither output adjusting parts nor adjusting steps are required for each switching circuit and no boosting transformer is necessary, a small size and high reliability can be realized. In addition, unlike in a self-excited oscillation (resonation) circuit, since the static induction transistor Q2 is used in a saturation region, an output drift caused by offset of an operation point according to a temperature rise in a semiconductor device is very small to realize a stable operation.

Modifications of the switching circuit 38 will be described below. In the following modifications, the same reference numerals as in the above fifth embodiment denote the same parts and a detailed description thereof will be omitted, and only differences will be described.

Figure 22:
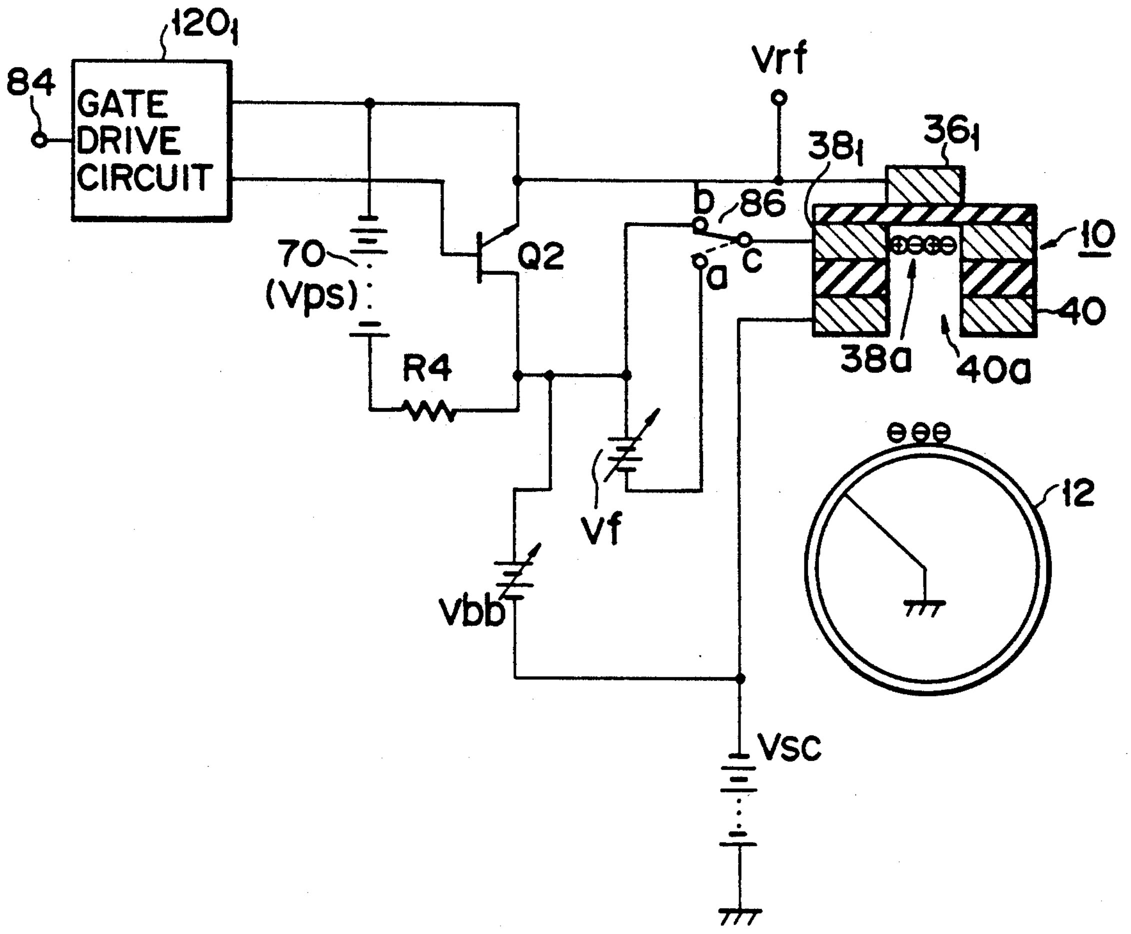
FIG. 22 is a circuit diagram showing a gate drive circuit, a switching circuit, and a bias power source according to the sixth embodiment of the present invention together with a partial sectional view of an ion generator.
Figure 23:
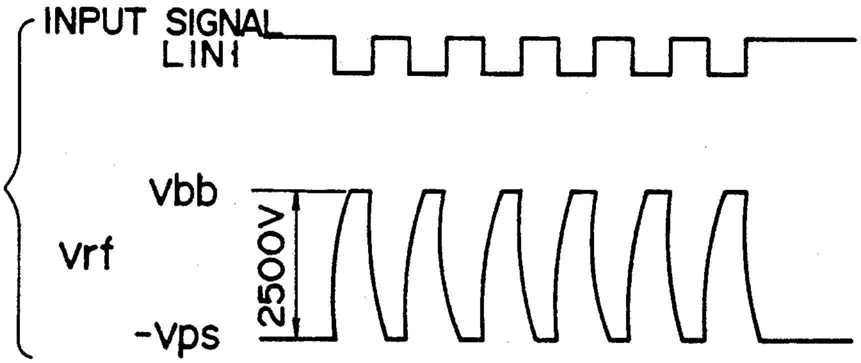
FIG. 23 is a view showing waveforms of a gate drive circuit input signal and an ion generator driver output according to the sixth embodiment of the present invention.

FIG. 22 shows an arrangement of the sixth embodiment of the present invention. FIG. 23 shows waveforms of an input signal LIN1 supplied to an input terminal 84 shown in FIG. 22 and a voltage Vrf applied to a line electrode $36_1$ therein.

An output from a gate drive circuit $120_1$ is supplied to the gate of a static induction transistor Q2. This output is also connected to the negative terminal of a DC voltage power source 70 (Vps) and the drain of the transistor Q2. A resistor R4 is connected between the positive terminal of the power source 70 and the source of the transistor Q2, and the source of the transistor Q2 is connected to the line electrode $36_1$.

In an ion generator driver having the above arrangement, when the input signal LIN1 as shown in FIG. 23 is supplied to the gate drive circuit $120_1$, the static induction transistor Q2 performs switching. As a result, an output voltage Vrf of 2,500 V can be obtained between Vbb and Vps.

Figure 24:
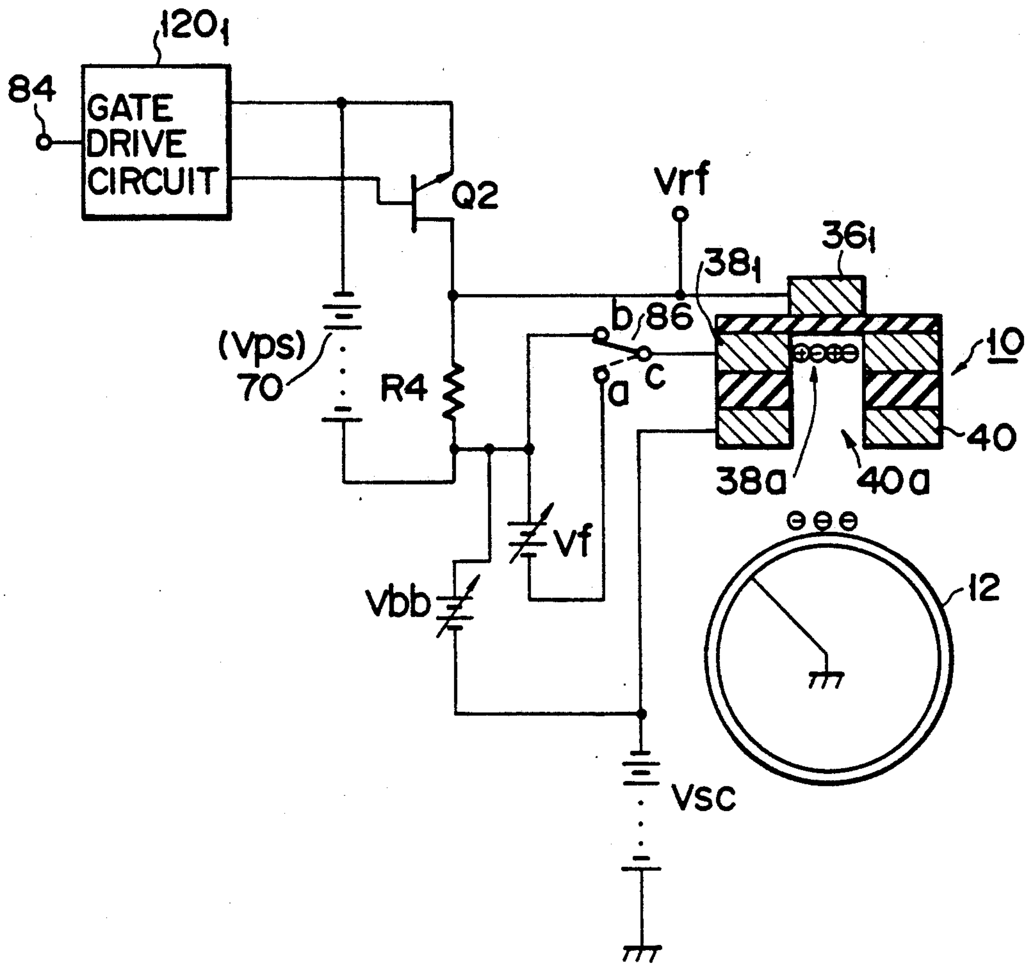
FIG. 24 is a circuit diagram showing a gate drive circuit, a switching circuit, and a bias power source according to the seventh embodiment of the present invention together with a partial sectional view of an ion generator.

FIG. 24 shows an arrangement of the seventh embodiment of the present invention. Referring to FIG. 24, an output from a gate drive circuit $120_1$ is supplied to the gate of a static induction transistor Q2. The gate drive circuit $120_1$ is connected to the negative terminal of a DC voltage power source 70 (Vps) and the source of the transistor Q2. A resistor R4 is connected between the positive terminal of the power source 70 and the drain of the transistor Q2, and the drain of the transistor Q2 is connected to a line electrode $36_1$.

Figure 25:
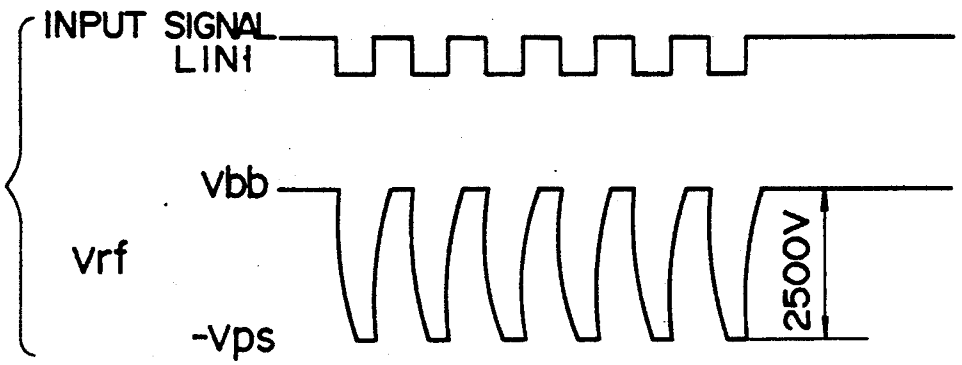
FIG. 25 is a view showing waveforms of a gate drive circuit input signal and an ion generator driver output according to the seventh embodiment of the present invention.

According to an ion generator driver having the above arrangement, when an input signal LIN1 as shown in FIG. 25 is supplied to the gate drive circuit $120_1$, the static induction transistor Q2 performs switching to obtain an output voltage Vrf of 2,500 V between Vbb and Vps, as in the above sixth embodiment.

Figure 26:
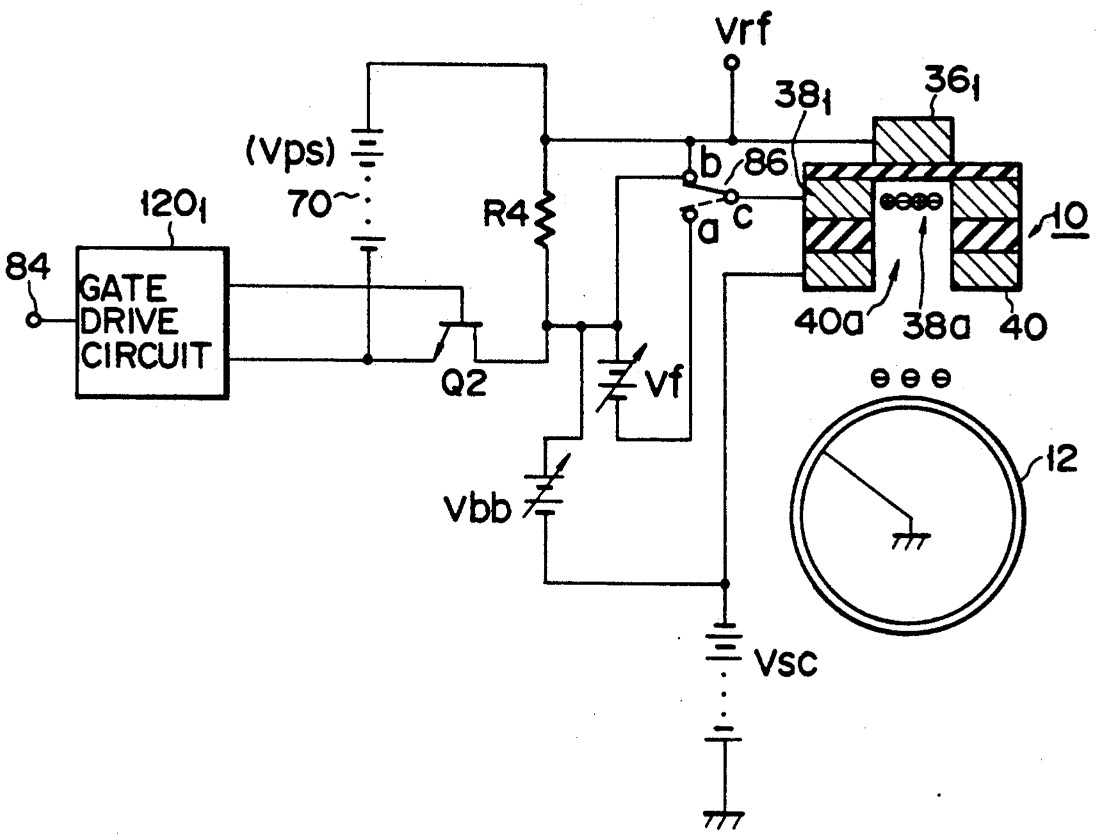
FIG. 26 is a circuit diagram showing a gate drive circuit, a switching circuit, and a bias power source according to the eighth embodiment of the present invention together with a partial sectional view of an ion generator.

FIG. 26 shows an arrangement of the eighth embodiment of the present invention. Referring to FIG. 26, a gate drive circuit $120_1$ is connected to the gate of a static induction transistor Q2 and is also connected to the negative terminal of a DC voltage power source 70 (Vps) and the source of the transistor Q2. A resistor R4 is connected between the positive terminal of the power source 70 and the drain of the transistor Q2. The positive terminal of the power source 70 is connected to a line electrode $36_1$.

Figure 27:
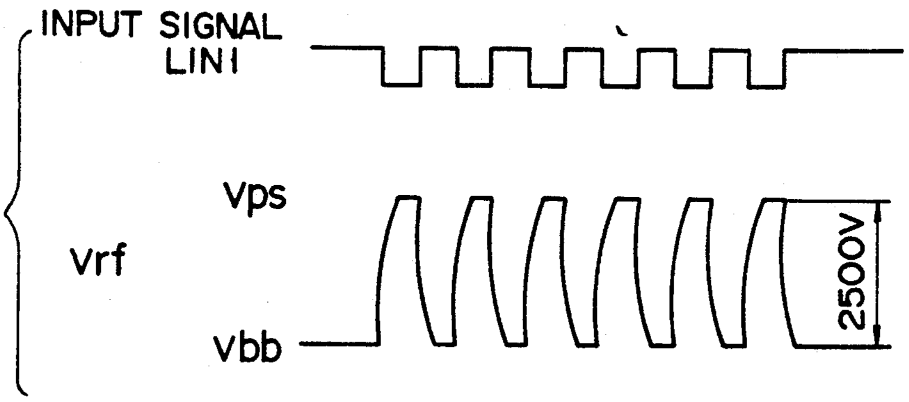
FIG. 27 is a view showing waveforms of a gate drive circuit input signal and an ion generator driver output according to the eighth embodiment of the present invention.

According to an ion generator driver having the above arrangement, when an input signal LIN1 as shown in FIG. 27 is supplied to the gate drive circuit $120_1$, the static induction transistor Q2 performs switching as in the above sixth and seventh embodiments. As a result, an output voltage Vrf of 2,500 V can be obtained between Vps and Vbb, as shown in FIG. 27.

As described above, the circuit arrangement according to any of the sixth to eighth embodiments can stably generate ions in an ion generator 10. As a result, a high-performance ion generator driver can be achieved.

Figure 28:
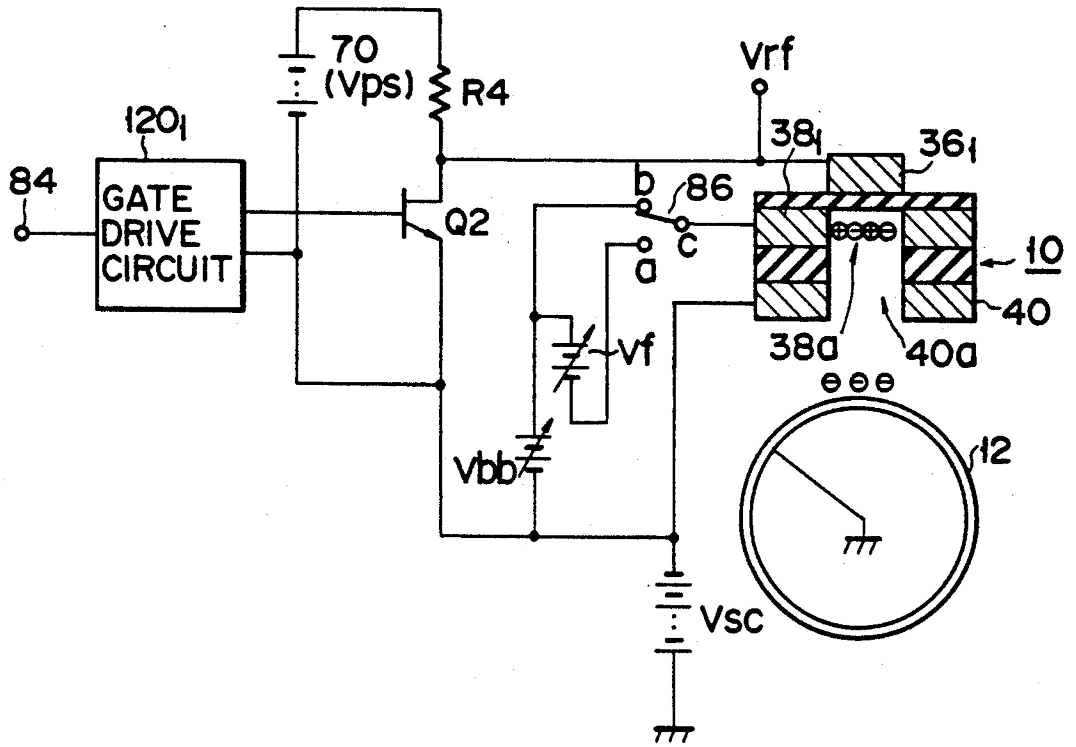
FIG. 28 is a circuit diagram showing a gate drive circuit, a switching circuit, and a bias power source according to the ninth embodiment of the present invention together with a partial sectional view of an ion generator.

FIG. 28 shows the ninth embodiment of the present invention. Referring to FIG. 28, an output from a gate drive circuit $120_1$ is supplied to the gate of a static induction transistor Q2. The circuit $120_1$ is also connected to the negative terminal of a DC voltage power source 70 (Vps) and the source of the transistor Q2 A resistor R4 is connected between the positive terminal of the power source 70 and the drain of the transistor Q2, and the drain of the transistor Q2 is connected to a line electrode $36_1$. The negative terminal of a reverse bias power source Vbb is connected to the source of the transistor Q2, and its positive terminal is connected to a connection terminal b of a switch 86 and the negative terminal of a forward bias power source Vf.

Figure 29:
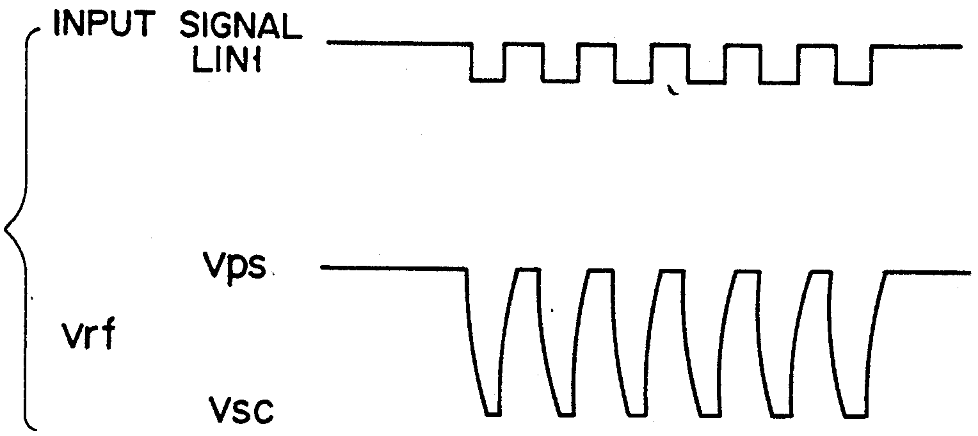
FIG. 29 is a view showing waveforms of a gate drive circuit input signal and an ion generator driver output according to the ninth embodiment of the present invention.

In an ion generator driver having the above arrangement, when an input signal LIN1 as shown in FIG. 29 is supplied to the gate drive circuit $120_1$, the static induction transistor Q2 performs switching to obtain an output voltage Vrf of 2,500 V between Vps and Vsc. In this ninth embodiment, unlike in the above fifth to eighth embodiments, a screen bias power source Vsc is used as a reference unit.

This circuit arrangement can also stably generate ions in an ion generator 10. In addition, since a bias voltage higher than those in the above fifth to eighth embodiments in the negative direction is applied in the ninth embodiment, a larger amount of negative ions can be generated.

Figure 30:
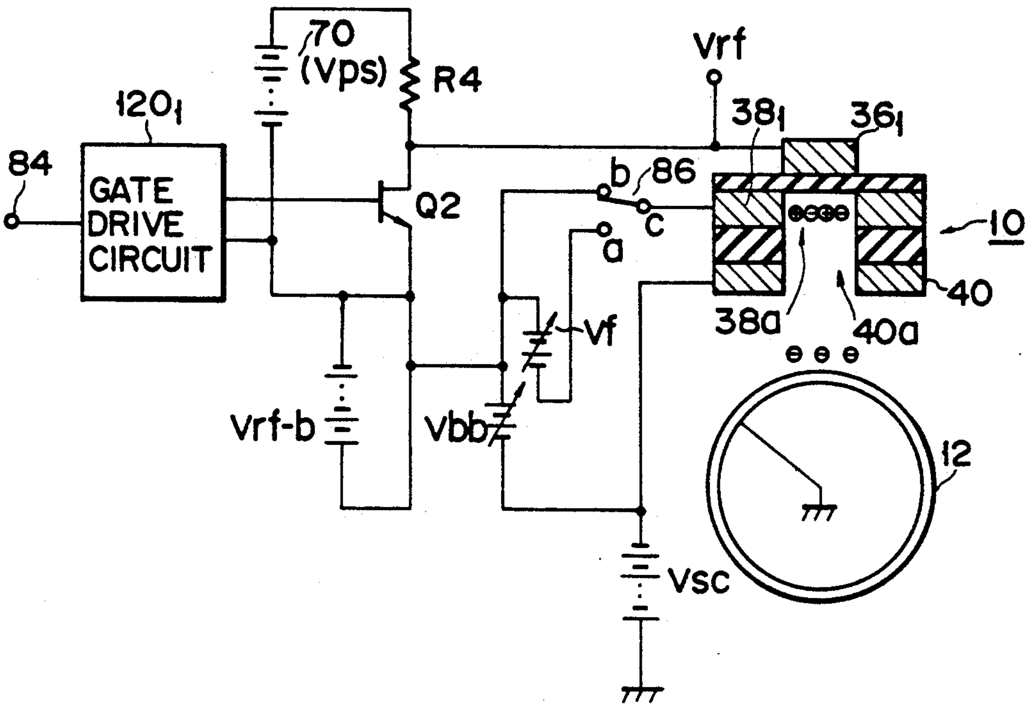
FIG. 30 is a circuit diagram showing a gate drive circuit, a switching circuit, and a bias power source according to the tenth embodiment of the present invention together with a partial sectional view of an ion generator.

FIG. 30 shows the tenth embodiment of the present invention. Referring to FIG. 30, an output from a gate drive circuit $120_1$ is supplied to the gate of a static induction transistor Q2. The circuit $120_1$ is also connected to the negative terminal of a DC voltage power source 70 (Vps) and the source of the transistor Q2. A resistor R4 is connected between the positive terminal of the power source 70 and the drain of the transistor Q2, and the drain of the transistor Q2 is connected to a line electrode $36_1$. The negative terminal of a reverse bias power source Vbb is connected to the source of the transistor Q2, and its positive terminal is connected to a connection terminal b of a switch 86 and the negative terminal of a forward bias power source Vf. A reverence bias power source Vrf-b is connected between the source of the transistor Q2 and the positive terminal of the reverse bias power source Vbb.

Figure 31:
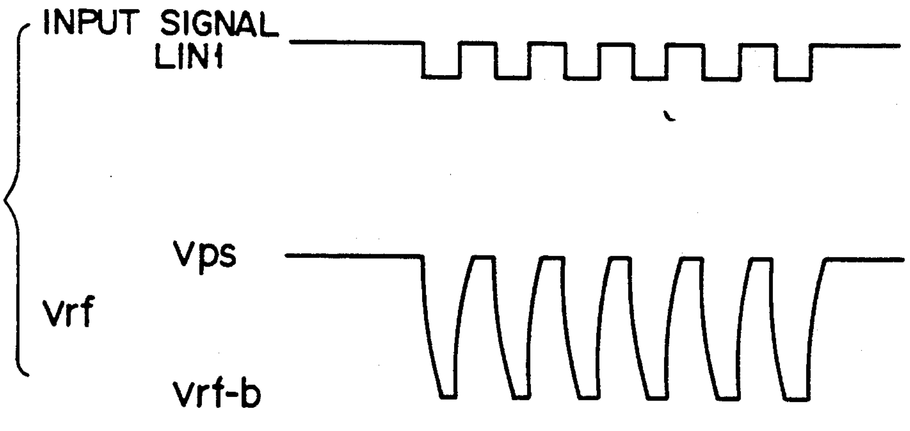
FIG. 31 is a view showing waveforms of a gate drive circuit input signal and an ion generator driver output according to the tenth embodiment of the present invention.

In an ion generator driver having the above arrangement, when an input signal LIN1 as shown in FIG. 31 is supplied to the gate drive circuit $120_1$, the static induction transistor Q2 performs switching to obtain an output voltage of 2,500 V between Vps and Vrf-b. In this embodiment, since the independent reference bias power source Vrf-b is added to the output voltage, a desired bias can be freely set in the output voltage. As a result, ions having a desired polarity can be stably generated.

Figure 32:
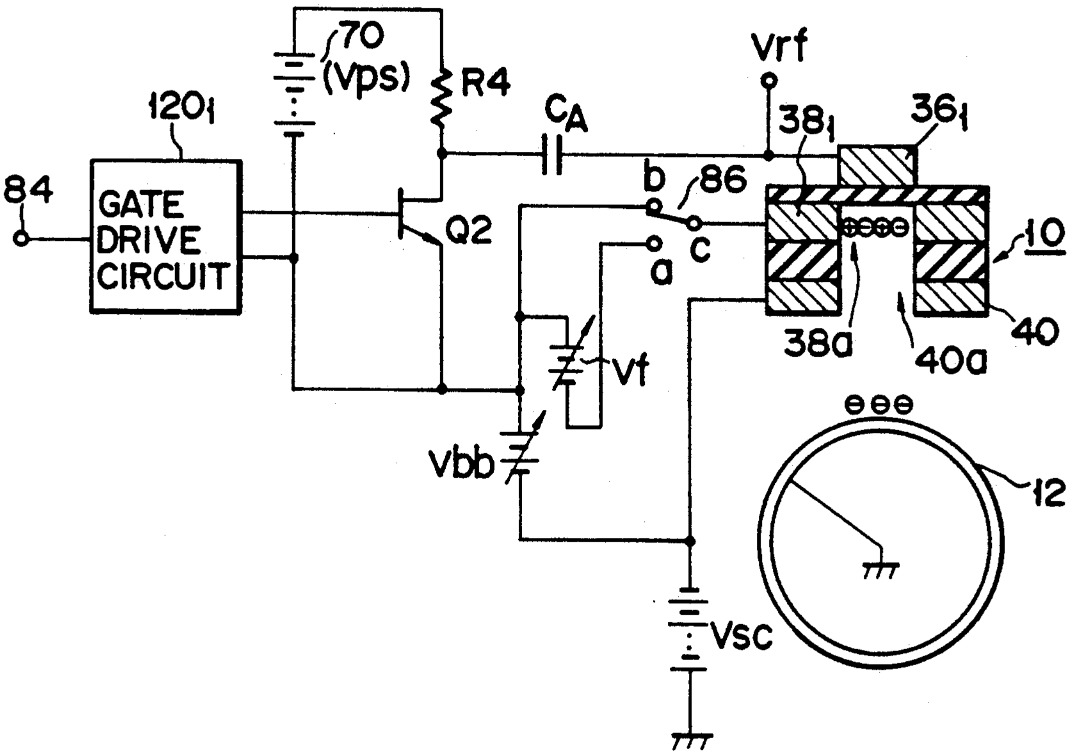
FIG. 32 is a circuit diagram showing a gate drive circuit, a switching circuit, and a bias power source according to the 11th embodiment of the present invention together with a partial sectional view of an ion generator.

FIG. 32 shows an arrangement of the 11th embodiment of the present invention. Referring to FIG. 32, a gate drive circuit $120_1$ is connected to the gate of a static induction transistor Q2, the negative terminal of a DC voltage power source 70 (Vps), and the source of the transistor Q2. A resistor R4 is connected between the positive terminal of the power source 70 and the drain of the transistor Q2, and the drain of the transistor Q2 is connected to a line electrode $36_1$ via a coupling capacitor $C_A$. The positive terminal of a reverse bias power source Vbb is connected to the source of the transistor Q2, and its negative terminal is connected to the negative terminal of a screen bias power source Vsc.

Figure 33:
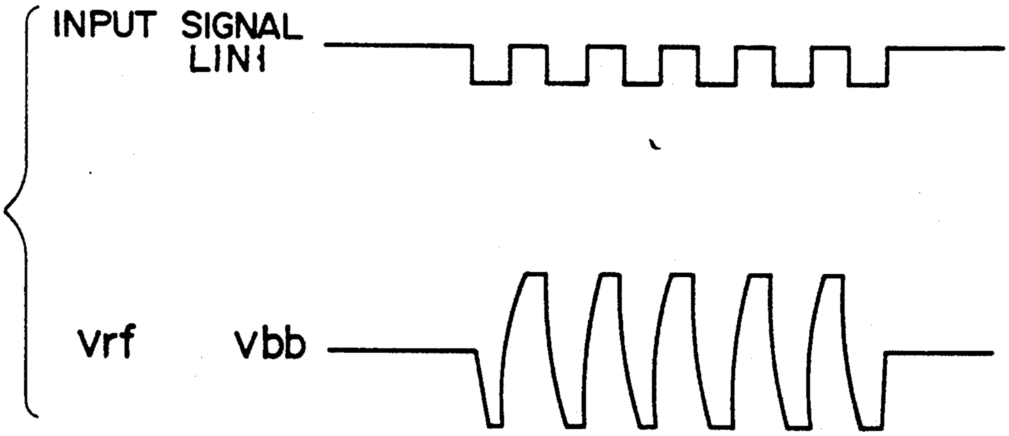
FIG. 33 is a view showing waveforms of a gate drive circuit input signal and an ion generator driver output according to the 11th embodiment of the present invention.

In an ion generator driver having the above arrangement, when an input signal LIN1 as shown in FIG. 33 is supplied to the gate drive circuit $120_1$, the static induction transistor Q2 performs switching. In this arrangement, since a switching circuit having the transistor Q2 and the line electrode $36_1$ are coupled by the coupling capacitor $C_A$, only an AC component centered at Vbb is applied as an output voltage Vrf to the line electrode $36_1$, as shown in FIG. 33. As a result, ions can be stably generated in an ion recording head 10.

Figure 34:
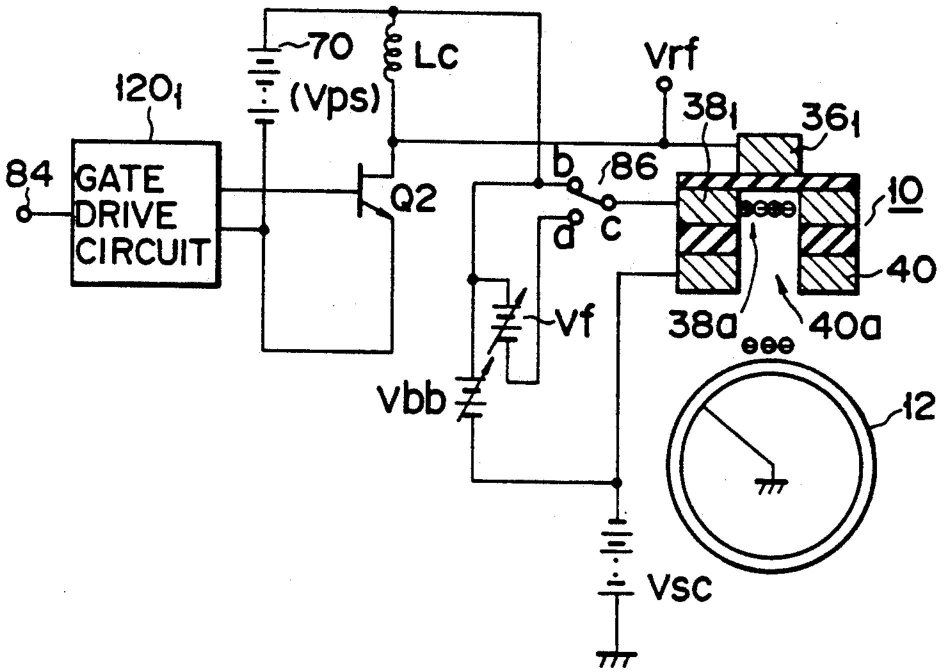
FIG. 34 is a circuit diagram showing a gate drive circuit, a switching circuit, and a bias power source according to the 12th embodiment of the present invention together with a partial sectional view of an ion generator.

FIG. 34 shows an arrangement of the 12th embodiment of the present invention. Referring to FIG. 34, a gate drive circuit $120_1$ is connected to the gate of a static induction transistor Q2, the negative terminal of a DC voltage power source 70 (Vps), and the source of the transistor Q2. The positive terminal of the power source 70 (1,250 V) is connected to the drain of the transistor Q2 via a coil LC and to a connection terminal b of a switch 86. The drain of the transistor Q2 is connected to a line electrode $36_1$. The positive terminal of a reverse bias power source Vbb is connected to the connection terminal b of the switch 86 and the positive terminal of a forward bias power source Vf, and its negative terminal is connected to the negative terminal of a screen bias power source Vsc.

Figure 35:
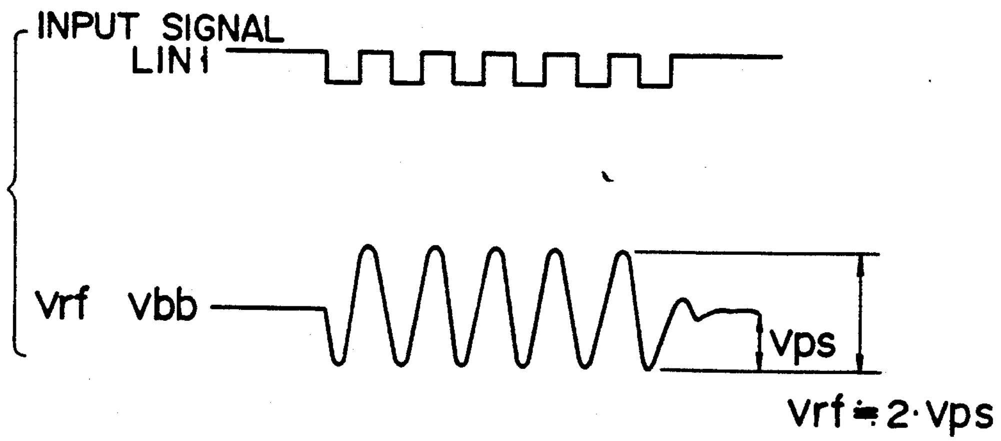
FIG. 35 is a view showing waveforms of a gate drive circuit input signal and an ion generator driver output according to the 12th embodiment of the present invention.

In an ion generator driver having the above arrangement, when an input signal LIN1 (an intermittent signal of 1 MHz) as shown in FIG. 35 is supplied to the gate drive circuit $120_1$, the static induction transistor Q2 performs switching. As a result, a voltage is supplied to a parallel resonator constituted by the coil LC and a line electrode capacitance to start resonance. As a result, an output voltage Vrf having an amplitude ($2\times Vps=2{,}500$ V) twice that of the DC high-voltage power source 70 ($Vps=1{,}250$ V) can be obtained in the line electrode $36_1$. Thereafter, when the input signal LIN1 disappears, switching of the static induction transistor Q2 is finished to terminate the output.

As is apparent from the waveform of the output voltage Vrf shown in FIG. 35, the output voltage (Vps) of the DC high-voltage power source 70 need only be ½ the voltage (maximum value) applied to the line electrode $36_1$. For example, in order to apply 2,500 Vpp to the line electrode $36_1$, the output of the power source 70 need only be 1,250 V, i.e., half that in any of the above fifth to 11th embodiments. In addition, since the impedance of the parallel resonator constituted by LC and CL viewed from the power source 70 is very high, almost no current is flowed from the power source 70.

In the 12th embodiment, therefore, since the output voltage of the DC high-voltage power source 70 can be decreased to be a comparatively small value and the current capacity of the power source can also be decreased, the power capacity of the power source 70 can be decreased. Therefore, a small size of the power source and a low manufacturing cost can be effectively realized. In addition, since the DC high voltage is directly switched by the static induction transistor Q2, the rise and fall times of the output can be largely shortened.

In each of the above embodiments, the process controller 52 automatically varies the output duty of the variable duty clock generator 64 on the basis of the environmental conditions near the ion generator 10 detected by the environment detecting element 34 arranged near the ion generator 10. However, in order to reduce the manufacturing cost, the variable control may be manually performed by an operator.

Figure 36:
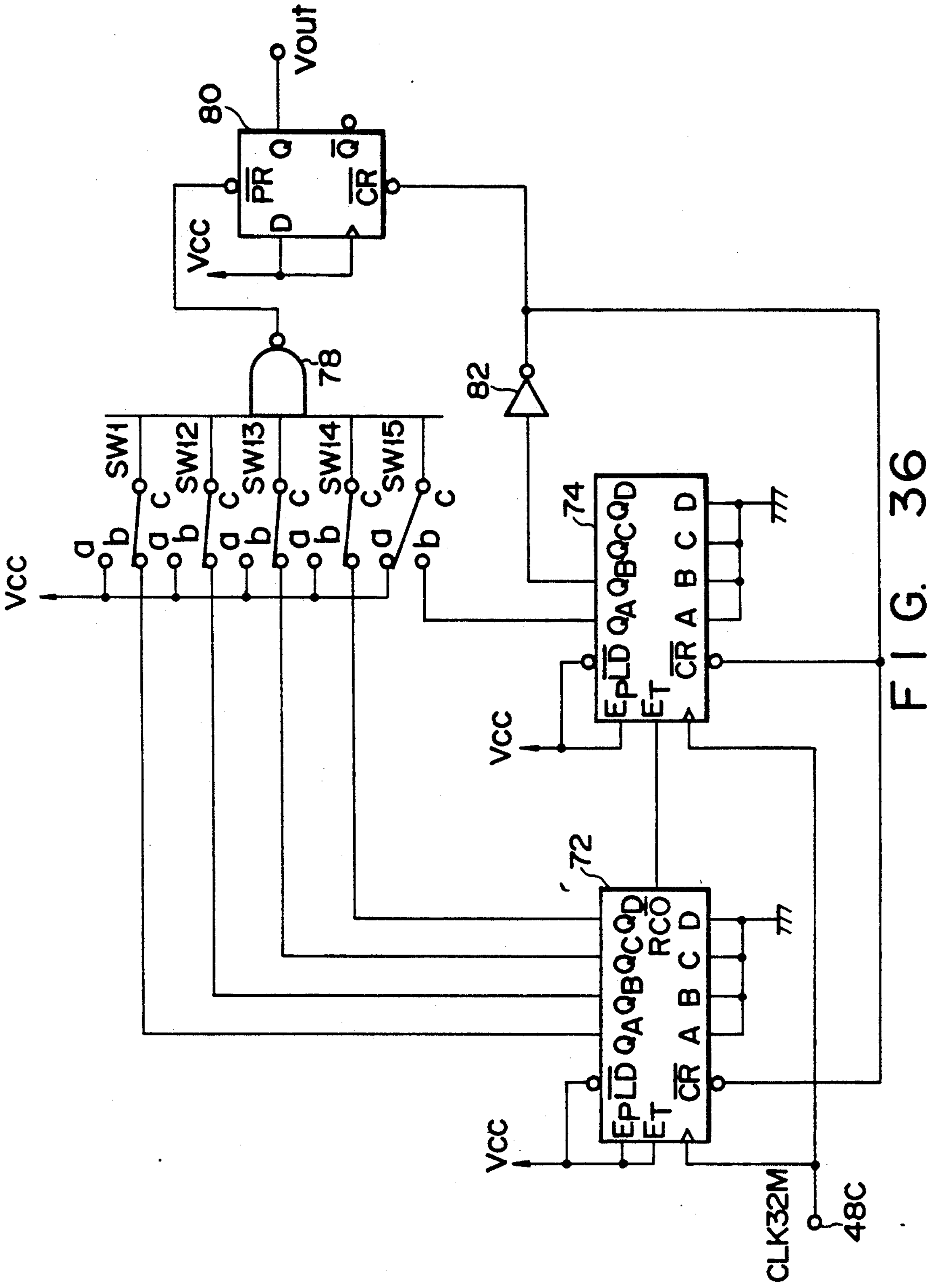
FIG. 36 is a circuit diagram showing a variable duty clock generator according to the 13th embodiment of the present invention.

To enable this manual control, the arrangement of the variable duty clock generator 64 as shown in FIG. 4 may be changed as shown in FIG. 36. That is, in place of the OR gates *76a*, *76b*, *76c*, *76d*, and *76e* shown in FIG. 4, manual operation switches SW11, SW12, SW13, SW14, and SW15 are used. Count output terminals $Q_A$, $Q_B$, $Q_C$, and $Q_D$ of a counter 72 and a count output terminal $Q_A$ of a counter 74 are connected to connection terminals b of the switches SW11, SW12, SW13, SW14, and SW15, respectively. Connection terminals a of the switches SW11 to SW15 are pulled up to Vcc, and their connection terminals c are connected to the input terminals of a NAND gate 78.

Similar to the arrangement shown in FIG. 4, the variable duty clock generator 64 having the above arrangement can operate as shown in the timing chart of FIG. 10. That is, when a clock CLK32M synchronized with LSEL and LEN is input to the cascade-connected counters 72 and 74, signals obtained by frequency-dividing the clock CLK32M by 2, 4, 8, 16, and 32 are output from the terminals $Q_A$, $Q_B$, $Q_C$, and $Q_D$ of the counter 72 and the terminal $Q_A$ of the counter 74, respectively.

Assume that the switches SW11 to SW14 are connected to the connection terminals a and only the switch SW15 is connected to the connection terminal b (case A). In this case, the terminal $Q_A$ of the counter 74 goes "HIGH" at the 17th pulse of the clock CLK32M, and the output from the NAND gate 78 goes "LOW". As a result, an RS flip-flop 80 is set to have an output at level "HIGH". Subsequently, the output QB of the counter 74 goes "HIGH" at the 32nd pulse of the clock CLK32M to clear the counters 72 and 74, and the RS flip-flop 80 is also cleared to have an output at "LOW". Thereafter, the same operation is repeatedly performed. By setting the switches SW11 to SW15 in this manner, a 1-MHz clock having a duty of 50% can be obtained.

On the other hand, assume that the switches SW11 and SW15 are connected to the connection terminals a and the switches SW12 to SW14 are switched to the connection terminals b (case B). In this case, the terminals $Q_B$, $Q_C$, and $Q_D$ of the counter 72 go "HIGH" at the 15th pulse of the clock CLK32M, and the output form the NAND gate 78 goes "LOW". As a result, the RS flip-flop 80 is set to have an output at "HIGH". Subsequently, as in the above case A, the counters 72 and 74 and the RS flip-flop 80 are cleared at the 32nd pulse of the clock CLK32M to return their outputs to "LOW". Thereafter, the same operation is repeatedly performed. By setting the switches SW11 to SW15 in this manner, a 1-MHz clock having a duty of 56.25% can be obtained.

According to the 13th embodiment as described above, an input signal having a desired duty can be supplied to the input terminal of a source drive circuit or a gate drive circuit connected to a switching circuit by arbitrarily switching the manual operation switches SW11 to SW15, thereby controlling an output voltage (Vrf) of the switching circuit.

Figure 37:
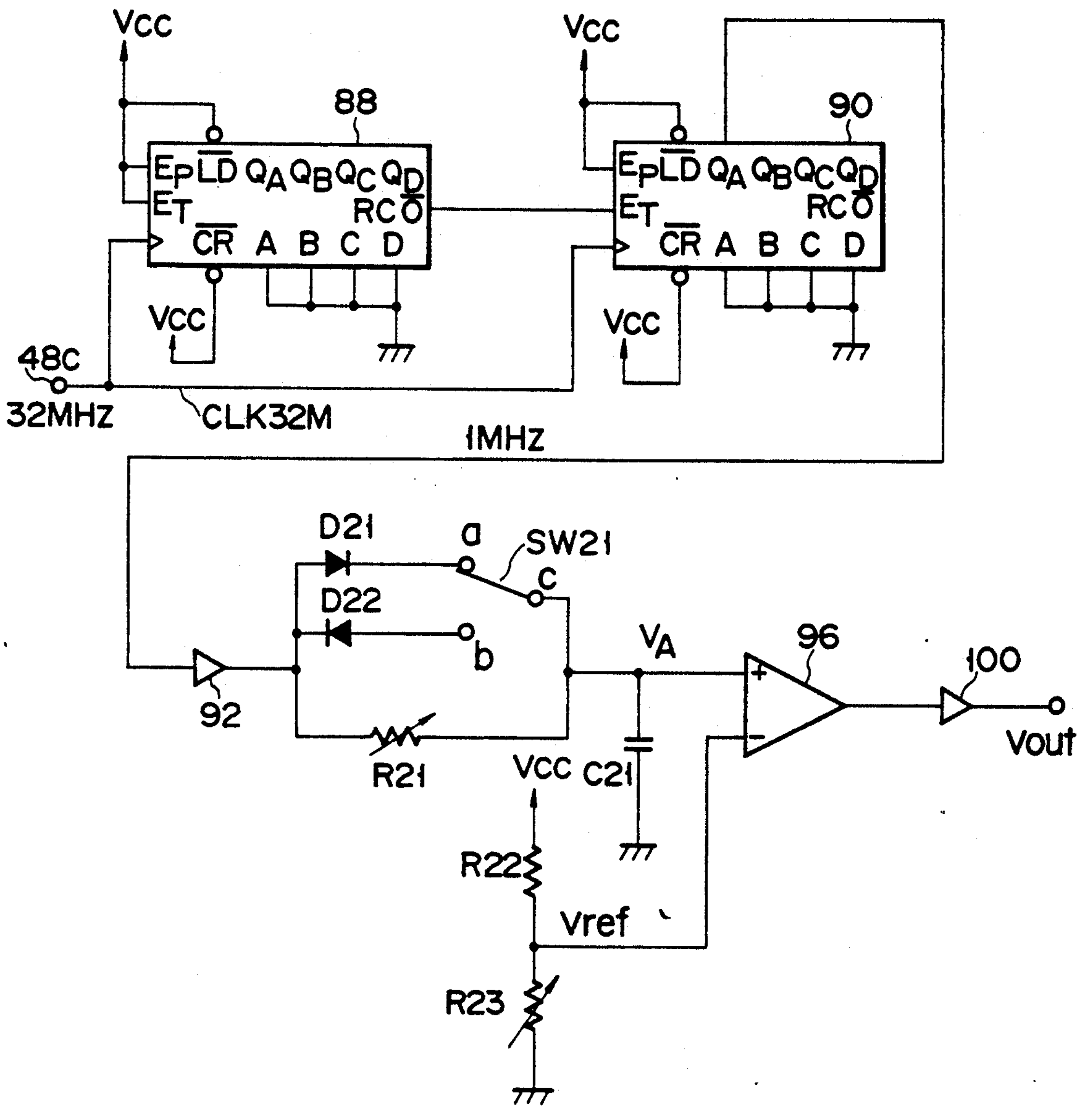
FIG. 37 is a circuit diagram showing a duty clock generator according to the 14th embodiment of the present invention.

Alternatively, the manual control can be performed by changing the arrangement of the variable duty clock generator 64 as shown in FIG. 14 into that shown in FIG. 37. That is, a manual operation switch SW21 is used in place of the relay 94 shown in FIG. 14, and a voltage divider constituted by a resistor R22 and a variable resistor R23 is used in place of the D/A converter 98 therein. Referring to FIG. 37, the cathode of a diode D21 is connected to a connection terminal a of the switch SW21, and the anode of a diode D22 is connected to a connection terminal b of the switch SW21. A connection terminal c of the switch SW21 is connected to one input terminal of a variable resistor R21 and is also connected to a capacitor C21 and the positive input terminal of a comparator 96. The negative input terminal of the comparator 96 is applied with a reference voltage Vref generated by the resistors R22 and R23 inserted in series between Vcc and ground.

Figure 38:
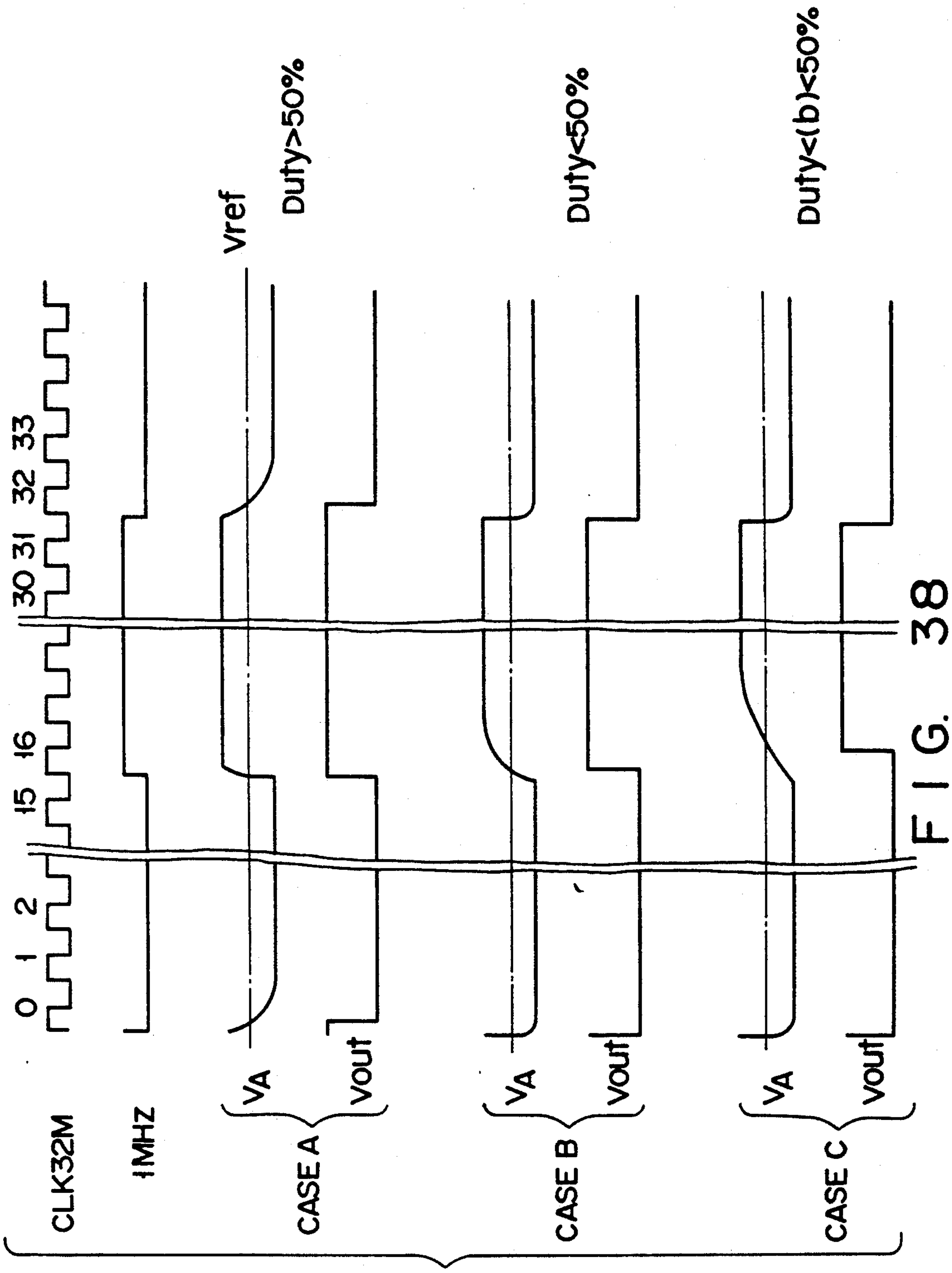
FIG. 38 is a timing chart showing operations of the circuit shown in FIG. 37.

FIG. 38 is a timing chart showing an operation of the variable duty clock generator 64 according to the 14th embodiment. A clock CLK32M is supplied to an input terminal 48c and frequency-divided by counters 88 and 90 to form a 1-MHz signal. This 1-MHz signal is input to an integrating circuit constituted by diodes D21 and D22, the variable resistor R21, the capacitor C21, and a relay 94 via a buffer 92. The comparator 96 compares $V_A$ as an output voltage from the integrating circuit with a reference voltage Vref generated by the voltage divider constituted by the resistors R22 and R23 to obtain an output Vout.

If the switch SW21 is switched to the connection terminal a side, an integral output $V_A$ as shown in a case A of FIG. 38 is obtained, and the comparator 96 compares this integral output $V_A$ with the reference voltage Vref indicated by an alternate long and short dashed line to obtain a comparison output Vout. In this case, since the resistor R21 is bypassed by the diode D21 upon charging of the capacitor C21, the time constant is very small, and therefore the rise time of the integral output $V_A$ is very short. On the contrary, since no bypath can be formed by the diode D22 when the capacitor C21 is discharged, the value of the time constant becomes $R21 \times C21$, and the leading edge of the integral output $V_A$ is less steep. By inputting this integral output $V_A$ to the comparator 96, Vout (duty $\geqq 50\%$) shown in the case A of FIG. 38 can be obtained.

If the switch SW21 is switched to the connection terminal b side, Vout in which duty $D \leqq 50\%$ as shown in a case B of FIG. 38 is obtained.

If the value of the variable resistor R21 is increased, Vout in which duty $D \leqq$ case $B \leqq 50\%$ as shown in a case C of FIG. 38 is obtained, i.e., the duty is reduced to be smaller than that in the case B.

In this manner, by using the above circuit as the variable duty clock generator, control of the duty of an input signal to the static induction transistor switching circuit can be freely performed as in the 13th embodiment.

In the 14th embodiment, the resistance of the variable resistor R21 is changed to change the time constant of the integrating circuit, thereby changing the duty of an input signal to the static induction transistor switching circuit. However, the same effect can be obtained by changing the capacitance of the capacitor C21. The same effect can also be obtained by changing the resistance of the variable resistor R23 to change the reference voltage Vref of the comparator 96.

In the above first to 14th embodiments, amounts of ions generated in all of the ion generation holes of the ion generator 10 are uniformized by equalizing the voltages generated in the individual line electrodes.

In an actual arrangement, however, since the plate-like ion generator 10 having a plurality of ion radiation holes is caused to oppose the dielectric drum 12 to form a latent image on the drum 12, distances from the surface of the ion generator 10 to the drum 12 are not equal between the line electrodes. Therefore, if the voltages generated in the line electrodes are equalized, a printing density varies in actual printing. In addition, when the ion generator 10 is replaced with a new one, the distance from the surface of the ion generator 10 to the drum 12 may be different before and after the replacement of the ion generator 10 due to manufacturing precision of the ion generator 10 or its mounting precision to the image forming apparatus. Therefore, a printing density may become different between the individual line electrodes due to the above differences to make it impossible to obtain a high-quality output having a uniform printing density.

Figure 39:
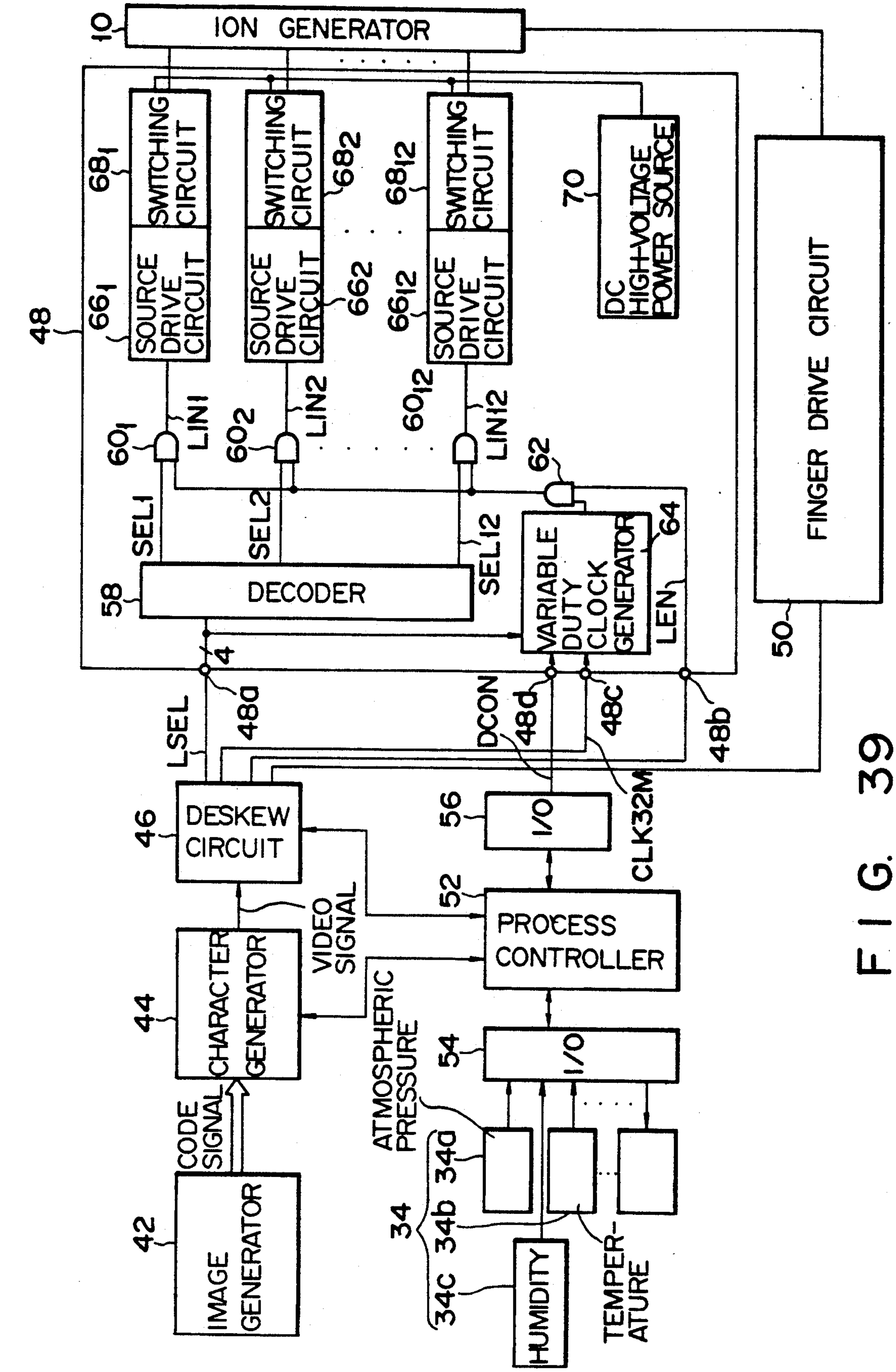
FIG. 39 is a block diagram showing an ion generator driver of an image forming apparatus according to the 15th embodiment of the present invention.

FIG. 39 is a block diagram showing an arrangement of the 15th embodiment of the present invention made in consideration of the above situation. According to the 15th embodiment, a line select signal LSEL supplied from a deskew circuit 46 to an input terminal 48a of a line drive circuit 48 is supplied to not only a decoder 58 but also a variable duty clock generator 64. An ion generator 10 has 12 line electrodes $36_1$ to $36_{12}$ and 212 finger electrodes $38_1$ to $38_{212}$. In the 15th embodiment, therefore, the line select signal LSEL is constituted by four bits LSEL0 to LSEL3, and the numbers of AND gates 60, source drive circuits 66, and switching circuits 68 are respectively 12.

Figure 40:
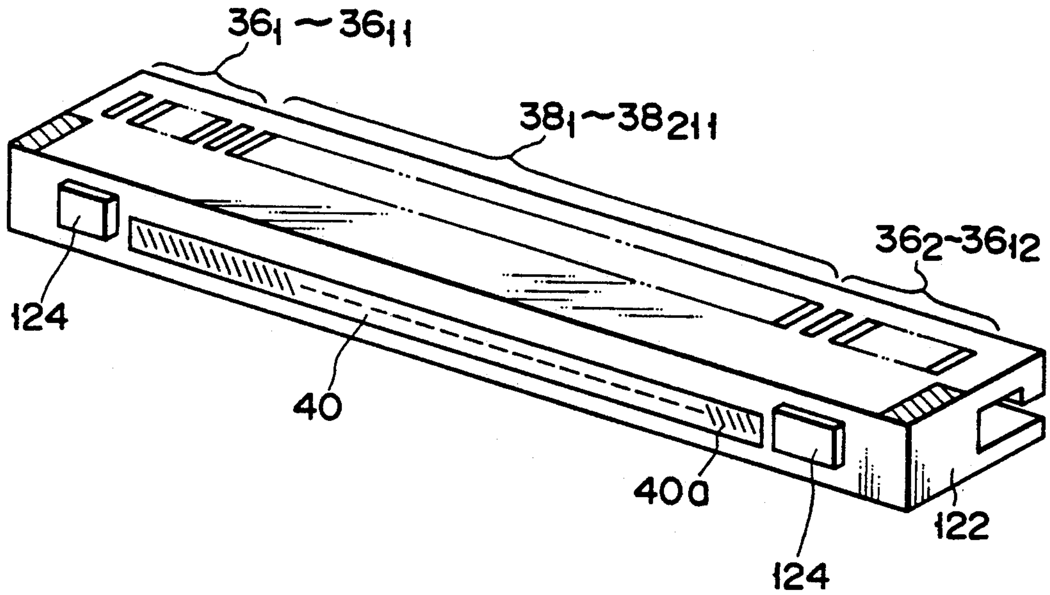
FIG. 40 is a perspective view showing an ion generator of the image forming apparatus according to the 15th embodiment of the present invention.

FIG. 40 is a schematic view showing the ion generator 10 of this embodiment. This ion generator 10 is obtained by adhering a multilayered substrate formed by stacking a plurality of dielectrics and conductors on an aluminum base member 122. A plurality of holes 40a are formed in a screen electrode 40 to ensure ion flow radiation openings. Gap spacers 124 are formed at two sides of the front surface of the screen electrode 40 to maintain a gap between the drum 12 and the screen electrode 40. Line electrodes 36 ($36_1$ to $36_{12}$) and finger electrodes 38 ($38_1$ to $38_{212}$) for controlling generation and radiation of an ion flow are arranged on two side surfaces (only one of which is shown in FIG. 40) adjacent to the front surface of the screen electrode 40. In addition, a contact for supplying a voltage to the screen electrode 40 is arranged on another surface (not shown).

Figure 41:
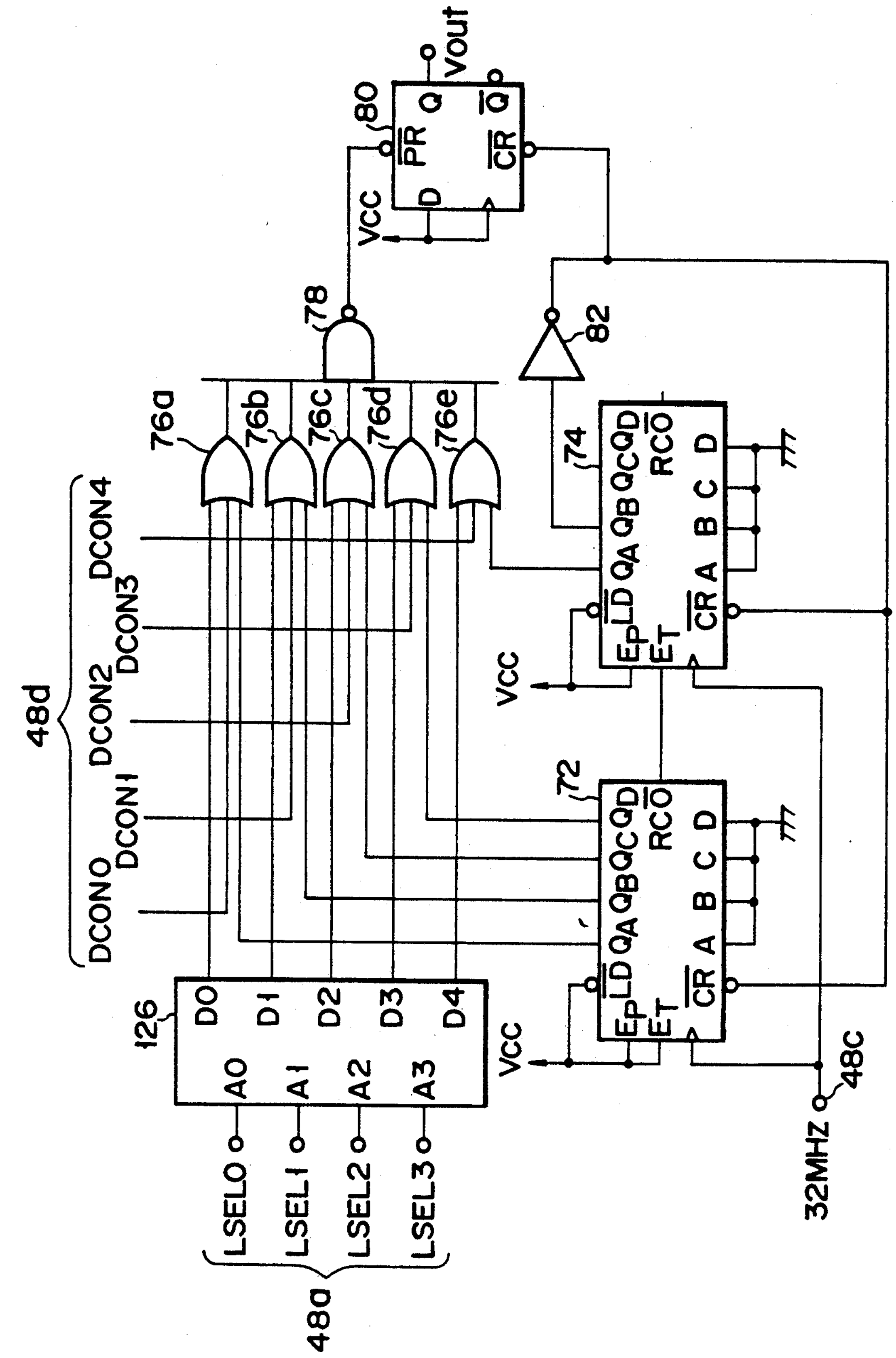
FIG. 41 is a circuit diagram showing a variable duty clock generator according to the 15th embodiment of the present invention.

FIG. 41 shows an arrangement of the variable duty clock generator 64. Referring to FIG. 41, the bits LSEL0 to LSEL3 input to the input terminal 48a are supplied to address input terminals A0 to A3, respectively, of a ROM constituting a switch 126, and binary data as shown in FIG. 42 is read out from the switch 126 to data output terminals D0 (LAB) to D4 (MSB) accordingly. The data output terminals D1 to D4 of the switch 126 are connected to the first input terminals of OR gates 76a to 76e, respectively.

A 32-MHz clock CLK32M synchronized with the signals LSEL and LEN supplied to the input terminal 48c is input to the clock terminals of counters 72 and 74. The counters 72 and 74 are cascade-connected with each other such that a carry output terminal RCO of the counter 72 is connected to an enable input terminal $E_T$ of the counter 74 and an enable input terminal $E_T$ of the counter 72 and input terminals $E_P$ and $\overline{LOAD}$ ($\overline{LD}$) of the counters 72 and 74 are pulled up to Vcc (+5 V). Data input terminals A, B, C, and D of the counters 72 and 74 are grounded.

Count output terminals $Q_A$, $Q_B$, $Q_C$, and $Q_D$ of the counter 72 and a count output terminal $Q_A$ of the counter 74 are connected to the second input terminals of the OR gates 76a, 76b, 76c, 76d, and 76e, respectively.

The third input terminals of the OR gates 76a, 76b, 76c, 76d, and 76e receive duty control signals DCON0, DCON1, DCON2, DCON3, and DCON4, respectively, supplied from a process controller 52 to an input terminal 48d via an I/O unit 56.

The output terminals of the O/R gates 76a to 76e are connected to the input terminals of a NAND gate 78. The output terminal of the NAND gate 78 is connected to a preset terminal $\overline{PR}$ of an RS flip-flop 80. The count output terminal $Q_B$ of the counter 74 is connected to clear terminals $\overline{CR}$ of the counters 72 and 74 and a clear terminal $\overline{CR}$ of the RS flip-flop 80. An output from an output terminal Q of the flip-flop 80 is supplied to the next stage as an output from the variable duty clock generator 64.

An operation of the 15th embodiment will be described below.

The decoder 58 selects one of the outputs SEL1 to SEL12 in accordance with the line select signal LSEL constituted by the four bits LSEL0 to LSEL3 transmitted from the deskew circuit 46 shown in FIG. 39. As a result, a logic level "HIGH" is input to the AND gates $60_1$ to $60_{12}$, and only a selected one of the AND gates $60_1$ to $60_{12}$ is enabled.

At this time, the timing signal LEN and the clock CLK32M synchronized with the line select signals LSEL0 to LSEL3 are input. The variable duty clock generator 64 uses this clock CLK32M to generate and output a 1-MHz line drive circuit internal clock having a controlled duty. This output from the variable duty clock generator 64 and the timing signal LEN are supplied to the AND gate 62. Only when the timing signal LEN is at level "HIGH", the 1-MHz internal clock is supplied from the AND gate 62 to the AND gates $60_1$ to $70_{12}$.

Figure 43:
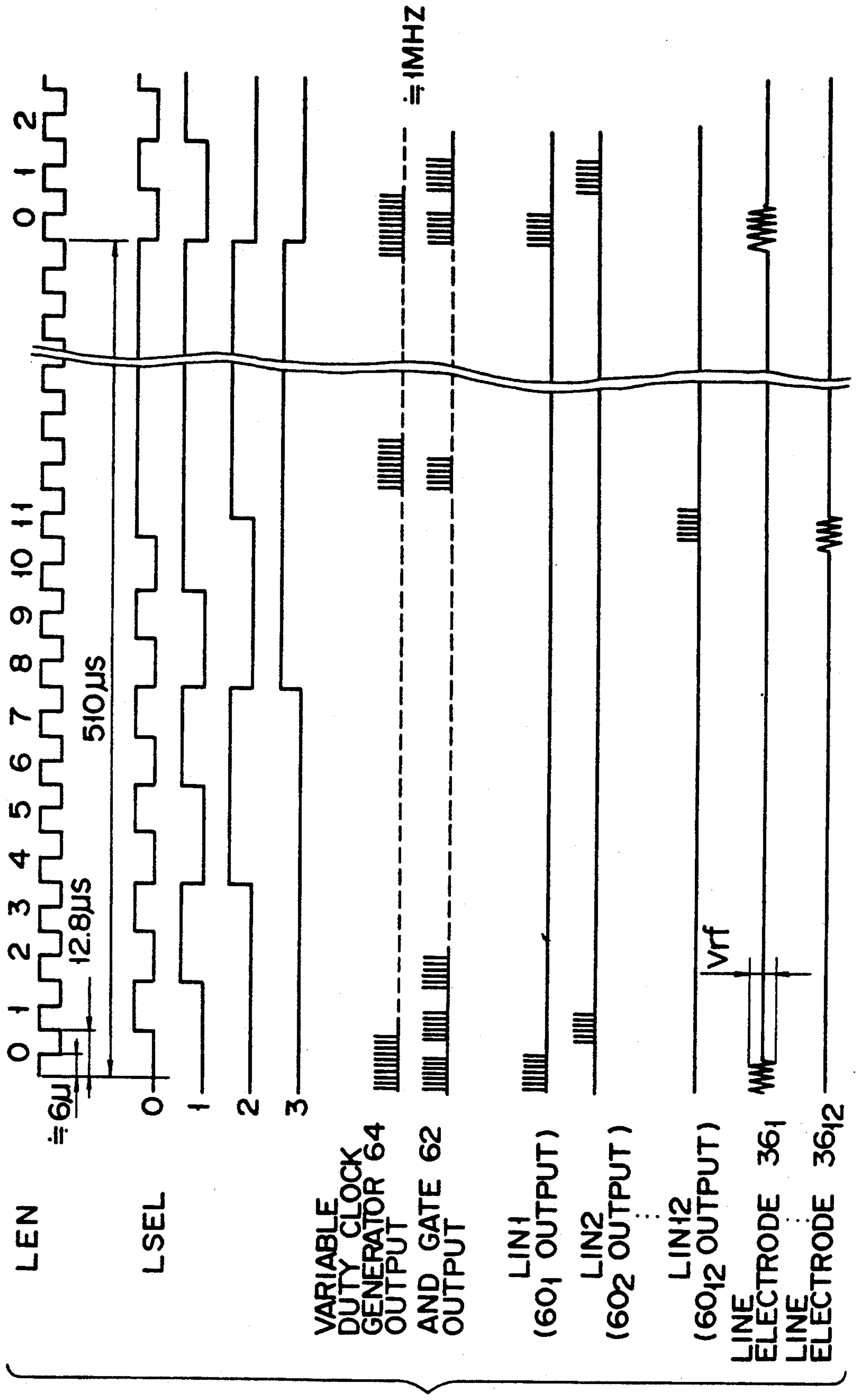
FIG. 43 is a timing chart showing waveforms of the respective parts shown in FIG. 39.

Since only one gate is enabled by the line select signals LSEL0 to LSEL3, the input signal is supplied to only one of the 12 source drive circuits $66_1$ to $66_{12}$. FIG. 43 a timing chart showing these signals and outputs. The timing signal LEN has a pulse width of about 6 μSEC. and a period of 12.8 μSEC. For example, when all of the line select signals LSEL0 to LSEL3 are at level "LOW", only the AND gate $60_1$ is selectively enabled by the decoder 58. In this case, the 1-MHz internal clock intermittent signal is output from the output terminal of the AND gate 62 in synchronism with the timing signal LEN, and the input signal LIN1 is supplied to only the source drive circuit $66_1$. Similarly, when the line select signal LSEL0 is at "HIGH" and the signals LSEL1 to LSEL3 are at "LOW", the gate corresponding to the source drive circuit $66_2$ is enabled. In this manner, the input signals LIN1 to LIN12 are sequentially applied to the source drive circuits $66_1$ to $66_{12}$, respectively.

After the input signal LIN12 is supplied to the source drive circuit $66_{12}$ (i.e., when 134 μSEC. elapse after the input signal LIN1 is supplied), all of the line select signals LSEL0 to LSEL3 are at level "HIGH" for 376 μSEC. At this time, the decoder 58 sets outputs of all the select signals SEL1 to SEL12 at level "LOW" to disable all of the AND gates $60_1$ to $60_{12}$. Thereafter (i.e., when 510 μSEC. elapse after the input signal LIN1 is supplied), all of the line select signals LSEL0 to LSEL3 return to "LOW". Subsequently, the above operation is repeatedly performed.

If all of the line select signals LSEL0 to LSEL3 are at level "LOW", the input signal LIN1 at level "HIGH" is supplied to the input terminal 84 shown in FIG. 5. This input signal LIN1 is applied to the gate of the FET Q1 to perform a switching operation. As a result, the static induction transistor Q2 is turned on. On the contrary, if the input signal LIN1 is at level "LOW", the transistor Q2 is turned off.

In this manner, when the signal LIN1 (an intermittent signal of 1 MHz) shown in FIG. 5 is input to the source drive circuit $66_1$, the static induction transistor Q2 performs the switching operation. As a result, a voltage is supplied to the parallel resonator constituted by the coil $L_C$ and the line electrode capacitance $C_L$ set in accordance with equations (1) and (2) described above to start resonance, thereby obtaining an output for ion generation.

Figure 44:
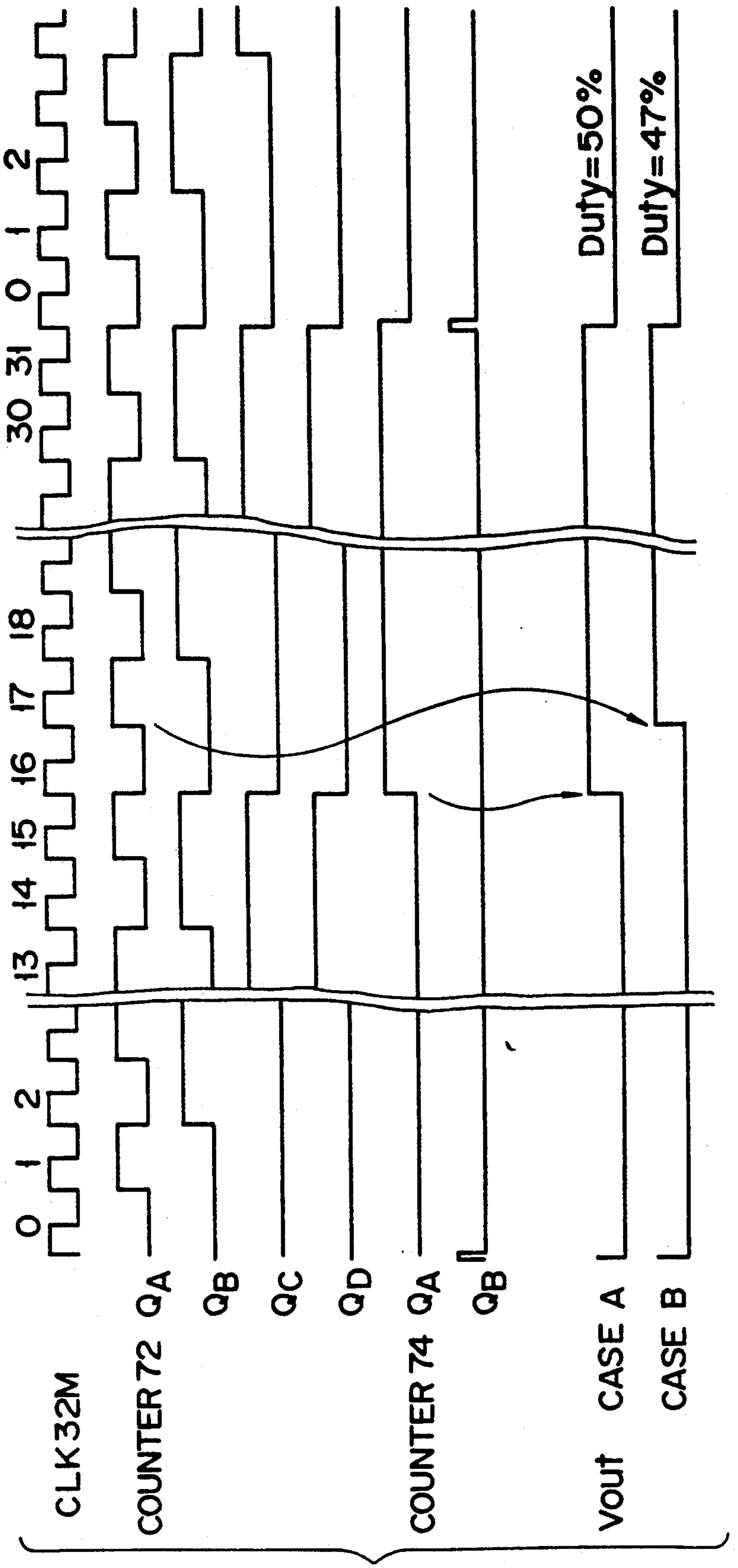
FIG. 44 is a timing chart showing operation timings of the circuit shown in FIG. 41.

FIG. 44 is a timing chart showing an operation of the variable duty clock generator 64 shown in FIG. 41. For the sake of simplicity in description, duty control corresponding to various environmental conditions near the ion generator 10 will not be taken into consideration in the following description.

When the clock CLK32M synchronized with the signals LSEL and LEN is input to the cascade-connected counters 72 and 74, signals obtained by frequency-dividing the CLK32M by 2, 4, 8, 16, and 32 are output from the terminals $Q_A$, $Q_B$, $Q_C$, and $Q_D$ of the counter 72 and the terminal $Q_A$ of the counter 74, respectively.

As shown in FIG. 42, data are stored beforehand in predetermined addresses of the switch 126 constituted by the ROM. Therefore, when the line select signals LSEL0 to LSEL3 are supplied from the deskew circuit 46, the switch 126 supplies the stored data D0 to D4 to the OR gates 76a to 76e, respectively, in accordance with the signals LSEL0 to LSEL3.

Assume that, if all of the line select signals LSEL0 to LSEL3 are at level "LOW", the data output D0 to D3 of the switch 126 are at level "HIGH" and only the data output D4 thereof is at level "LOW" (case A). In this case, the terminal $Q_A$ of the counter 74 goes "HIGH" at the 17th pulse of the clock CLK32M, and the output from the NAND gate 78 goes "LOW". As a result, the RS flip-flop 80 is set to have an output Vout of level "HIGH". Subsequently, the output $Q_B$ of the counter 74 goes "HIGH" at the 32nd pulse of the clock CLK32M to clear the counters 72 and 74, and the RS flip-flop 80 is also cleared to have an output Vout of level "LOW". Thereafter, the same operation is repeatedly performed. In this manner, a 1-MHz clock having a duty of 50% is obtained when all of the line select signals LSEL0 to LSEL3 are at level "LOW".

Assume that only the line select signal LSEL1 is at level "HIGH" while all of the other signals LSEL are at "LOW" and therefore the data output D4 and D0 of the switch 126 go "LOW" while the other data outputs D1, D2, and D3 thereof go "HIGH" (case B). At this time, the terminals $Q_B$, $Q_C$, and $Q_D$ of the counter 72 go "HIGH" at the 18th pulse of the clock CLK32M, and the output from the NAND gate 78 goes "LOW". As a result, the RS flip-flop 80 is set to have an output Vout at level "HIGH". Subsequently, as in the above case A, the counters 72 and 74 and the RS flip-flop 80 are cleared at the 32nd pulse of the clock CLK32M, and the output Vout returns to level "LOW". Thereafter, the same operation is repeatedly performed. By arbitrarily setting the switch 126 by the line select signals LSEL0 to LSEL3 as described above, a 1-MHz clock having a duty of about 47% can be generated. In this manner, the output voltage (Vrf) of the switching circuit 68 can be controlled by arbitrarily switching the switch 126.

The duty of a signal to be supplied to a driver of each line electrode is determined in accordance with switching circuit characteristics so as to obtain a proper voltage calculated as follows.

Figure 45:
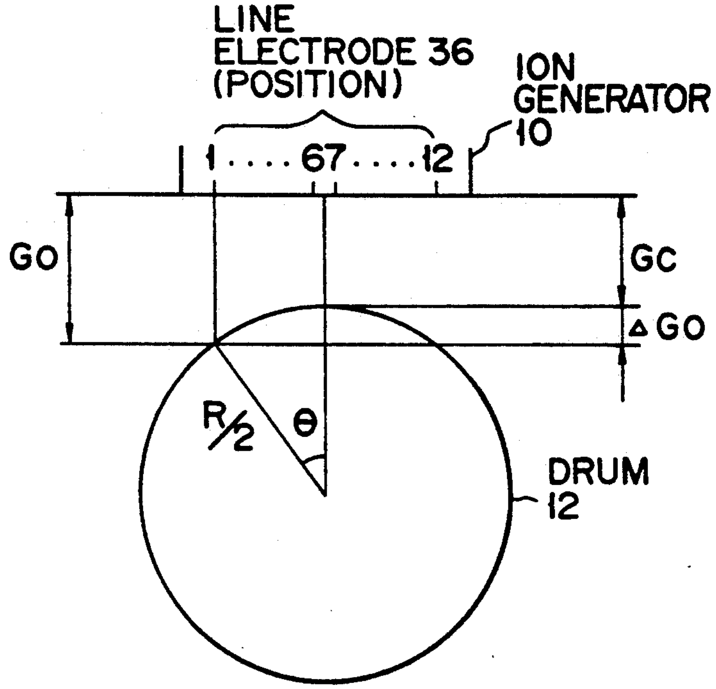
FIG. 45 is a view for explaining parameters used to calculate a voltage to be applied to each line electrode.
Figure 46:
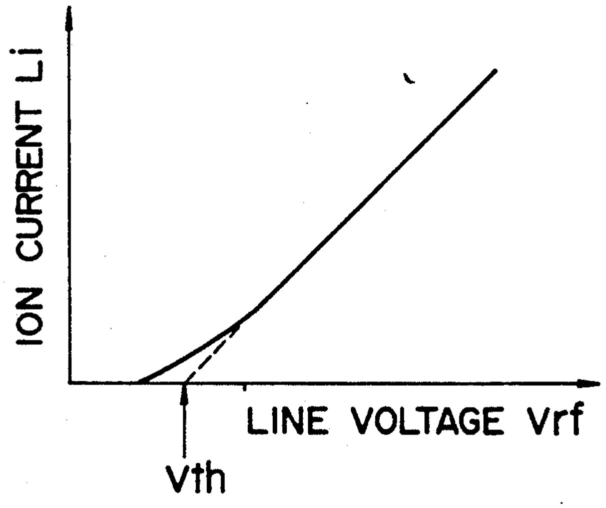
FIG. 46 is a graph showing a relationship between a line voltage and an ion current.

That is, assuming that a voltage to be applied to the line electrodes $36_6$ and $36_7$ of the 12 line electrodes 36, which are close to the center of the ion generator 10, is Vrfc and a voltage to be applied to the line electrodes $36_1$ and $36_{12}$ thereof arranged on side portions of the ion recording head 10 is Vrfo, the following equations are obtained in accordance with FIGS. 45 and 46:

$$Lo=\{((N1-1)/2\}Lp$$

$$\theta o=\mathrm{SIN}^{-1}\{Lo/(R/2)\}$$

$$\Delta Go=(R/2)(1-\mathrm{COS}\theta o)$$

where

Lp: the pitch between line electrodes

N1: the number of line electrodes

Vth: the breakdown voltage

R: the drum diameter

Lo: the distance between line electrodes at the center and the outermost portion of the ion generator Gc: the gap between the ion generator and the drum at the center of the ion generator Go: the gap between the ion generator and the drum at a position of the outermost line electrode of the ion generator ΔGo=Go−Gc θo: the central angle defined between a line connecting the drum center and the ion generator center and a line connecting the drum center and a point immediately below the outermost line electrode Since the potential of a latent image formed on the drum is substantially proportional to the drum-to-generator distance, $$Vrfo=(Go/Gc)(Vrfc-Vth)+Vth$$

is obtained.

For example,

Vrfo=2,605 Vpp is obtained for

Lp=255 μm

N1=12

Gc=200 μm

R=38 mm

Vrfc=2,500 Vpp

Vth=2,000 Vpp.

The duty is determined in accordance with the above result so as to correct the voltage as shown in, e.g., FIG. 42. By controlling the voltage to be applied to each line electrode 36 as described above, a high-quality image can be obtained regardless of a nonuniform distance between the line electrodes 36 and the drum 12.

In addition to the control of the voltage to be applied to each line electrode according to the distance between the line electrode and the drum, the duty control is performed for the application voltage to each line electrode in accordance with the environmental conditions near the ion generator as described above, thereby further improving the quality of an image.

In the above 15th embodiment, the control of a line voltage is performed stepwise by three levels. However, the levels can be subdivided without posing any problem.

In addition, the control based on the distance between each line electrode and the drum as in the 15th embodiment can be similarly applied to any of the other embodiments described above.

Furthermore, in each of the above embodiments, the environmental conditions near the ion generator are detected by the environment detecting element 34 arranged near the ion generator. However, a conversion table based on measurement results prepared beforehand may be used to locate the environment detecting element 34 at a position spaced apart from the ion generator 10.

Moreover, in each of the above embodiments, only the inductance ($L_C$) of the resonant coil is considered as the inductance component in the resonator, and only the line electrode capacitance ($C_L$) is its capacitance component. Therefore, since a stray capacitance, a stray inductance, and a capacitance of a static inductance transistor, for example, present in an actual circuit are neglected, these stray capacitances must be taken into consideration in an actual circuit.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An image forming apparatus for forming an electrostatic latent image using ions as a medium, comprising:

an image carrier on which the electrostatic latent image is to be formed;

an ion generator including a first electrode layer having a plurality of electrode patterns formed in a first direction, and a second electrode layer having a plurality of electrodes, each having a plurality of small holes from which ions are generated and each being formed in a second direction other than the first direction, said second electrode facing said first electrode layer with a dielectric layer interposed therebetween; and an RF high-voltage driver for applying an RF high-voltage signal between said first and second electrode layers of said ion generator, said RF high-voltage driver including:

a plurality of high-speed high-voltage switching means, connected in one-to-one correspondence with said electrode patterns of said first electrode layer of said ion generator, for switching the RF high-voltage signal at a high speed, each of said high-speed high-voltage switching means having a first switching element including a static induction transistor with at least a gate coupled to ground, a drain coupled to said ion generator, a source and a plurality of channels which allow current to flow through said first switching element, means coupled to the source of said static induction transistor for controlling each of said plurality of high speed high-voltage switching means so as to apply a voltage selectively to said plurality of electrode patterns of said first electrode layer, a plurality of passive elements connected in one-to-one correspondence with said plurality of high-speed high-voltage switching means, DC high-voltage power source means, connected to said plurality of passive elements, for supplying a high voltage to said RF high-voltage switching means, an RF source for supplying a predetermined-frequency signal to said high-speed high-voltage switching means, and duty varying means for varying a duty of the predetermined-frequency signal from said RF source.

2. The image forming apparatus according to claim 1, further comprising:

environment detecting means for detecting environmental conditions near said ion generator, and wherein said duty varying means includes means for varying the duty of the predetermined-frequency signal supplied from said RF source on the basis of an output from said environment detecting means.

3. The image forming apparatus according to claim 1, wherein said duty varying means includes means for varying the duty of the predetermined-frequency signal from said RF source and supplying the signal to each of said high-speed high-voltage switching means such that a duty of a predetermined-frequency signal to be supplied from said RF source to high-speed high-voltage switching means connected to an electrode pattern of said first electrode layer located near a central portion of said ion generator is different from a duty of a predetermined-frequency signal to be supplied from said RF source to high-speed high-voltage switching means connected to an electrode pattern of said first electrode layer located near a peripheral portion of said ion generator.

4. The image forming apparatus according to claim 1, wherein said duty varying means includes means for varying the duty of the predetermined-frequency signal from said RF source in accordance with a variation in said ion generator and supplying the signal to each of said high-speed high-voltage switching means.

5. An image forming apparatus for forming an electrostatic latent image using ions as a medium, comprising:

an image carrier on which the electrostatic latent image is to be formed;

an ion generator including a first electrode layer having a plurality of electrode patterns formed in a first direction, and a second electrode layer having a plurality of electrodes, each having a plurality of small holes from which ions are generated and each being formed in a second direction other than the first direction, said second electrode facing said first electrode layer with a dielectric layer interposed therebetween; and an RF high-voltage driver for applying an RF high-voltage signal between said first and second electrode layers of said ion generator, said RF high-voltage driver including:

a plurality of high-speed high-voltage switching means, connected in one-to-one correspondence with said electrode patterns of said first electrode layer of said ion generator, for switching the RF high-voltage signal at a high speed, each of said high-speed high-voltage switching means having a first switching element including a static induction transistor with at least a gate coupled to ground, a drain coupled to said ion generator, a source and a plurality of channels which allow current to flow through said first switching element, means coupled to the source of said static induction transistor for controlling each of said plurality of high speed high-voltage switching means so as to apply a voltage selectively to said plurality of electrode patterns of said first electrode layer, a plurality of passive elements connected in one-to-one correspondence with said plurality of high-speed high-voltage switching means, DC high-voltage power source means, connected to said plurality of passive elements, for supplying a high voltage to said RF high-voltage switching means, an RF source for supplying a predetermined-frequency signal to said high-speed high-voltage switching means, and DC high-voltage power source varying means for varying the application voltage from said DC high-voltage power source means.

6. The image forming apparatus according to claim 5, further comprising:

environment detecting means for detecting environmental conditions near said ion generator, and wherein said DC high-voltage power source varying means includes means for varying the application voltage from said DC high-voltage power source means on the basis of an output from said environment detecting means.

7. The image forming apparatus according to claim 5, wherein said DC high-voltage power source varying means includes means for varying the application voltage form said DC high-voltage power source means in accordance with a variation in said ion generator.

8. An image forming apparatus for forming an electrostatic latent image using ions as a medium, comprising:

an image carrier on which the electrostatic latent image is to be formed;

an ion generator including a first electrode layer having a plurality of electrode patterns formed in a first direction, and a second electrode layer having a plurality of electrodes, each having a plurality of small holes from which ions are generated and each being formed in a second direction other than the first direction, said second electrode layer facing said first electrode layer with a dielectric layer interposed therebetween; and an RF high-voltage driver for applying an RF high-voltage signal between said first and second electrode layers of said ion generator, said RF high-voltage driver including:

high-voltage power source for generating a DC high voltage;

a plurality of high-speed high-voltage switching means for switching the RF high-voltage signal at a high speed, each of said high-speed high-voltage switching means having a first switching element including a static induction transistor with at least a gate coupled to ground, a drain coupled to said ion generator, a source and a plurality of channels which allow current to flow through said first switching element; and a plurality of parallel resonators arranged between said high-voltage power source and each of said plurality of high speed high-voltage switching means and including a capacitor formed by capacitance between the first and second electrode layers of said ion generator and a coil connected in parallel to the capacitor.

9. The image forming apparatus according to claim 8, further comprising an RF source coupled to the source of said static induction transistor in each of said high speed high-voltage switching means, for supplying a predetermined RF signal to said plurality of high-speed high-voltage switching means.

10. The image forming apparatus according to claim 9, wherein each of said plurality of high-speed high-voltage switching means includes:

a second switching element including a field effect transistor for amplifying the predetermined RF signal from said RF source; and an output of each of said plurality of high-speed high-voltage switching means being cascade-connected to the source of the static induction transistor of the first switching element.

11. The image forming apparatus according to claim 8, wherein the DC high voltage generated by said high-voltage power source coupled to said plurality of high-speed high-voltage switching means is at least one-third of a peak-to-peak value of the RF high-voltage signal.

* * * * *